United States Patent
Terada et al.

(10) Patent No.: US 7,538,478 B2
(45) Date of Patent: May 26, 2009

(54) DISCHARGE LAMP PROVIDED WITH EXTERNAL ELECTRODES, PRODUCTION METHOD OF THE DISCHARGE LAMP, BACKLIGHT UNIT PROVIDED WITH THE DISCHARGE LAMP, AND LIQUID CRYSTAL DISPLAY APPARATUS

(75) Inventors: Toshihiro Terada, Hyogo (JP); Shigeru Ido, Osaka (JP); Tomokazu Matsuura, Osaka (JP); Hirofumi Yamashita, Osaka (JP); Taizou Ono, Osaka (JP); Masanobu Murakami, Osaka (JP)

(73) Assignee: Panasonic Corporation, Osaka (JP)

( * ) Notice: Subject to any disclaimer, the term of this patent is extended or adjusted under 35 U.S.C. 154(b) by 61 days.

(21) Appl. No.: 11/486,745

(22) Filed: Jul. 14, 2006

(65) Prior Publication Data
US 2007/0013285 A1    Jan. 18, 2007

(30) Foreign Application Priority Data

| Jul. 14, 2005 | (JP) | 2005-205306 |
| Jul. 29, 2005 | (JP) | 2005-221205 |
| Aug. 18, 2005 | (JP) | 2005-237177 |
| Aug. 18, 2005 | (JP) | 2005-237178 |
| Sep. 2, 2005 | (JP) | 2005-254802 |
| Oct. 27, 2005 | (JP) | 2005-312874 |

(51) Int. Cl.
*H01J 11/00* (2006.01)
*H01J 63/04* (2006.01)
*H01J 65/00* (2006.01)
*H01J 61/06* (2006.01)

(52) U.S. Cl. .................. 313/234; 313/607; 313/621
(58) Field of Classification Search ................. 313/607, 313/234, 621–623
See application file for complete search history.

(56) References Cited

U.S. PATENT DOCUMENTS

| 4,887,002 | A | * | 12/1989 | Dobashi et al. ............. 313/607 |
| 5,417,886 | A | * | 5/1995 | Tateiwa et al. ......... 252/301.4 R |
| 5,470,805 | A | * | 11/1995 | Filmer ..................... 501/55 |
| 2001/0008365 | A1 | * | 7/2001 | Honda et al. ............... 313/631 |
| 2002/0070682 | A1 | * | 6/2002 | Atagi ....................... 315/246 |
| 2004/0178731 | A1 | * | 9/2004 | Takeda et al. .............. 313/607 |
| 2005/0184640 | A1 | * | 8/2005 | Yamashita et al. .......... 313/493 |
| 2005/0189879 | A1 | * | 9/2005 | Minamoto et al. .......... 313/607 |
| 2005/0194905 | A1 | * | 9/2005 | Van Der Pol et al. ........ 313/634 |
| 2006/0055326 | A1 | * | 3/2006 | Takeda et al. .............. 313/607 |

(Continued)

FOREIGN PATENT DOCUMENTS

JP    2003-257377    9/2003

(Continued)

OTHER PUBLICATIONS

Machida et al., JP 2003-346728, Dec. 2003 Machine translation.*

*Primary Examiner*—Sikha Roy
*Assistant Examiner*—Tracie Y Green

(57) ABSTRACT

A discharge lamp includes a glass bulb and a pair of electrodes provided at both ends of the glass bulb. At least one of the electrodes is an external electrode formed on an outer surface of the glass bulb as a thin layer whose maximum thickness is 70 μm or less, and an end portion of the external electrode becomes smaller in thickness towards an end of the external electrode.

20 Claims, 32 Drawing Sheets

U.S. PATENT DOCUMENTS

2006/0145618 A1* 7/2006 Moon .......................... 313/607
2006/0261723 A1* 11/2006 Terada et al. ................. 313/485
2006/0284536 A1* 12/2006 Misono et al. .............. 313/234
2006/0290258 A1* 12/2006 Feldmann et al. ........... 313/483

FOREIGN PATENT DOCUMENTS

JP          2003346728 A  * 12/2003

* cited by examiner

| ELECTRODE BODY LAYER | LAYER SURFACE PROCESSING | SULFURIZATION (IN AIR) | SOLDER DIP | | CONDUCTIVITY |
|---|---|---|---|---|---|
| | | | SOLDER WETTABILITY | SILVER TRANSFER | |
| Ag | — | △ | △ | △ | ○ |
| Ag | POLISHING, FLUX APPLICATION | △ | ○ | △ | ○ |
| Ag+OXIDE ADDITIVE | — | ○ | ○ | ○ | ○ |
| Ag+Pd | — | ○ | △ | ○ | ○ |
| Ag+Os | — | ○ | △ | ○ | ○ |
| Ag+Pt | — | ○ | △ | ○ | ○ |
| Au | — | ○ | × | — | △ |
| Au+Ag | — | ○ | × | △ | △ |

BEFORE POLISHING

AFTER POLISHING

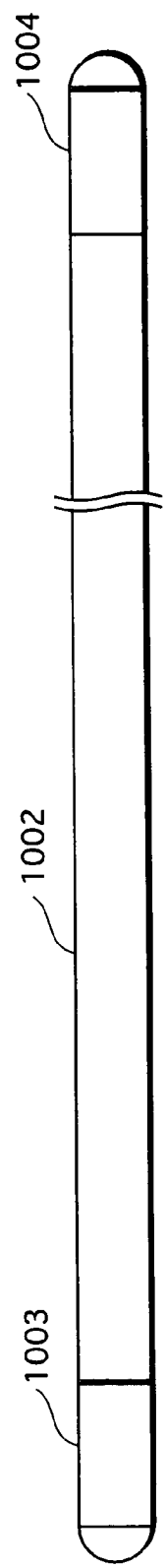
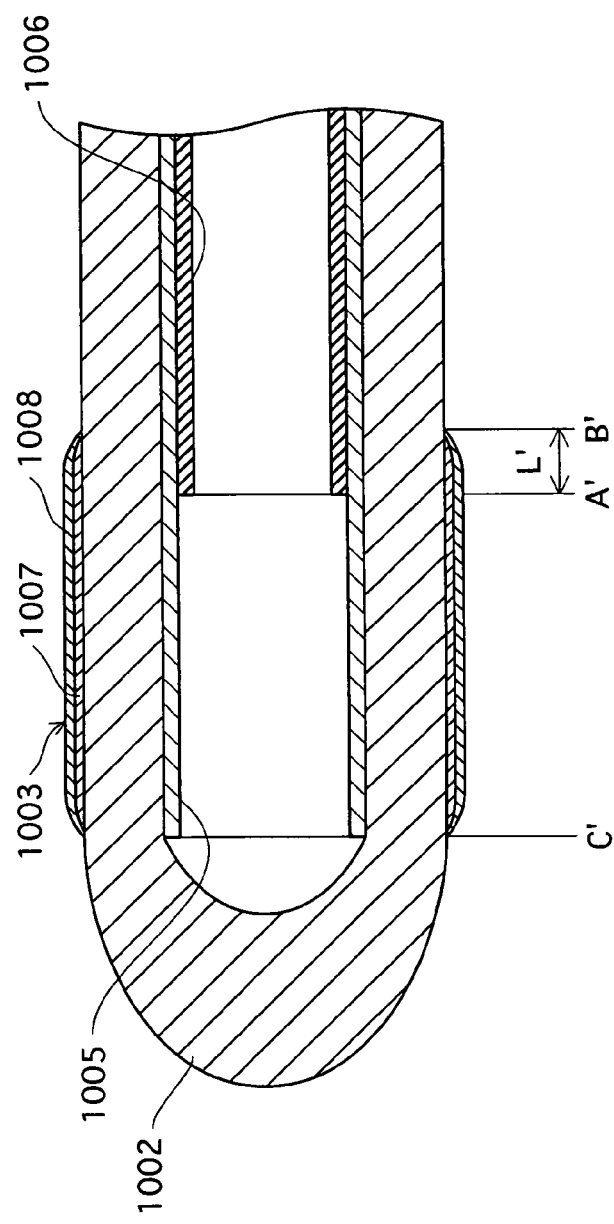
FIG.12A
FIG.12B

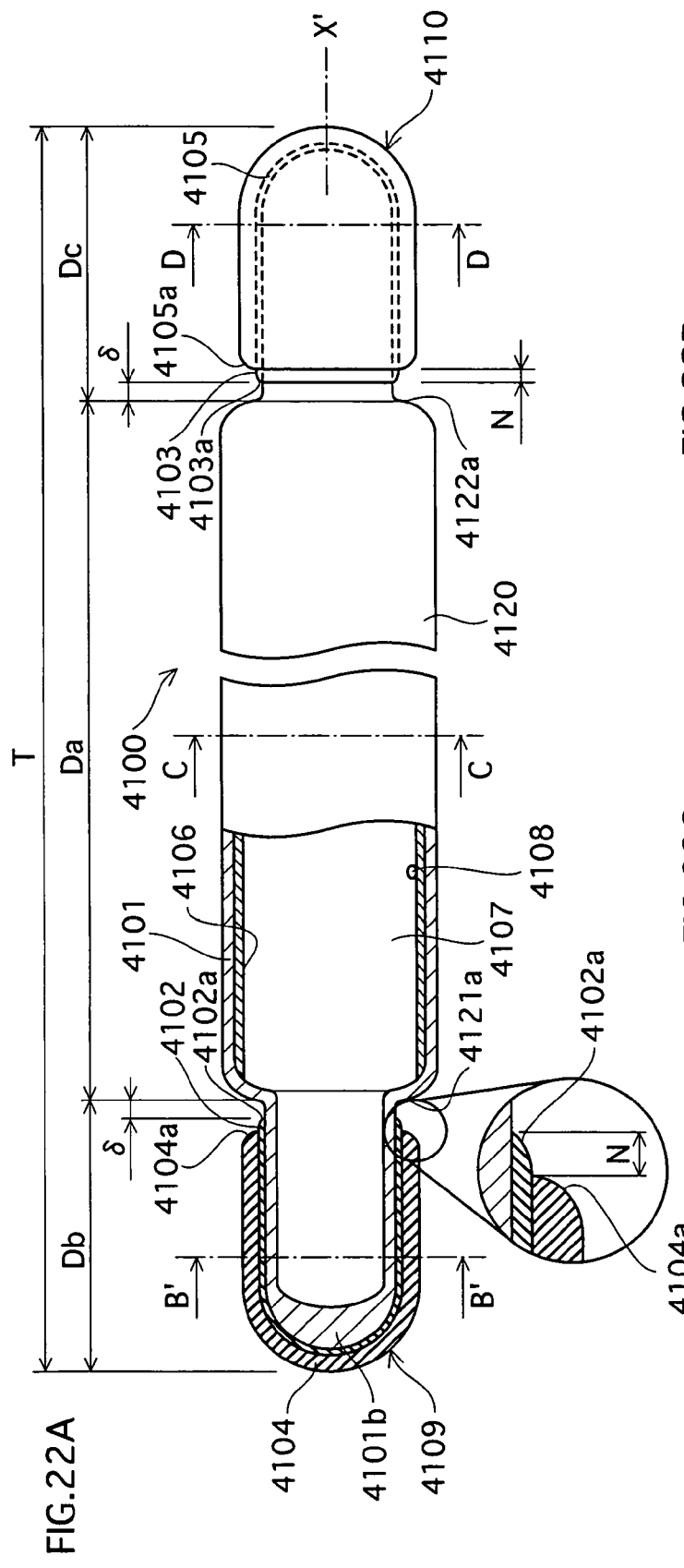
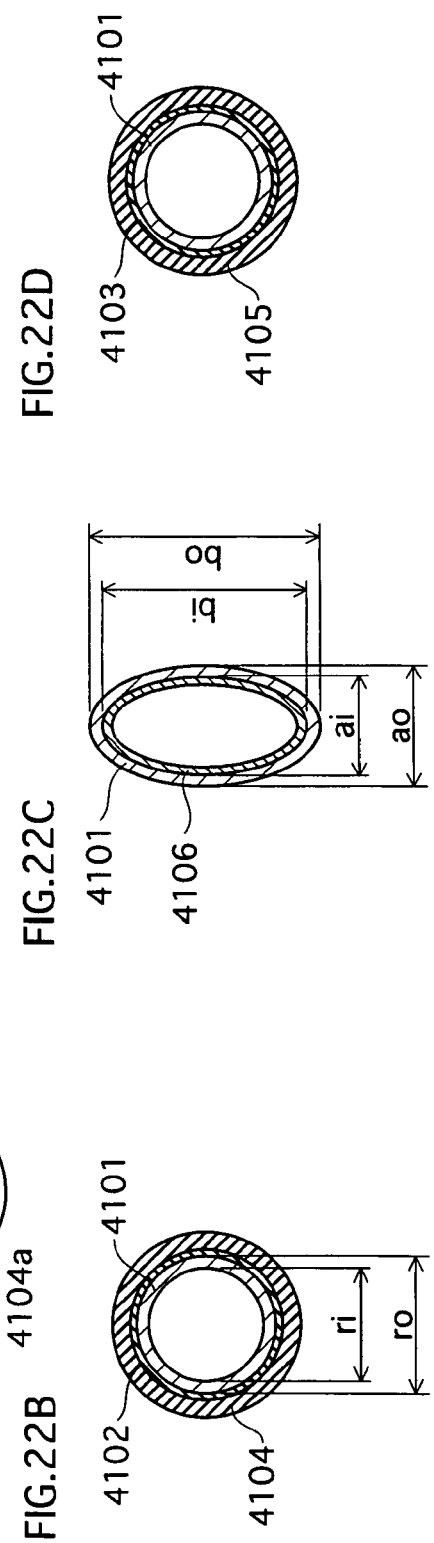
FIG.22A
FIG.22B
FIG.22C
FIG.22D

FIG.27

| | 0.5 SECOND | 1 SECOND | 2 SECOND | 3 SECOND | 5 SECOND | 10 SECOND |
|---|---|---|---|---|---|---|
| 230°C | ✕ SOLDER HEAP | ✕ SOLDER HEAP | — | — | — | — |
| 235°C | ✕ SOLDER WETTABILITY | △ SOLDER WETTABILITY | ○ SOLDER WETTABILITY | ○ SOLDER WETTABILITY | ○ SOLDER WETTABILITY | ✕ SILVER TRANSFER |
| 240°C | ✕ SOLDER WETTABILITY | ○ SOLDER WETTABILITY | ○ SOLDER WETTABILITY | ○ SOLDER WETTABILITY | △ SILVER TRANSFER | ✕ SILVER TRANSFER |
| 250°C | △ SOLDER WETTABILITY | △ SOLDER WETTABILITY | ○ SOLDER WETTABILITY | ○ SOLDER WETTABILITY | △ SILVER TRANSFER | ✕ SILVER TRANSFER |
| 260°C | △ SOLDER WETTABILITY | △ SOLDER WETTABILITY | ○ SOLDER WETTABILITY | △ SILVER TRANSFER | ✕ SILVER TRANSFER | |
| 265°C | △ SOLDER WETTABILITY | ○ SOLDER WETTABILITY | △ SILVER TRANSFER | ✕ SILVER TRANSFER | | — |
| 270°C | △ SILVER TRANSFER | ✕ SILVER TRANSFER | — | — | — | — |

DISCHARGE LAMP PROVIDED WITH EXTERNAL ELECTRODES, PRODUCTION METHOD OF THE DISCHARGE LAMP, BACKLIGHT UNIT PROVIDED WITH THE DISCHARGE LAMP, AND LIQUID CRYSTAL DISPLAY APPARATUS

This application is based on application Nos. 2005-205306, 2005-221205, 2005-237177, 2005-237178, 2005-254802 and 2005-312874 filed in Japan, the contents of which are hereby incorporated by reference.

BACKGROUND OF THE INVENTION (1) Field of the Invention

The present invention relates to a discharge lamp provided with external electrodes, a production method of the discharge lamp, a backlight unit provided with the discharge lamp, and a liquid crystal display apparatus.

(2) Description of the Related Art

There has been known a discharge lamp provided with external electrodes, such as a discharge lamp 100 shown in FIG. 1 that is disclosed in Japanese Laid-Open Patent Application No. 2003-257377. The discharge lamp 100 includes a pair of external electrodes 101 and 102 which are fitted onto a glass bulb 103 at both ends thereof, respectively. In the discharge lamp 100 with such a construction, the corona discharge is easy to occur at the end portion 101a and the end portion 102a (not illustrated) of the external electrodes 101 and 102 on the glass bulb center side. The corona discharge becomes a cause of the generation of ozone. To prevent the corona discharge and the generation of ozone, the conventional technique covers the end portions 101a and 102a with insulating members 104 and 105, respectively.

However, with the construction of the discharge lamp 100, the lamp brightness is reduced at part 106 of the light extraction portion of the glass bulb 103 since the part 106 is covered with the insulating members 104 and 105. Also, the insulating members 104 and 105 become larger in the outer diameter in part where the insulating members 104 and 105 are provided. This prevents the discharge lamp 100 from becoming spindly and from having an excellent appearance.

SUMMARY OF THE INVENTION

The main object of the present invention is therefore to provide a discharge lamp that is difficult to generate ozone, provides high brightness, is spindly, and has an excellent appearance, a production method of the discharge lamp, a backlight unit using the discharge lamp as a light source, and a liquid crystal display apparatus.

The above object is fulfilled by a discharge lamp comprising: a glass bulb; and a pair of electrodes provided at both ends of the glass bulb, wherein at least one of the electrodes is an external electrode formed on an outer surface of the glass bulb as a thin layer whose maximum thickness is 70 µm or less, and an end portion of the external electrode becomes smaller in thickness towards an end of the external electrode.

With the above-stated construction in which the maximum thickness of the glass bulb is 70 µm or less and an end portion of the external electrode becomes smaller in thickness towards an end of the external electrode, the corona discharge is difficult to occur, thus ozone is difficult to be generated. Also, there is no need of, as in the conventional lamp 100 shown in FIG. 1, fitting the insulating members 104 and 105 onto the glass bulb 103 to suppress the generation of ozone. Also, with the above-stated construction of the present invention, there is no reduction in the lamp brightness that occurs in the conventional discharge lamp since the part 106 of the light extraction portion is covered with the insulating members 104 and 105.

In the above-described discharge lamp, the external electrode may include an electrode body layer and a coating layer, the electrode body layer being formed on an outer surface of the glass bulb, a main constituent of the electrode body layer being silver or copper, and the coating layer being formed either directly or indirectly on an outer surface of the electrode body layer.

With the above-stated construction in which the main constituent of the electrode body layer is silver or copper that is small in electric resistance, the external electrode has high conductivity. Also, since the coating layer is formed either directly or indirectly on the outer surface of the electrode body layer, the electrode body layer is difficult to be exposed to the air, which prevents sulfurization of silver and oxidization of copper, thus making the external electrode difficult to decrease in conductivity.

In the above-described discharge lamp, a main constituent of the coating layer may be solder.

With the above-stated construction, the corrosion or deterioration of the coating layer is difficult to occur, making the life of the external electrode longer.

In the above-described discharge lamp, the coating layer may be formed on the outer surface of the electrode body layer, and a main constituent of the electrode body layer is silver, and the coating layer also contains silver.

With the above-stated construction in which the coating layer is formed on the outer surface of the electrode body layer and the main constituent of the electrode body layer is silver, the external electrode has high conductivity, especially when the coating layer also contains silver. Also, since the sintering can be performed in the air during the electrode body layer forming process, the lamp productivity is increased. Furthermore, since the coating layer contains silver, a transfer of silver from the electrode body layer is difficult to occur.

In the above-described discharge lamp, the coating layer may be formed on the outer surface of the electrode body layer, and an outer surface of the coating layer has been polished.

With the above-stated construction, the electrode body layer has excellent solder wettability, and thus is strongly bonded with the coating layer. It is therefore possible to bond the coating layer with the electrode body layer further strongly.

In the above-described discharge lamp, the electrode body layer and the coating layer may not contain an material that is an environmental load.

With the above-stated construction, an environment-friendly discharge lamp is provided.

In the above-described discharge lamp, a phosphor layer may be provided on an inner surface of the glass bulb, the phosphor layer containing phosphor particles that include electron emitting atoms, and the phosphor layer extends towards an and of the glass bulb, in at least one end portion thereof, to a position A that is 1 mm to 7 mm away towards the end of the glass bulb from a position B that corresponds to an end of the external electrode on a glass bulb center side.

The inventors of the present invention found through keen studies that the start-up characteristics in dark surrounding are improved when the phosphor layer is provided inside the glass bulb at an area corresponding to the external electrodes. This is because with this construction, an application of a start-up voltage to an external electrode causes an electric field to be generated, then electrons are emitted by electron-emitting atoms within the phosphor layer, and the emitted electrons trigger a discharge.

In the above-described construction, the phosphor layer provided on the inner surface of the glass bulb extends towards an and of the glass bulb to a position A that is 1 mm or more away towards the end of the glass bulb from a position B that corresponds to an end of the external electrode on a glass bulb center side, the start-up characteristics in dark surrounding are improved. Also, it was confirmed through experiments that with the construction in which the phosphor layer overlaps with the external electrode by 7 mm or less, reduction in lamp life due to mercury consumption is suppressed.

Further, in the manufacturing process, it is possible to improve the start-up characteristics in dark surrounding only by adjusting the relative positions of the phosphor layer and the external electrode. It is accordingly possible to provide a discharge lamp in which the start-up characteristics in dark surrounding have been improved at low cost.

It should further be noted that a backlight unit with improved start-up characteristics in dark surrounding is provided when the above-described discharge lamp is used in the backlight unit.

In the above-described discharge lamp, the electron emitting atoms may be of at least one element selected from the group consisting of barium, strontium, and yttrium.

With the above-stated construction, an application of a start-up voltage to an external electrode causes an electric field to be generated, which causes electrons to be emitted from the atoms of these elements. This enables the start-up characteristics in dark surrounding to be improved.

In the above-described discharge lamp, a protection layer may be provided on the inner surface of the glass bulb at least in an area between a position C, which corresponds to an end of the external electrode on a glass bulb end side, and a position. D which corresponds to an end of the phosphor layer on a glass bulb end side.

The above-stated construction prevents the glass bulb from reacting with mercury.

In the above-described discharge lamp, at least part of the outer surface of the glass bulb may have been subjected to a surface roughening, and at least part of the external electrode is provided in an area that has been subjected to the surface roughening.

The above-stated construction makes the external electrode difficult to remove from the glass bulb.

In the above-described discharge lamp, the external electrode may be provided in entirety thereof in the area that has been subjected to the surface roughening.

With the above-stated construction, it is possible to bond an external electrode having a uniform thickness with the outer surface of the glass bulb. It is further possible to increase or decrease the maximum thickness of the glass bulb by changing conditions such as the surface roughness of the outer surface of the glass bulb or the ultrasonic solder dipping method.

In the above-described discharge lamp, the end portion of the external electrode may be provided outside the area that has been subjected to the surface roughening.

With the above-stated construction, it is possible to increase the effective light emission length as much as the area that has been subjected to the surface roughening is not exposed to the outside. Also, when the external electrode is formed on the outer surface of the glass bulb by, for example, the dipping method, it is possible to easily form the external electrode such that the end portion, which is formed on the area that has not been subjected to the surface roughening, becomes smaller in thickness towards the end thereof, drawing a gentle curvature.

In the above-described discharge lamp, the end portion of the external electrode may be provided in an area that is away from the blast-processed surface by 0.5 mm or more.

With the above-stated construction, it is possible to stably form the external electrode such that the end portion, which is formed on the area that has not been subjected to the surface roughening, becomes smaller in thickness towards the end thereof, drawing a gentle curvature.

In the above-described discharge lamp, the main constituent of the external electrode may be solder.

The above-stated construction reduces the damages that would be made on the outer surface of the external electrode when the discharge lamp is attached to electrode sockets of a backlight unit, compared with a discharge lamp having an external electrode that is made by applying only silver paste.

In the above-described discharge lamp, the external electrode may be formed by the ultrasonic solder dipping method.

With the above-stated construction, it is possible to bond an external electrode having a uniform thickness with the outer surface of the glass bulb.

In the above-described discharge lamp, the main constituent of the external electrode may be selected from the group consisting of tin, an alloy of tin and indium, or an alloy of tin and bismuth.

With the above-stated construction, it is possible to strongly bond an external electrode having a uniform thickness with the outer surface of the glass bulb.

In the above-described discharge lamp, the external electrode may contain at least one of antimony, zinc, and aluminum as an additive.

With the above-stated construction, the external electrode has excellent wettability with the surface of the glass bulb, and thus is more strongly bonded with the surface of the glass bulb.

In the above-described discharge lamp, the external electrode in the shape of a cap or a sleeve may be formed on the outer surface of the glass bulb at an end thereof.

With the above-stated construction, it is possible to form the external electrode on the outer surface of the glass bulb at an end thereof, by the dipping or screen printing method.

In the above-described discharge lamp, the external electrode in the shape of a cap or a sleeve may be formed on the outer surface of the glass bulb at an end thereof In the above-described discharge lamp, in a cross section cut by a plane including a tube axis of the glass bulb, an angle R between a straight line Q3 and the outer surface of the glass bulb is in a range from 5 degrees to 45 degrees, the straight line Q3 connecting an end Q1 of the end portion and a point Q2 at which the end portion has a largest thickness.

The above-stated construction prevents ozone from being generated, and makes the external electrode from removing from the surface of the glass bulb.

In the above-described discharge lamp, the end portion of the external electrode may become smaller in thickness towards the end of the external electrode, drawing a gentle curvature in a cross section cut along a tube axis of the glass bulb.

The above-stated construction enhances the strength of the end portion of the external electrode, and makes the external electrode from removing from the surface of the glass bulb. In the above-described discharge lamp, a protection layer may be provided on an inner surface of the glass bulb, and a phosphor layer is provided on the protection layer, the glass bulb is made of a glass that contains 3% to 20% of sodium oxide, maximum thickness of the protection layer is 0.5 μm to 2 μm and the protection layer includes at least one element selected from the group consisting of $Y_2O_3$, MgO, and $La_2O_3$, and the protection layer is not provided on part of the inner surface of the glass bulb.

With the above-stated construction, alkaline metal of sodium exists in an area in which the protection layer is not provided in the discharge space. The alkaline metal in the area is exposed to the discharge space. This improves the start-up characteristics in dark surrounding. In addition to this, the protection layer includes $Y_2O_3$, MgO, and $La_2O_3$, which are electron emitting materials having a high secondary electron emission coefficient. This further improves the start-up characteristics in dark surrounding. Also, with the construction that the maximum thickness of the protection layer is 2 μm less, reduction in luminous flux is prevented, and with the construction that the maximum thickness of the protection layer is 0.5 μm or more, when the lamp is lighted with the driving current of 5 mA or more for high brightness, it is possible to protect the inner surface of the glass bulb corresponding to the external electrode from ion bombardments and prevent a phenomenon called pinhole from occurring, where the pinhole is a phenomenon in which holes are made in the inner surface of the glass bulb by the ion bombardments.

In the above-described discharge lamp, the protection layer formed inside the glass bulb at an area corresponding to the external electrode may include an electron emitting material selected from the group consisting of a cesium compound, a lithium compound, and a barium compound.

With the above-stated construction in which the protection layer formed inside the glass bulb at an area corresponding to the external electrode includes an electron emitting material selected from the group consisting of a cesium compound, a lithium compound, and a barium compound which are electron emitting materials having a high secondary electron emission coefficient. This further improves the start-up characteristics in dark surrounding.

In the above-described discharge lamp, the phosphor layer may include at least one phosphor that includes Mg, and be provided inside the glass bulb at a central area that corresponds to an external area on the glass bulb sandwiched by ends of external electrodes on the glass bulb center side such that the phosphor layer partially overlaps with the external electrodes.

With the above-stated construction in which the phosphor layer including Mg, which is an electron emitting material, is provided such that the phosphor layer partially overlaps with the external electrodes, the start-up characteristics in dark surrounding are further improved.

In the above-described discharge lamp, the glass bulb may be cylindrical and a positive column light emitting portion thereof is in a flattened shape in a transverse cross section. In the above-described discharge lamp, the external electrode may be provided on an outer surface of a cylindrical portion of the glass bulb such that there is a predetermined distance between the external electrode and the positive column light emitting portion in the flattened shape of the glass bulb. In the above-described discharge lamp, the predetermined distance may be 1 mm or more. In the above-described discharge lamp, the external electrode may contain 1 wt % or more of low-melting glass.

With any of these constructions, it is possible to suppress the lamp wattage from increasing and ozone from being generated, and to provide a phosphor lamp provided with the external electrode that lives as long as the other portions of the lamp.

The above object is also fulfilled by a discharge lamp production method comprising the steps of: forming an electrode body layer on an outer surface of a glass bulb such that an end portion of the electrode body layer becomes smaller in thickness towards an end of the electrode body layer; and forming a coating layer to cover the electrode body layer.

With the above-stated construction in which in the electrode body layer forming step, an electrode body layer is formed on an outer surface of a glass bulb such that an end portion of the electrode body layer becomes smaller in thickness towards an end of the electrode body layer, the external electrode that is formed by coating the electrode body layer with solder also has a shape in which an end portion of the external electrode becomes smaller in thickness towards an end thereof. The larger the difference in level (height) between the glass bulb and the end portion of the external electrode is, the easier the corona discharge is to occur and ozone to be generated. The external electrode formed by the above-stated production method has a shape in which an end portion of the external electrode becomes smaller in thickness towards an end thereof, thus the difference in level (height) between the glass bulb and the end portion of the external electrode is small. This produces an advantageous effect that ozone is difficult to be generated.

Also, with respect to the discharge lamp produced by the above-stated production method, there is no need of, as in the conventional lamp 100 shown in FIG. 1, fitting the insulating members 104 and 105 onto the glass bulb 103 to suppress the generation of ozone. The above-stated production method of the present invention therefore produces advantageous effects that there is no reduction in the lamp brightness that occurs in the conventional discharge lamp since the part 106 of the light extraction portion is covered with the insulating members 104 and 105, and that it is possible to produce a discharge lamp that is spindly and has an excellent appearance.

In the above-described discharge lamp production method, in the coating layer forming step, the coating layer may be formed to be made of solder, by dipping the glass bulb into melted solder contained in a melting basin.

With the above-stated construction in which the coating layer made of solder is formed, the damages that would be made on the outer surface of the external electrode when the external electrode is attached to the lamp holders of the backlight unit are reduced. Also, forming the coating layer using solder suppresses the material cost. Also, use of the solder dipping method provides an advantageous effect that the coating layer can be formed easily.

In the above-described discharge lamp production method, temperature of the melted solder contained in the melting basin may be 235° C. to 265° C. inclusive.

With the above-stated construction, the following problems are avoided. That is to say, when the temperature of the melted solder is lower than 235° C., being close to the melting point of solder (230° C.), the coating is in a bad state since the solder is heaped as a block. Also, when the temperature of the melted solder is higher than 265° C., a phenomenon called "silver transfer", in which silver in the silver paste constituting the electrode body layer melts into the solder, occurs. When the silver transfer occurs, a small hole is made in the electrode body layer, and the electrostatic capacitance of the discharge lamp changes.

In the above-described discharge lamp production method, in the coating step, the glass bulb may be dipped into the melted solder while an angle formed by the tube axis of the glass bulb and the vertical line is kept to be five degrees or less and then pulled up.

With respect to this, it has been confirmed that if the glass bulb is dipped into the melted solder with the angle of more than five degrees and then pulled up, the solder is also attached to an area of the glass bulb that does not need to be coated with the solder, and what is called remnant solder is generated.

In the above-described discharge lamp production method, the coating layer made of nickel or copper may be formed by plating the electrode body layer with nickel or copper.

With the above-stated construction in which the coating layer is formed by plating, a layer that is uniform and small in thickness is obtained.

The above object is also fulfilled by a backlight unit comprising the above-described discharge lamp as a light source.

With the above-stated construction in which the discharge lamp is used as the main light source, the corona discharge is difficult to occur at the external electrode of the discharge lamp. Accordingly, deterioration of resin members of the backlight unit, which is caused by ozone generated by the corona discharge, is prevented, and the backlight unit can provide high brightness.

The above object is also fulfilled by a liquid crystal display apparatus comprising a backlight unit, the backlight unit including: a plurality of discharge lamps which are each the above-described discharge lamp; and a high-frequency electronic ballast that lights all of the plurality of discharge lamps.

With the above-stated construction, the corona discharge is difficult to occur at the external electrode of the discharge lamp. Accordingly, deterioration of resin members of the liquid crystal display apparatus, which is caused by ozone generated by the corona discharge, is prevented.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2A shows an outline of the discharge lamp. FIG. 2B is an enlarged cross section showing an end of the discharge lamp.

FIG. 4A is an enlarged view of a portion 10 shown in FIG. 2B, enclosed by a chain double-dashed line. FIG. 4B is an enlarged view of a portion 110 shown in FIG. 1, enclosed by a chain double-dashed line.

FIG. 6 shows properties of the electrode body layer.

FIG. 7A shows the state of the outer surface of the electrode body layer before polishing. FIG. 7B shows the state of the outer surface of the electrode body layer after polishing.

FIG. 10A is a front view, and FIG. 10B is a side view.

FIGS. 12A and 12B show a discharge lamp in Embodiment 2. FIG. 12A shows an outline of the discharge lamp. FIG. 12B is an enlarged cross section showing an end of the discharge lamp.

FIGS. 22A to 22D show an outline of the discharge lamp in Embodiment 4.

FIG. 27 is a table showing relationships among the temperature of the melted solder, dipping time, and dipping results.

DESCRIPTION OF THE PREFERRED EMBODIMENT

Figure 1:
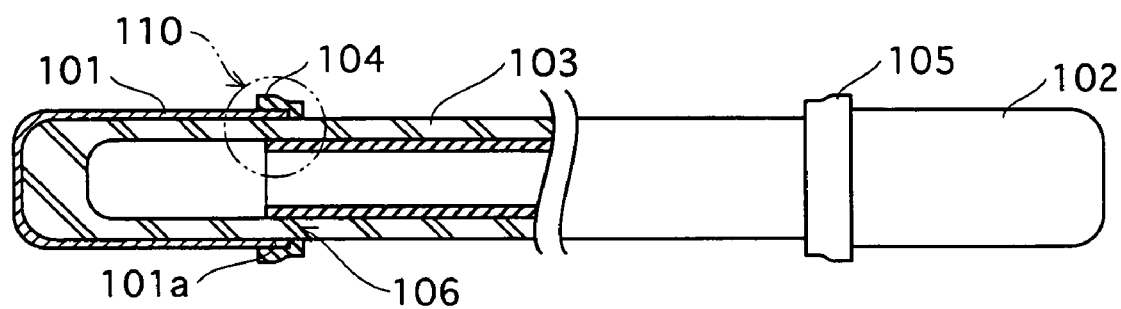
FIG. 1 shows an outline of a conventional discharge lamp, with detailed end portion provided in a cross-sectional broken view.

The following describes embodiments of the present invention with respect to a discharge lamp provided with external electrodes, a production method of the discharge lamp, a backlight unit provided with the discharge lamp, and a liquid crystal display apparatus, with reference to the drawings.

<Construction of Discharge Lamp>

The following describes the discharge lamp in an embodiment of the present invention, with reference to the drawing.

Embodiment 1

Figures 2A, 2B:
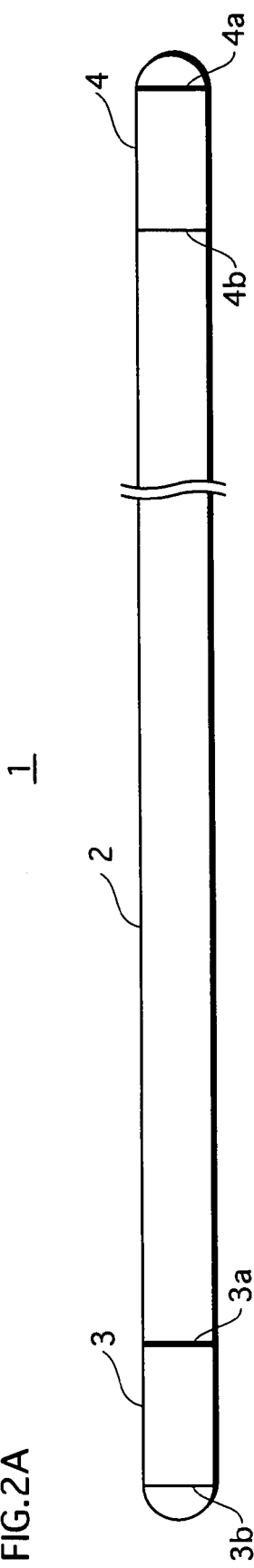
FIGS. 2A and 2B show a discharge lamp in Embodiment 1.

FIGS. 2A and 2B show a discharge lamp in Embodiment 1. FIG. 2A shows an outline of the discharge lamp. FIG. 2B is an enlarged cross section showing an end of the discharge lamp.

As shown in FIGS. 2A and 2B, a discharge lamp 1 in Embodiment 1 is an external electrode type discharge lamp that includes a glass bulb 2 and a pair of external electrodes 3 and 4 provided on the outer surface of the glass bulb 2 at both ends thereof.

The glass bulb 2 is made by sealing both ends of a glass tube that is made of borosilicate glass, and is, for example, 730 mm in length. The glass bulb 2 is annular in the cross-section, and is 4 mm in outer diameter, 3 mm in inner diameter, and 0.5 mm in thickness. The glass bulb 2 is not limited to the above-mentioned measurements. However, to make the discharge lamp 1 spindly, it is preferable that the glass bulb 2 is 1.8 mm to 6.0 mm in outer diameter (1.4 mm to 5.0 mm in inner diameter).

The glass bulb 2 is not limited to the borosilicate glass, but may be made of, for example, a lead glass, a lead-free glass, or a soda glass. When any of these materials is used, the start-up characteristics in dark surrounding is improved for the following reasons. That is to say, these glasses contain much alkaline metal oxide such as sodium oxide ($Na_2O$). When sodium oxide is contained in the material of the glass bulb, the sodium (Na) component melts into the inner space of the glass bulb with time. Since the sodium has low electronegativity, it is considered that the sodium having melted into the inner space of the glass bulb near the ends thereof contributes to the improvement in the start-up characteristics in dark surrounding.

Especially in the external electrode type phosphor lamps, it is preferable that the material of the glass bulb contains 3 mol % to 20 mol % of alkaline metal oxide.

For example, when the alkaline metal oxide is sodium oxide, it is preferable that the material of the glass bulb contains 5 mol % to 20 mol % of sodium oxide. Otherwise, the following problems are expected. When the glass material contains less than 5 mol % of sodium oxide, it is highly possible that the start-up in dark surrounding takes more than one second (in other words, when the glass material contains 5 mol % or more of sodium oxide, it is highly possible that the start-up in dark surrounding takes one second or less). Conversely, when the glass material contains more than 20 mol % of sodium oxide, a long hours of use makes the glass bulb white in color, resulting in reduction of brightness or reduction of strength of the glass bulb itself.

Furthermore, when the environment-friendliness is taken into account, it is preferable that the glass bulb is made of lead-free glass. It should be noted here that the lead-free glass may take in lead as impurity during the manufacturing process. For this reason, a glass that contains 0.1 wt % or less of lead may be defined as the lead-free glass.

A protection layer 5 is formed on the inner surface of the glass bulb 2. The inner surface of the protection layer 5 is covered with a phosphor layer 6.

The protection layer 5 is made of, for example, yttrium oxide ($Y_2O_3$). The protection layer 5 has a role of protecting the inner surface of the glass bulb 2 from ion bombardments so as not to have holes therein. It should be noted here that the protection layer 5 is not limited to the above-described construction, but may be made of silica ($SiO_2$) or alumina ($Al_2O_3$). The protection layer 5 made of yttrium oxide or silica makes it difficult for mercury to attach to the surface thereof, suppressing the consumption of mercury. The protection layer 5 is not indispensable for the present invention, and the glass bulb 2 may be constructed without the protection layer 5.

The phosphor layer 6 is made of, for example, a rare-earth phosphor that is a mixture of: red phosphor ($Y_2O_3:Eu^{3+}$); green phosphor ($LaPO_4:Ce^{3+}, Tb^{3+}$); and blue phosphor ($BaMg_2Al_{16}O_{27}:Eu^{2+}$) It should be noted here that the phosphor layer 6 is not limited to the above-described construction.

The inner space of the glass bulb 2 is filled with approximately 2000 μg of mercury and a neon-argon mixture gas (Ne: 90%+Ar: 10%) of approximately 7 kPa (20° C.) as a rare gas. It should be noted here that the constructions of mercury and rare gas are not limited to the above-described ones. For example, the inner space of the glass bulb 2 may be filled with a neon-krypton mixture gas (Ne: 95%+Kr: 5%) as a rare gas.

Figure 3:
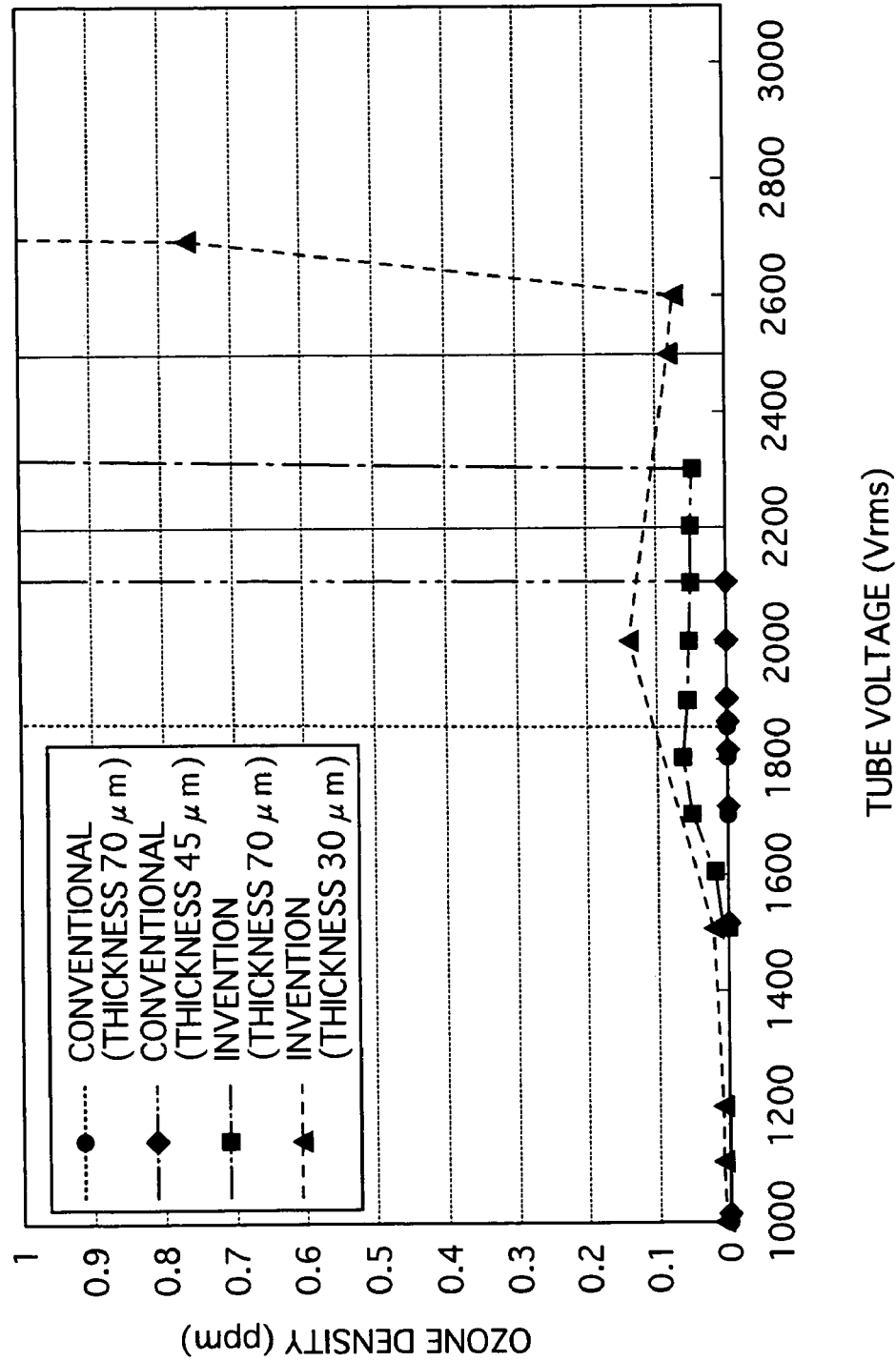
FIG. 3 shows relationships between the thickness of the external electrodes and the amount of generated ozone.
Figure 4A:
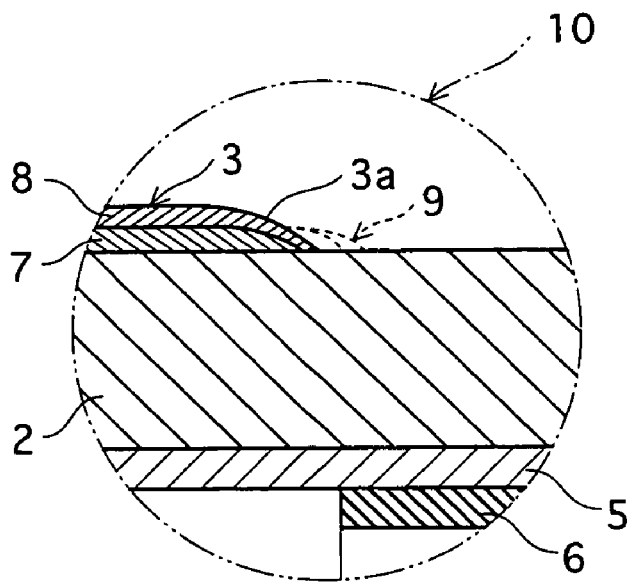
FIGS. 4A and 4B show the corona discharge.
Figure 4B:
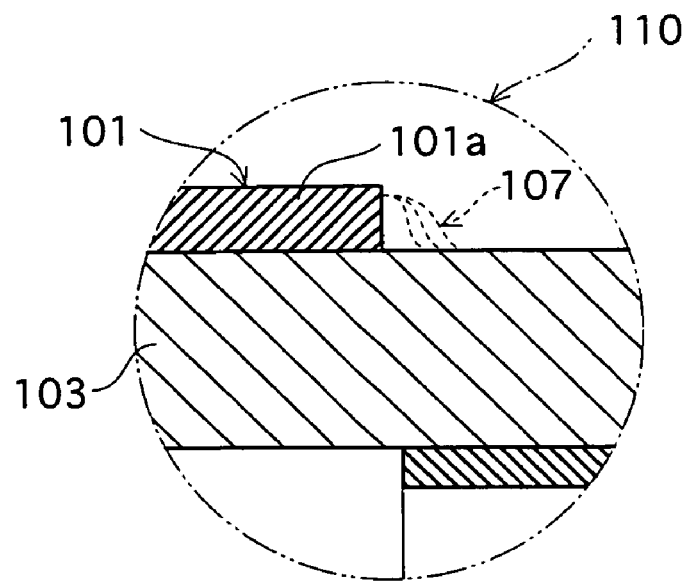
Figure 5:
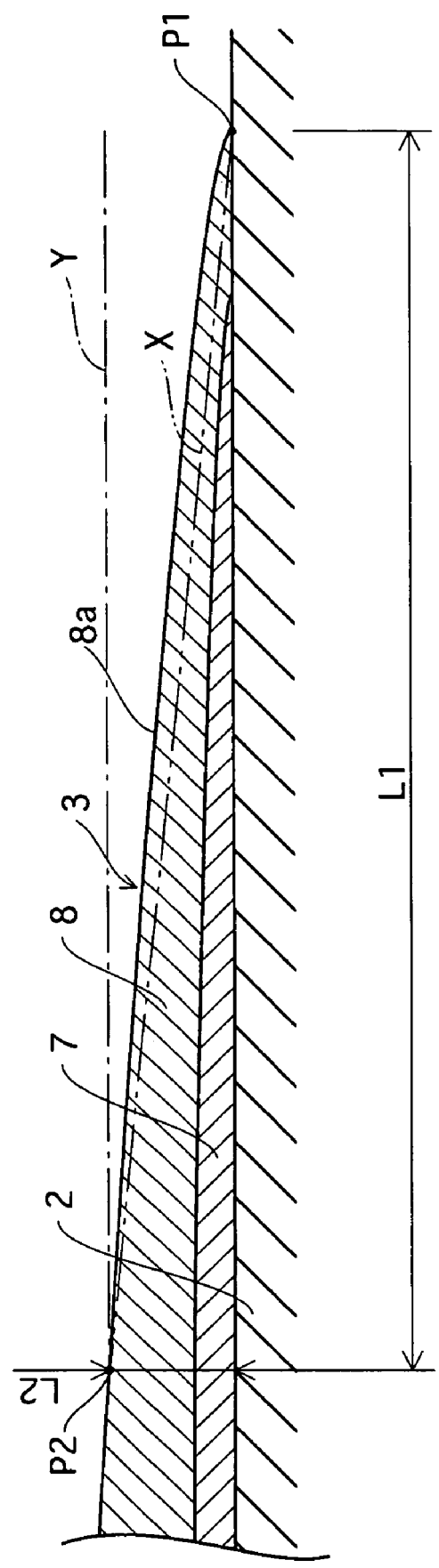
FIG. 5 is an enlarged view of an end portion of an external electrode.

FIG. 3 shows relationships between the thickness of the external electrodes and the amount of generated ozone. FIGS. 4A and 4B show the corona discharge. FIG. 4A is an enlarged view of a portion 10 shown in FIG. 2B, enclosed by a chain double-dashed line. FIG. 4B is an enlarged view of a portion 110 shown in FIG. 1, enclosed by a chain double-dashed line. In FIG. 4B, the insulating members 104 and 105 are omitted. FIG. 5 is an enlarged view of an end portion of an external electrode.

As shown in FIG. 2B, each of external electrodes 3 and 4 is cylindrical, has openings at its ends opposite to each other in the cylinder axis direction, and is composed of an electrode body layer 7 and a coating layer 8. It should be noted here that the external electrodes 3 and 4 may further include one or more layers other than the electrode body layer 7 and the coating layer 8.

The external electrodes 3 and 4 are 20 μm in the maximum thickness D1, and the thickness of end portions 3a, 3b, 4a and 4b of the external electrodes 3 and 4, namely the thickness of the end portions opposite to each other in the cylinder axis direction becomes smaller towards the ends of the external electrodes, respectively. The external electrodes 3 and 4 are substantially uniform in thickness except for the end portions 3a, 3b, 4a and 4b and the vicinities thereof.

Here, the maximum thickness of the external electrodes means the maximum thickness of the portions where the thickness is substantially uniform. That is to say, it is the maximum thickness of the portions that cover the outer surface of the glass bulb to generate a discharge in the internal space of the glass bulb. If, for example, projections are provided on the external electrodes for power feeding, the maximum thickness of the external electrodes does not include the thickness of the projections.

Meanwhile, general external electrode type discharge lamps are designed that the tube voltage is in a range of 2000 Vrms to 2200 Vrms. As a result, if ozone is not generated even at a tube voltage of 2200 Vrms, it is estimated that ozone is difficult to be generated.

However, as shown in FIG. 3, in a conventional external electrode type discharge lamp 100 with external electrodes 101 and 102 being 70 μm in thickness, ozone is generated at around a point where the tube voltage exceeds 1800 Vrms. Also, in the conventional external electrode type discharge lamp 100 with external electrodes 101 and 102 being 45 μm in thickness, ozone is generated at around a point where the tube voltage exceeds 2100 Vrms.

On the other hand, in the discharge lamp 1 of the present invention with the external electrodes 3 and 4 being 70 μm in thickness, ozone is not generated until the tube voltage reaches 2300 Vrms. Also, in the discharge lamp 1 of the present invention with the external electrodes 3 and 4 being 30 μm in thickness, ozone is not generated even when the tube voltage is higher than 2500 Vrms.

As shown in FIG. 4B, in the conventional external electrode type discharge lamp 100, the end portions 103a and 103b do not become smaller in thickness towards the ends of the external electrodes, and the difference in level (height) between the glass bulb 103 and the end portion 103a or between the glass bulb 103 and the end portion 103b is large even at each end of the end portions, which becomes a cause of a corona discharge 107 and makes the corona discharge 107 easy to occur.

On the other hand, as shown in FIG. 4A, in the discharge lamp 1 in Embodiment 1, the thickness of the end portions 3a, 3b, 4a and 4b of the external electrodes 3 and 4 becomes smaller towards the ends of the external electrodes, that is to say, the difference in level between the glass bulb and the end portions of the external electrodes is small at the ends. This makes it difficult for a corona discharge 9 to occur.

In the discharge lamp 1 of the present invention with the external electrodes 3 and 4 being larger than 70 μm in thickness, ozone may be generated before the tube voltage reaches 2200 Vrms even with such a construction in which the thickness of the end portions 3a, 3b, 4a and 4b of the external electrodes 3 and 4 becomes smaller towards the ends of the external electrodes.

To summarize the discussion up to now, to suppress the generation of ozone, it is required that the maximum thickness of the external electrodes 3 and 4 is 70 μm or less, and that the thickness of the end portions 3a, 3b, 4a and 4b becomes smaller towards the ends of the external electrodes. Furthermore, to give a design margin to the lamp, it is preferable that ozone is not generated even if the tube voltage exceeds 2500 Vrms. It is more preferable that the maximum thickness of the external electrodes 3 and 4 is 30 μm or less. It should be noted here that it was found that it is difficult in the actuality to form the external electrodes 3 and 4 having smaller than 5 μm in thickness.

In the discharge lamp 1 in Embodiment 1, each of the end portions 3a, 3b, 4a and 4b is an end portion of the external electrode 3 or 4, where the end portions 3a, 3b, 4a and 4b have the same length as the maximum thickness D1 of the external electrodes 3 and 4, and the length is also defined as a distance L1 from a position P1 that is an end position of the external electrodes 3 and 4, as shown in FIG. 5.

As shown in FIG. 5, in a transverse sectional view of the end portion 3a, 3b, 4a or 4b of the external electrodes 3 and 4 that is cut by a plane including the cylinder axis of the external electrode 3 or 4, it is preferable that a trajectory of a ridge line 8a representing the outer surface of the external electrode 3 or 4 is in a space between a trajectory X (a straight line connecting the position P1 and a position P2, which is a point at the intersection of the trajectory 8a with a line that extends from the position on the lower surface that is away from the position P1 by the distance L1, in a direction perpendicular to the lower surface line) and a trajectory Y which is expected to extend on presumption that the thickness of the external electrodes 3 and 4 keeps to be uniform from the position P2 to the end position, and it is preferable that the trajectory of the ridge line 8a expands towards the trajectory Y to draw a shape of, for example, a beak of a bird, or a gentle curvature. The trajectory 10 being formed in this way also contributes to the suppression of generation of ozone.

It is preferable that a thickness L2 of the external electrode at the position P2 is larger than one tenth of the maximum thickness D1 (=L1) and is smaller than the maximum thickness D1. If the thickness L2 of the external electrode at the position P2 is larger than one tenth of the maximum thickness D1, the external electrodes 3 and 4 are resistant to removal. If the thickness L2 of the external electrode at the position P2 is smaller than the maximum thickness D1, the corona discharge is difficult to occur. In the case of the discharge lamp 1 in Embodiment 1, the maximum thickness D1 is 20 μm, and thus the thickness L2 of the external electrode at the position P2 is 2 μm.

The external electrodes 3 and 4 are formed to cover the minimum area of the glass bulb 2. That is to say, the external electrodes 3 and 4 are not formed at the end tips of the glass bulb 2. This construction reduces the cost of the material, and enables the discharge lamp to have an excellent appearance.

As shown in FIGS. 2B and 5, the external electrodes 3 and 4 each include the electrode body layer 7 formed on the outer surface of the glass bulb 2 and the coating layer 8 formed on the electrode body layer 7.

The thickness D2 of the electrode body layer 7 is approximately 3.0 μm. In the present invention, the thickness of the electrode body layer 7 means an average thickness of the entire electrode body layer 7.

The main constituent of the electrode body layer 7 is silver or copper. It should be noted here that "the main constituent of the electrode body layer 7 being silver or copper" includes a meaning that the main constituent of the electrode body layer 7 is an alloy of silver and copper. Here, the main constituent means a constituent that occupies the most percentage of the composition and greatly affects the property of the composition. Accordingly, a compound other than silver or copper may be included as an additive.

To enhance the bonding force of the electrode body layer 7 to the glass bulb 2, a glass frit, for example, may be added to the electrode body layer 7. For example, if a glass frit containing 1.0 wt % to 5.0 wt % of bismuth (Bi) is added, the bonding force of the electrode body layer 7 to the glass bulb 2 is enhanced by the anchor effect of the glass frit. Other than this, ethylcellulose, for example, may be used as the additive.

On the other hand, to provide an environment-friendly discharge lamp, it is preferable that materials as environmental loads such as lead, antimony, arsenic, and gallium are not added.

When the main constituent of the electrode body layer 7 is silver, the external electrodes 3 and 4 have high electric conductivity because silver is small in electric resistance. Also, when the main constituent of the electrode body layer 7 is silver, the sintering can be performed in the air during the electrode body layer forming process. That is to say, since silver is resistant to oxidation, there is no need to perform the sintering in the atmosphere of nitrogen, argon or the like. This increases the productivity of the discharge lamp 1.

Copper is, only next to silver, small in electric resistance. As a result, the external electrodes 3 and 4 also have high electric conductivity when the main constituent of the electrode body layer 7 is copper.

FIG. 6 shows properties of the electrode body layer. As for the evaluation of the "sulfurization", "○" denotes that it rarely occurs, "Δ" denotes that it sometimes occurs, and "x" denotes that it occurs.

As for the evaluation of the "solder wettability", "○" denotes that it is excellent, "Δ" denotes that it is excellent to a certain degree, and "x" denotes that it is bad. As for the evaluation of the "silver transfer", "○" denotes that it never occurs, "Δ" denotes that it sometimes occurs, and "x" denotes that it always occurs. As for the evaluation of the "conductivity", "○" denotes that the electric resistance value is approximately the same as that of silver, "Δ" denotes that the electric resistance value is approximately 10 to 100 times the electric resistance value of silver, and "x" denotes that the electric resistance value is more than 100 times the electric resistance value of silver.

Gold is less appropriate than silver or copper as the main constituent of the electrode body layer 7 since it has low electric conductivity.

The electrode body layer 7 is formed by applying silver paste onto the outer surface of the glass bulb 2 by the known screen printing method, and then sintering the paste. It should be noted here that the electrode body layer 7 may be formed by another method such as the gravure printing method or the dipping method.

The coating layer 8 is formed on the outer surface of the electrode body layer 7, and has approximately 7.0 μm of thickness D3. In the present invention, the thickness of the coating layer 8 means an average thickness of the entire coating layer 8.

The main constituent of the coating layer 8 is solder. The solder constituting the coating layer 8 is composed of: 95.2 wt % of tin; 3.8 wt % of silver; and 1.0 wt % of copper.

Since the above-described solder of the coating layer 8 in the present embodiment contains silver, the "silver transfer", a transfer of silver from the electrode body layer 7, is difficult to occur. It should be noted here that to make "silver transfer" difficult to occur, it is preferable that the content of silver is in the range of 1.0 wt % to 8.0 wt %.

The composition of solder constituting the coating layer 8 is not limited to the above-described one. The solder may contain, for example, at least one of bismuth, zinc, and lead. However, to provide an environment-friendly discharge lamp, it is preferable that materials as environmental loads such as lead and antimony are not contained. Further, the coating layer 8 may be made of a material other than solder. For example, the coating layer 8 may be a nickel layer made of electroless plating.

The coating layer 8 can be formed by the known dipping method (see, for example, Japanese Laid-Open Patent Application No. 2004-146351). In a brief description, the coating layer 8 can be formed by dipping an end of the glass bulb 2 into melted solder contained in a melting basin.

In general, in the air, silver is easy to be sulfurized, and copper is easy to be oxidized. After sulfurization or oxidization occurs, silver or copper has a larger electric resistance than before. Accordingly, if the electrode body layer 7 is exposed to the air, the conductivity of the electrode body layer 7 is decreased. However, according to Embodiment 1 of the present invention, the electrode body layer 7 is difficult to be exposed to the air since the electrode body layer 7 is covered with the coating layer 8. This construction makes the sulfurization or oxidization of silver or copper difficult to occur. As a result, the conductivity of the external electrodes 3 and 4 in Embodiment 1 is difficult to be decreased.

When the main constituent of the electrode body layer 7 is silver, the external electrodes 3 and 4 have high electric conductivity because silver is small in electric resistance. Also, when the main constituent of the electrode body layer 7 is silver, the sintering can be performed in the air during the electrode body layer forming process. That is to say, since silver is resistant to oxidation, there is no need to perform the sintering in the atmosphere of nitrogen, argon or the like. This increases the productivity of the discharge lamp 1.

To make the sulfurization or oxidization of silver or copper difficult to occur, it is preferable that the entire outer surface of the electrode body layer 7 is covered with the coating layer 8. However, for some production-related or design-related reasons, part of the electrode body layer 7 may be exposed to the air in so far as the exposed part is such an area that does not affect much the conductivity of the external electrodes 3 and 4.

The outer surface of the electrode body layer 7, which is to be covered with the coating layer 8, is polished. The polishing enhances the bonding force of the electrode body layer 7 to the coating layer 8.

Figure 7A:
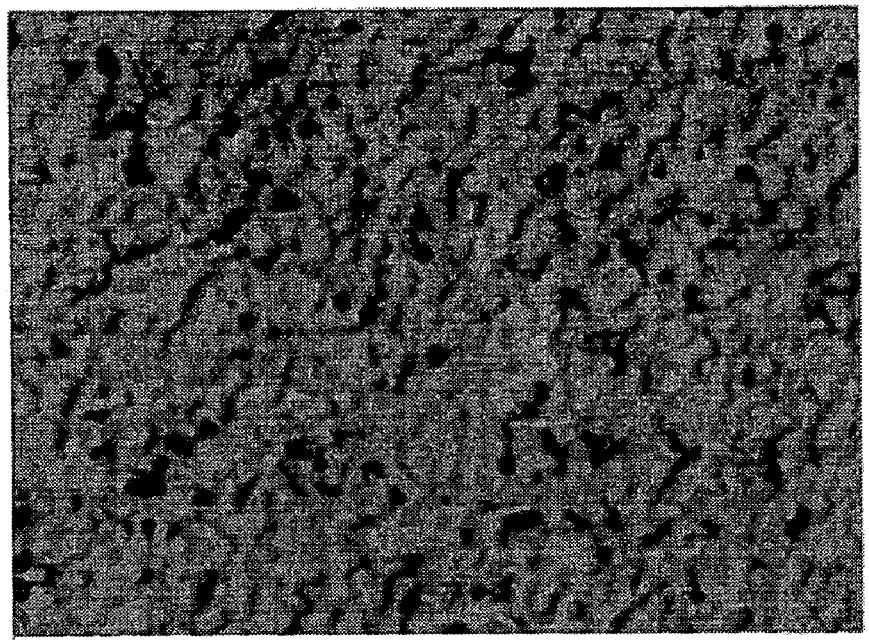
FIGS. 7A and 7B show the states of the outer surface of the electrode body layer.
Figure 7B:
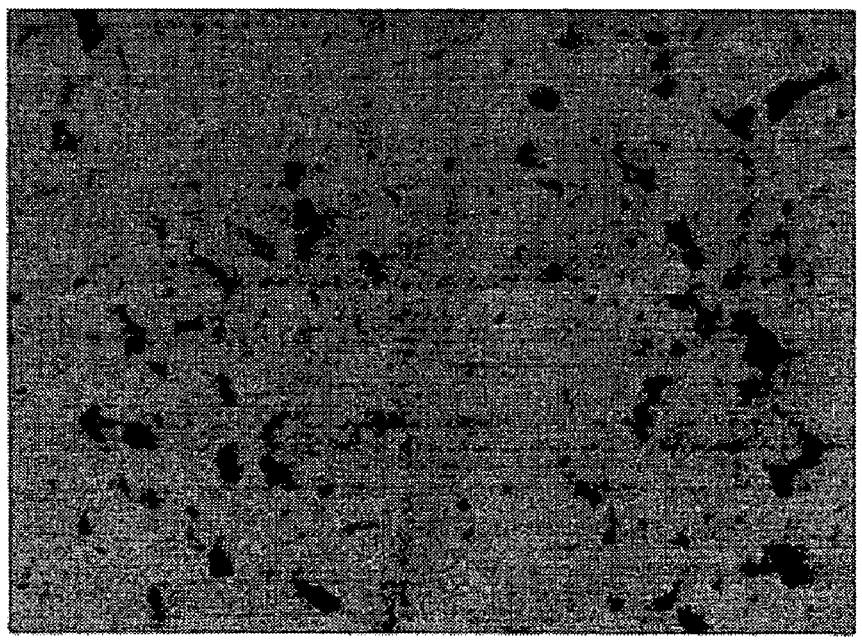

FIGS. 7A and 7B show the states of the outer surface of the electrode body layer. FIG. 7A shows the state of the outer surface of the electrode body layer before polishing. FIG. 7B shows the state of the outer surface of the electrode body layer after polishing.

With FIGS. 7A and 7B that are photographs taken by an electron microscope, it is confirmed that the outer surface of the electrode body layer 7 has more flat areas after polishing than before polishing.

To improve the bonding force of the electrode body layer 7 with the coating layer 8, it is preferable to improve the wettability of the solder. The electrode body layer 7 after polishing has many flat areas on the outer surface, and thus is broad in the area at which the electrode body layer 7 is in contact with the coating layer 8, which makes the wettability of solder excellent. Accordingly, this improves the bonding force of the electrode body layer 7 with the coating layer 8.

The polishing of the outer surface of the electrode body layer 7 is performed by, for example, a method in which the surface is polished by a metal abrasive that contains, as a compound, a mineral such as alumina, or a method in which the surface is polished by a rotating rubber roller. As another method for improving the bonding force of the coating layer 8, such an additive that enhances the bonding force of the coating layer 8 may be added to the electrode body layer 7.

The discharge lamp 1 in Embodiment 1 is operated at 40 kHz to 100 kHz of lighting frequency and with 3.0 mA to 8.0 mA of lamp current.

Up to now, the discharge lamp in Embodiment 1 has been described specifically. However, the discharge lamp in Embodiment 1 is not limited to this, but may be modified in a variety of ways. The following describes some modifications to the discharge lamp in Embodiment 1.

1. Modification 1 to Embodiment 1

Figure 8:
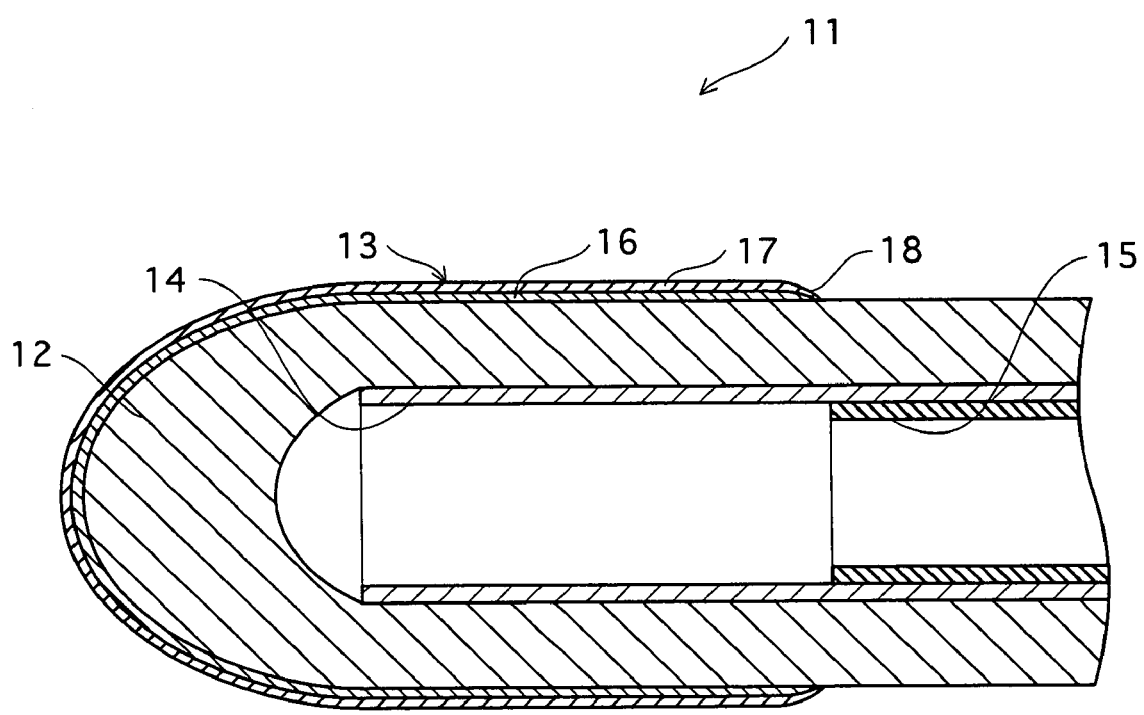
FIG. 8 is an enlarged cross section showing an end of the discharge lamp in Modification 1 to Embodiment 1.

FIG. 8 is an enlarged cross section showing an end of the discharge lamp in Modification 1 to Embodiment 1. As shown in FIG. 8, a discharge lamp 11 in Modification 1 to Embodiment 1 includes a glass bulb 12 and a pair of cap-shaped external electrodes 13 provided at both ends of the glass bulb 12. A protection layer 14 is formed on the inner surface of the glass bulb 12. The inner surface of the protection layer 14 is covered with a phosphor layer 15. The inner space of the glass bulb 12 is filled with mercury and a rare gas.

In each external electrode 13, an end portion 18, which is an end on the opening side, becomes smaller in thickness towards the end of the external electrode. Also, as shown in FIG. 8, in a transverse sectional view of the end portion 18, the ridge line of the end portion 18 draws a shape of, for example, a beak of a bird. On the other hand, the external electrode is approximately uniform in thickness, except for the end portion 18.

As is the case with the external electrodes 3 and 4 of the discharge lamp 1 in Embodiment 1, the external electrode 13 of the discharge lamp 1 in Modification 1 is 20 μm or less in the maximum thickness, and is composed of an electrode body layer 16 formed on the outer surface of the glass bulb 12, and a coating layer 17 formed on the electrode body layer 16. The electrode body layer 16 and coating layer 17 may be formed by, for example, the dipping method.

2. Modification 2 to Embodiment 1

Figure 9:
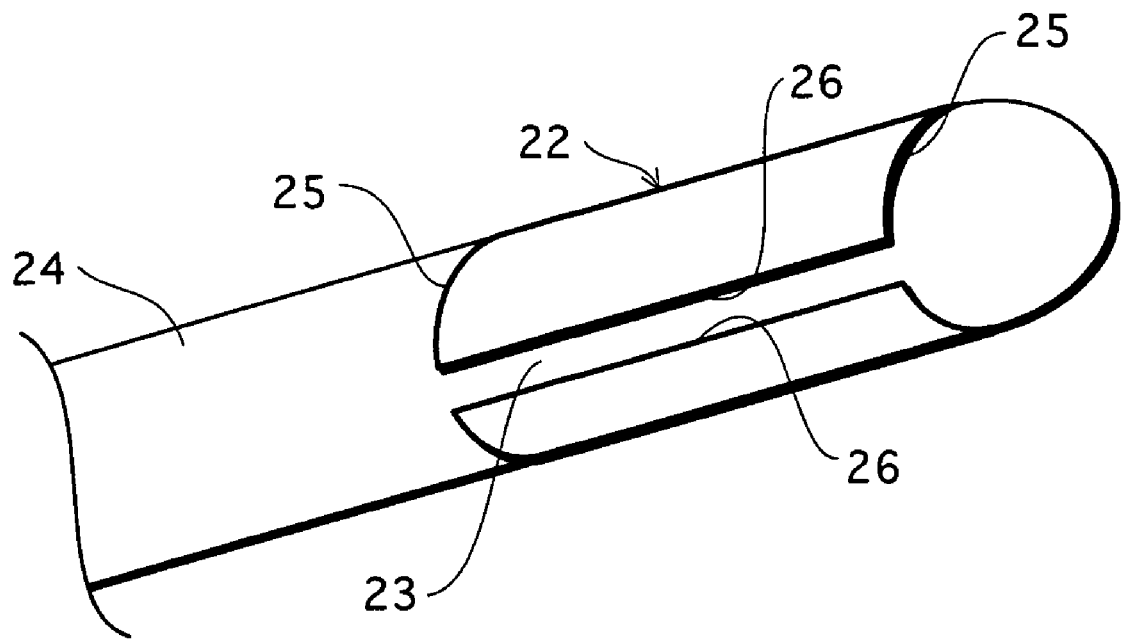
FIG. 9 is an outline perspective view of an end of the discharge lamp in Modification 2 to Embodiment 1.

FIG. 9 is an outline perspective view of the discharge lamp in Modification 2 to Embodiment 1. As shown in FIG. 9, a discharge lamp 21 in Modification 2 includes an external electrode 22 that is in the shape of a cylinder including a slit 23. The external electrode 22 is in the shape of a character "C" in the cross-section. The external electrodes 22 are provided on the outer surface of the glass bulb 24 at the ends thereof.

Each external electrode 22 includes end portions 25 and 26, where the end portions 25 are opposite to each other in the cylinder axis direction, and the end portions 26 face each other with the slit 23 in between. The thickness of the end portions 25 opposite to each other in the cylinder axis direction becomes smaller towards the ends of the external electrodes. The thickness of the end portions 26 facing each other with the slit 23 in between also becomes smaller towards the slit 23.

As is the case with the external electrodes 3 and 4 of the discharge lamp 1 in Embodiment 1, the external electrodes 22 of the discharge lamp 21 in Modification 2 is 20 μm or less in the maximum thickness, and is composed of an electrode body layer (not illustrated) formed on the outer surface of the glass bulb 24, and a coating layer (not illustrated) formed on the electrode body layer.

3. Modification 3 to Embodiment 1

Figure 10A:
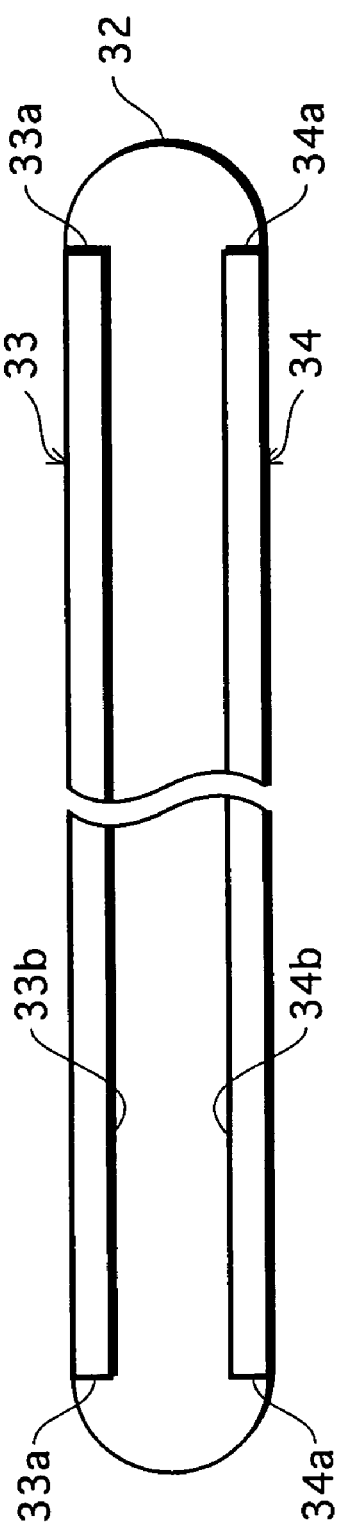
FIGS. 10A and 10B show an outline of the discharge lamp in Modification 3 to Embodiment 1.
Figure 10B:
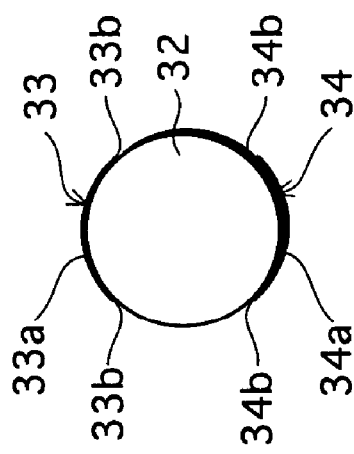

FIGS. 10A and 10B show an outline of the discharge lamp in Modification 3 to Embodiment 1. FIG. 10A is a front view, and FIG. 10B is a side view. As shown in FIGS. 10A and 10B, a discharge lamp 31 in Modification 3 includes a first external electrode 33 that is provided on the outer surface of a glass bulb 32, is approximately arc in the cross section, and extends in the longitudinal direction of the glass bulb 32. The discharge lamp 31 also includes a second external electrode 34 that is provided on the outer surface of a glass bulb 32, and is in the same shape as the first external electrode 33.

The first and second external electrodes 33 and 34 include end portions 33a, 33b, 34a, and 34b, where the end portions 33a and 34a are at ends in the cylinder axis direction, and the end portions 33b and 34b are at ends in the circumferential direction. The thickness of the end portions 33a and 34a becomes smaller towards the ends of the external electrodes. The thickness of the end portions 33b and 34b also becomes smaller towards the ends of the external electrodes.

As is the case with the external electrodes 3 and 4 of the discharge lamp 1 in Embodiment 1, the external electrodes 33 and 34 of the discharge lamp 31 in Modification 3 is 20 μm or less in the maximum thickness, and is composed of an electrode body layer (not illustrated) formed on the outer surface of the glass bulb 32, and a coating layer (not illustrated) formed on the electrode body layer.

4. Modification 4 to Embodiment 1

Figure 11:
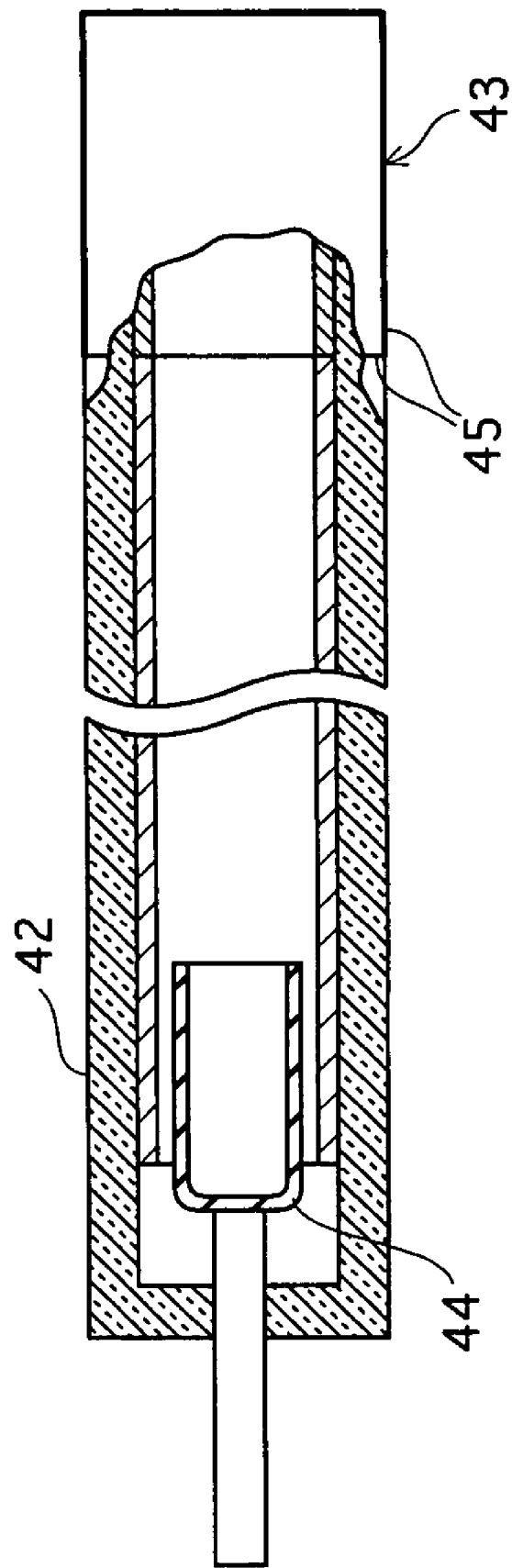
FIG. 11 shows an outline of the discharge lamp in Modification 4 to Embodiment 1.

FIG. 11 shows an outline of the discharge lamp in Modification 4 to Embodiment 1. A discharge lamp 41 in Modification 4 includes an external electrode 43 at one end of a glass bulb 42, and an internal electrode 44 at the other end of the glass bulb 42, where the internal electrode 44 is provided within the glass bulb 42.

The thickness of an end portion 45 of the external electrode 43 becomes smaller towards the end of the external electrode. The internal electrode 44 may take any shape.

As is the case with the external electrodes 3 and 4 of the discharge lamp 1 in Embodiment 1, the external electrode 43 of the discharge lamp 41 in Modification 4 is 20 μm or less in the maximum thickness, and is composed of an electrode body layer (not illustrated) formed on the outer surface of the glass bulb 42, and a coating layer (not illustrated) formed on the electrode body layer.

5. Modification 5 to Embodiment 1

In the discharge lamp 1 in Embodiment 1, the external electrodes 3 and 4 are provided on the outer surface of the glass bulb 2 at both ends. As another construction, an external electrode (hereinafter, referred to as a third external electrode) may be provided on the outer surface of the glass bulb 2 at approximately the center thereof in the longitudinal direction of the glass bulb 2, in addition to the external electrodes 3 and 4. In this case, the third external electrode is connected to a ground line (that is to say, is grounded).

In the present construction of the discharge lamp, it is preferable that the thickness of not only the pair of external electrodes but the third external electrode becomes smaller towards the ends of the external electrodes.

As is the case with the external electrodes 3 and 4 of the discharge lamp 1 in Embodiment 1, both the pair of external electrodes and the third external electrode in Modification 5 are 20 μm or less in the maximum thickness, and are each composed of an electrode body layer (not illustrated) formed on the outer surface of the glass bulb, and a coating layer (not illustrated) formed on the electrode body layer.

6. Modification 6 to Embodiment 1

The discharge lamp in Embodiment 1 is not limited in shape to a straight tube, but may be a curved tube that is in the shape of, for example, character "U". The discharge lamp in Embodiment 1 may not include a phosphor layer.

In the discharge lamp in Embodiment 1, the thickness may not necessarily become smaller for the entire length of the end portions of the external electrodes towards the ends of the external electrodes, but it may only be necessary that the thickness becomes smaller for at least part of the length of the end portions of the external electrodes. Accordingly, in the case of the discharge lamp 1 in Embodiment 1, for example, only the end portions 3a and 4a facing each other may become smaller in thickness towards the ends of the external electrodes. Alternatively, only the end portions 3a and 3b of the external electrode 3 may become smaller in thickness towards the ends of the external electrodes. It is preferable, however, that portions of the end portions 3a, 3b, 4a, and 4b where the corona discharge is more apt to occur become smaller in thickness towards the ends of the external electrodes.

Embodiment 2

As is the case with the cold-cathode fluorescent lamp, the external electrode type discharge lamp is suitable for a spindly body compared with the hot-cathode fluorescent lamp. For this reason, the external electrode type discharge lamp is, for example, suitable for use as a light source in a backlight unit for a liquid crystal display apparatus which is demanded to be thin (small size).

The external electrode type discharge lamp has external electrodes disposed on the outer surface of a glass bulb at both ends thereof, and a phosphor layer is formed on the inner surface of the glass bulb. To light the external electrode type discharge lamp, first a discharge is caused to excite mercury, which is enclosed in the glass bulb. The excited mercury emits ultraviolet light which is then converted into visible light by the phosphor layer, and the visible light is emitted from the lamp.

Here, it has been known that with a construction in which the phosphor layer is provided on the inner surface of the glass bulb in areas that correspond to the external electrodes, when the discharge is caused, mercury consumption occurs and mercury enclosed in the glass bulb is adsorbed on the phosphor layer, and mercury, which contributes to the lighting decreases in amount, resulting in a shorter lamp life.

To cope with this problem, Japanese Laid-Open Patent Application No. 2004-22209 proposes a technology in which the phosphor layer is not provided on the inner surface of the glass bulb in areas that correspond to the external electrodes. This technology enables the mercury consumption to be suppressed.

However, the external electrode type discharge lamp having the above-described construction has a problem regarding the start-up characteristics in dark surrounding that a discharge is delayed in dark surrounding, causing the start-up to take time, and the lighting is delayed after a voltage application.

It might be possible to improve the start-up characteristics in dark surrounding by arranging an electron emitting material in the vicinity of the electrodes. This method however will require high costs for the material and the manufacturing.

Embodiment 2 aims to provide an external electrode type discharge lamp in which the start-up characteristics in dark surrounding have been improved at a low cost.

FIGS. 12A and 12B show a discharge lamp in Embodiment 2. FIG. 12A shows an outline of the discharge lamp. FIG. 12B is an enlarged cross section showing an end of the discharge lamp.

As shown in FIGS. 12A and 12B, a discharge lamp 1001 in Embodiment 2 is an external electrode type discharge lamp that includes a glass bulb 1002 and a pair of external electrodes 1003 and 1004 provided on the outer surface of the glass bulb 1002 at both ends thereof.

The glass bulb 1002 is made by sealing both ends of a glass tube that is made of borosilicate glass, and is, for example, 730 mm in length. The glass bulb 1002 is annular in the cross section, and is 4.0 mm in outer diameter, 3.0 mm in inner diameter, and 0.5 mm in thickness. The glass bulb 1002 is not limited to the above-mentioned measurements. However, to make the discharge lamp 1001 spindly, it is preferable that the glass bulb 1002 is 1.8 mm to 6.0 mm in outer diameter (1.4 mm to 5.0 mm in inner diameter).

The glass bulb 1002 is not limited to the borosilicate glass, but may be made of, for example, a lead glass, a lead-free glass, or a soda glass. When any of these materials is used, the start-up characteristics in dark surrounding is improved for the following reasons. That is to say, these glasses contain much alkaline metal oxide such as sodium oxide ($Na_2O$). When sodium oxide is contained in the material of the glass bulb, the sodium (Na) component melts into the inner space of the glass bulb with time. Since the sodium has low electronegativity, it is considered that the sodium having melted into the inner space of the glass bulb near the ends thereof contributes to the improvement in the start-up characteristics in dark surrounding.

Especially in the external electrode type phosphor lamps, it is preferable that the material of the glass bulb contains 3 mol % to 20 mol % of alkaline metal oxide.

For example, when the alkaline metal oxide is sodium oxide, it is preferable that the material of the glass bulb contains 5 mol % to 20 mol % of sodium oxide. Otherwise, the following problems are expected. When the glass material contains less than 5 mol % of sodium oxide, it is highly possible that the start-up in dark surrounding takes more than one second (in other words, when the glass material contains 5 mol % or more of sodium oxide, it is highly possible that the start-up in dark surrounding takes one second or less). Conversely, when the glass material contains more than 20 mol % of sodium oxide, a long hours of use makes the glass bulb white in color, resulting in reduction of brightness or reduction of strength of the glass bulb itself.

Furthermore, when the environment-friendliness is taken into account, it is preferable that the glass bulb is made of lead-free glass. It should be noted here that the lead-free glass may take in lead as impurity during the manufacturing process. For this reason, a glass that contains 0.1 wt % or less of lead may be defined as the lead-free glass.

A protection layer 1005 is formed on the inner surface of the glass bulb 1002 starting from a position C' that corresponds to an end of an external electrode 1003, the end being on the glass bulb end side. The inner surface of the protection layer 1005 is covered with a phosphor layer 1006 that starts from a position A'.

The protection layer 1005 is made of, for example, yttrium oxide ($Y_2O_3$). The protection layer 1005 has a role of protecting the inner surface of the glass bulb 1002 from ion bombardments, preventing a phenomenon called pinhole from occurring, where the pinhole is a phenomenon in which holes are made in the inner surface of the glass bulb 1002 by the ion bombardments. It should be noted here that the protection layer 1005 is not limited to the above-described construction, but may be made of silica ($SiO_2$) or alumina ($Al_2O_3$). The protection layer 1005 made of yttrium oxide or silica makes it difficult for mercury to attach to the surface thereof, suppressing the consumption of mercury. The protection layer 1005 is not indispensable for the present invention, and the glass bulb 1002 may be constructed without the protection layer 1005.

The phosphor layer 1006 is made of, for example, a rare-earth phosphor that is made by mixing: red phosphor ($Y_2O_3$:$Eu^{3+}$); green phosphor ($LaPO_4$:$Ce^{3+}$, $Tb^{3+}$); and blue phosphor ($BaMg_2Al_{16}O_{27}$:$Eu^{2+}$). It should be noted here that although the phosphor layer 1006 is not limited to the above-described construction, some phosphor particles need to include electron emitting atoms of at least one of elements such as barium (Ba), strontium (Sr), and yttrium (Y).

The inner space of the glass bulb 1002 is filled with approximately 2000 μg of mercury and a neon-argon mixture gas (Ne: 90%+Ar: 10%) of approximately 7 kPa (20° C.) as a rare gas. It should be noted here that the constructions of mercury and rare gas are not limited to the above-described ones. For example, the inner space of the glass bulb 1002 may be filled with a neon-krypton mixture gas (Ne: 95%+Kr: 5%) as a rare gas.

As shown in FIG. 12B, each of external electrodes 1003 and 1004 is composed of an electrode body layer 1007 formed on the outer surface of the glass bulb 1002, and a coating layer 1008 formed on the electrode body layer 1007.

The thickness of the electrode body layer 1007 is approximately 3.0 μm. The main constituent of the electrode body layer 1007 is silver or copper. It should be noted here that "the main constituent of the electrode body layer 1007 being silver or copper" includes a meaning that the main constituent of the electrode body layer 1007 is an alloy of silver and copper. Here, the main constituent means a constituent that occupies the most percentage of the composition and greatly affects the property of the composition. Accordingly, a compound other than silver or copper may be included as an additive.

To enhance the bonding force of the electrode body layer 1007 to the glass bulb 1002, a glass frit, for example, may be added to the electrode body layer 1007. For example, if a glass frit containing 1.0 wt % to 5.0 wt % of bismuth (Bi) is added, the bonding force of the electrode body layer 1007 to the glass bulb 1002 is enhanced by the anchor effect of the glass frit. Other than this, ethylcellulose, for example, may be used as the additive.

On the other hand, to provide an environment-friendly discharge lamp 1001, it is preferable that materials as environmental loads such as lead, antimony, arsenic, and gallium are not added.

When the main constituent of the electrode body layer 1007 is silver, the external electrodes 1003 and 1004 have high electric conductivity because silver is small in electric resistance. Also, when the main constituent of the electrode body layer 1007 is silver, the sintering can be performed in the air during the electrode body layer forming process. That is to say, since silver is resistant to oxidation, there is no need to perform the sintering in the atmosphere of nitrogen, argon or the like. This increases the productivity of the discharge lamp 1001.

Copper, only next to silver, is small in electric resistance. As a result, the external electrodes 1003 and 1004 also have high electric conductivity when the main constituent of the electrode body layer 1007 is copper.

The coating layer 1008 is formed on the outer surface of the electrode body layer 1007, and has approximately 7.0 μm of thickness. The main constituent of the coating layer 1008 is solder. The solder constituting the coating layer 1008 is composed of: 95.2 wt % of tin; 3.8 wt % of silver; and 1.0 wt % of copper.

Since the above-described solder of the coating layer 1008 in the present embodiment contains silver, the "silver transfer", a transfer of silver from the electrode body layer 1007, is difficult to occur. It should be noted here that to make "silver transfer" difficult to occur, it is preferable that the content of silver is in the range of 1.0 wt % to 8.0 wt %.

The composition of solder constituting the coating layer 1008 is not limited to the above-described one, but, for example, may contain at least one of bismuth, zinc, and lead. However, to provide an environment-friendly discharge lamp 1001, it is preferable that materials as environmental loads such as lead and antimony are not contained. Further, the coating layer 1008 may be made of a material other than solder. For example, the coating layer 1008 may be a nickel layer made of electroless plating.

In general, in the air, silver is easy to be sulfurized, and copper is easy to be oxidized. After sulfurization or oxidization occurs, silver or copper has a larger electric resistance than before. Accordingly, if the electrode body layer 1007 is exposed to the air, the conductivity of the electrode body layer 1007 is decreased. However, according to Embodiment 2 of the present invention, the electrode body layer 1007 is difficult to be exposed to the air since the electrode body layer 1007 is covered with the coating layer 1008. This construction makes the sulfurization or oxidization of silver or copper difficult to occur. As a result, the conductivity of the external electrodes 1003 and 1004 in Embodiment 2 is difficult to be decreased.

To make the sulfurization or oxidization of silver or copper difficult to occur, it is preferable that the entire outer surface of the electrode body layer 1007 is covered with the coating layer 1008. However, for some production-related or design-related reasons, part of the electrode body layer 1007 may be exposed to the air in so far as the exposed part is such an area that does not affect much the conductivity of the external electrodes 1003 and 1004. The external electrodes 1003 and 1004 are not limited to the above-described construction, but may have any construction.

The following discusses the forming position of the phosphor layer 1006. The inventors of the present invention found through keen studies that the start-up characteristics in dark surrounding are improved when the phosphor layer is provided inside the glass bulb at an area corresponding to the external electrodes. This is because with this construction, an application of a start-up voltage to an external electrode causes an electric field to be generated, then electrons are emitted by electron-emitting atoms within the phosphor layer, and the emitted electrons trigger a discharge.

In the glass bulb 1002 in Embodiment 2, the phosphor layer 1006 ends at a position A' that is away by a distance L' from a position B' that corresponds to an end of the external electrode 1003 on the glass bulb center side. That is to say, the phosphor layer 1006 extends from the position B', which corresponds to an end of the external electrode 1003 on the glass bulb center side, to the position A' by the distance L' towards the end of the glass bulb. This construction causes electrons to be emitted from a portion of the phosphor layer between positions A' and B', due to the electric field that is generated by the application of the start-up voltage, resulting in the improvement of the start-up characteristics in dark surrounding.

The following discusses the distance L'. When the distance L' is small, electrons are not emitted enough in amount to improve the start-up characteristics in dark surrounding. On the other hand, when the distance L' is large, mercury consumption occurs since mercury enclosed in the glass bulb is adsorbed on the phosphor layer, resulting in a shorter lamp life.

The inventors of the present invention found through experiments that it is preferable that the distance L' is in the range from 1 mm to 7 mm inclusive. The reason is that when the distance L' is smaller than 1 mm, electrons are not emitted enough in amount to improve the start-up characteristics in dark surrounding, when the distance L' is larger than 7 mm, mercury consumption occurs and makes the lamp life shorter.

The above-description is of the construction of the external electrode 1003 side. The construction of the external electrode 1004 side may be the same as the construction of the external electrode 1003 side. Alternatively, the external electrode 1004 side may have the construction in which the phosphor layer is formed starting from a position that corresponds to an end of the external electrode on the glass bulb center side. Since the discharge lamp 1001 is lighted by an alternate current, the start-up characteristics in dark surrounding are improved if at least one of the external electrode 1003 and the external electrode 1004 satisfies the above-described positional relationship between the phosphor layer and the external electrode.

Here, a production method for the discharge lamp 1001 in Embodiment 2 will be described briefly. First, a straight glass tube is prepared, and a protection layer is formed on the inner surface of the glass tube by a known method. Then a phosphor layer is formed on the protection layer by a known method. Unnecessary portions are removed from the formed phosphor layer.

The electrode body layer 1007 is formed by applying silver paste onto the outer surface of the glass bulb 1002 by the known screen printing method, and then sintering the paste. It should be noted here that the electrode body layer 1007 may be formed by another method such as the gravure printing method or the dipping method.

The coating layer 1008 can be formed by the known dipping method (see, for example, Japanese Laid-Open Patent Application No. 2004-146351). In a brief description, the coating layer 1008 can be formed by dipping an end of the glass bulb 1002 into melted solder contained in a melting basin. By coating the electrode body layer 1007 with the coating layer 1008 in this way, the external electrode 1003 is formed.

The external electrode 1003 is formed with adjustment such that the external electrode 1003 and the phosphor layer 1006 overlap each other by the distance L'.

As described above, according to the discharge lamp 1001 in Embodiment 2, the start-up characteristics in dark surrounding is improved only by adjusting the relative positions of the phosphor layer and the external electrode during the manufacturing process. This does not require specific material for improving the start-up characteristics in dark surrounding, is achieved with an easy manufacturing process, and is not expensive, thus enabling the start-up characteristics in dark surrounding to be improved at low cost.

In the above description, the phosphor layer is formed over the entire inner circumference of the glass bulb 1002 in areas that correspond to the external electrodes. However, the phosphor layer overlapping the external electrodes may not be formed over the entire inner circumference of the glass bulb 1002. It is only necessary that at least the phosphor layer enough in amount to improve the start-up characteristics in dark surrounding is present in the glass bulb 1002 in areas that correspond to the external electrodes.

Up to now, the discharge lamp in Embodiment 2 has been described specifically. However, the discharge lamp in Embodiment 2 is not limited to this, but may be modified in a variety of ways. The following describes some modifications to the discharge lamp in Embodiment 2.

1. Modification 1 to Embodiment 2

Figure 13:
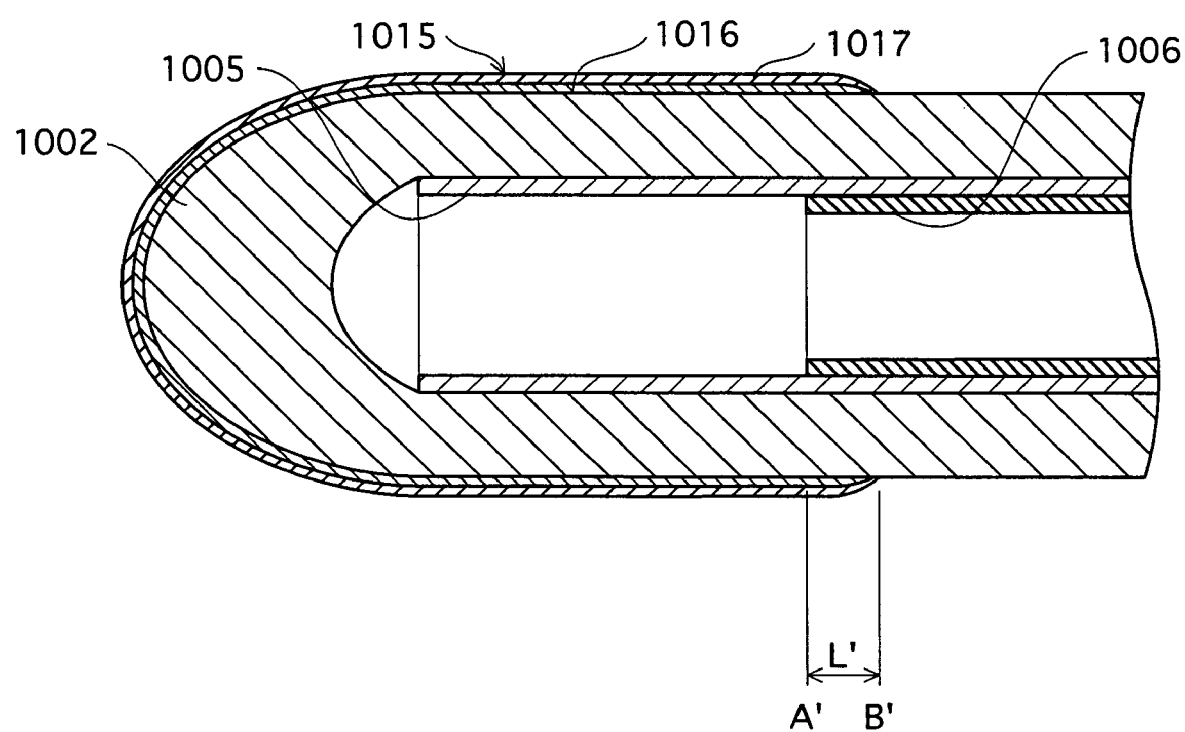
FIG. 13 is an enlarged cross section showing an end of the discharge lamp in Modification 1 to Embodiment 2.

FIG. 13 is an enlarged cross section showing an end of the discharge lamp in Modification 1 to Embodiment 2. As shown in FIG. 13, the discharge lamp in Modification 1 to Embodiment 2 includes a glass bulb 1002 and a pair of cap-shaped external electrodes 1015 provided at both ends of the glass bulb 1002. The external electrodes 1015 is composed of an electrode body layer 1016 formed on the outer surface of the glass bulb 1002, and a coating layer 1017 formed on the electrode body layer 1016. The electrode body layer 1016 and coating layer 1017 may be formed by, for example, the dipping method.

2. Modification 2 to Embodiment 2

Figure 14:
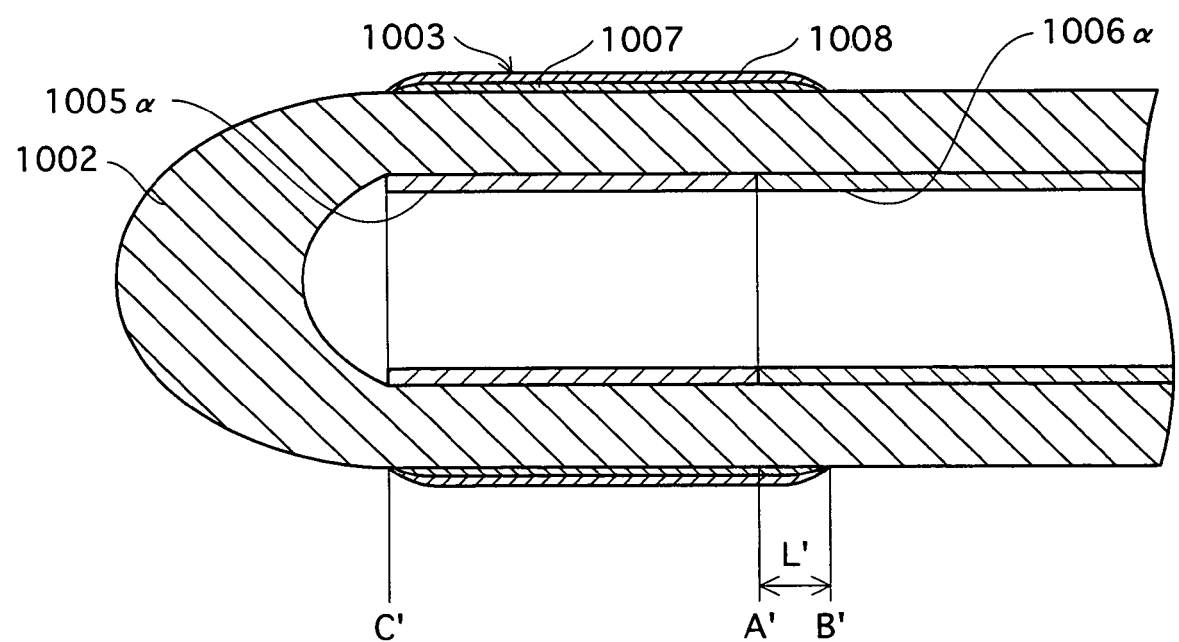
FIG. 14 is an enlarged cross section showing an end of the discharge lamp in Modification 2 to Embodiment 2.

FIG. 14 is an enlarged cross section showing an end of the discharge lamp in Modification 2 to Embodiment 2. As shown in FIG. 14, the discharge lamp in Modification 2 to Embodiment 2 includes a glass bulb 1002 and a pair of external electrodes 1003 provided at both ends of the glass bulb 1002. A protection layer 1005α is formed on the inner surface of the glass bulb 1002 from a position C', which corresponds to a glass bulb end side end of an external electrode 1003 to a position A' from which a phosphor layer 1006α starts to be formed. With such a construction in which the protection layer is formed on the inner surface of the glass bulb at least from the position C', which corresponds to a glass bulb end side end of the external electrode 1003 to the position A' from which the phosphor layer 1006α starts to be formed, a pinhole is prevented from occurring by a discharge between positions A' and C' within the glass bulb 1002.

Embodiment 3

In recent years, the demand for backlight units for large screens has increased as the liquid crystal displays with large screens have been increasingly marketed. Discharge lamps with the electrodes provided outside a glass bulb have been developed for use in such backlight units. The external electrode type discharge lamp (hereinafter merely referred to as "discharge lamp") has a merit that even a plurality of the discharge lamps can be lighted by one high-frequency electronic ballast, and thus is suitable for backlight units for large screens in which a large number of discharge lamps are used.

Figure 15:
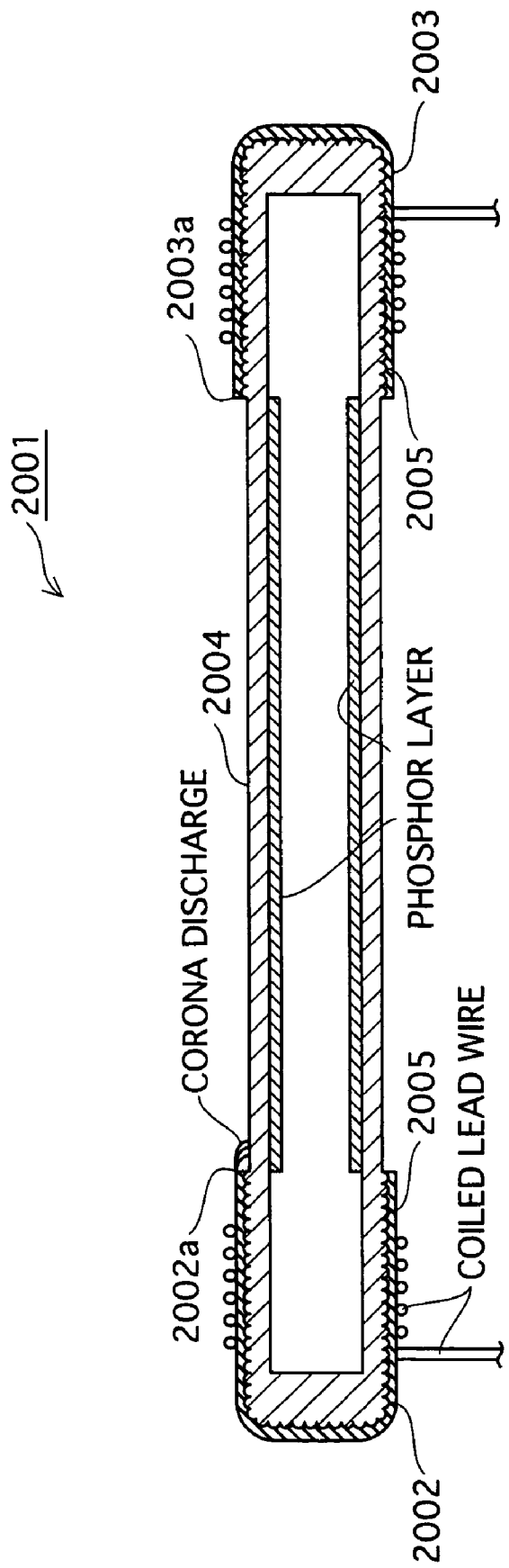
FIG. 15 shows an outline of a conventional discharge lamp.

Meanwhile, Japanese Laid-Open Patent Application No. 2004-146351 discloses a discharge lamp 2001 shown in FIG. 15. The discharge lamp 2001 includes a pair of cap-shaped external electrodes 2002 and 2003 and a glass bulb 2004, where the external electrodes 2002 and 2003 are fitted on the glass bulb 2004 at both ends thereof. Blast-processed surfaces 2005 are formed on the outer surface of the glass bulb 2004, as areas on which the external electrodes 2002 and 2003 are to be formed. Then the external electrodes 2002 and 2003 having a uniform thickness are formed on the blast-processed surfaces 2005 by the ultrasonic solder dipping method.

However, the inventors of the present invention found through studies that although the external electrodes 2002 and 2003 having a uniform thickness are formed on the blast-processed surfaces 2005 by the ultrasonic solder dipping method, the corona discharge occurs between the glass bulb 2004 and the end 2002a and between the glass bulb 2004 and the end 2003a since the end 2002a and the end 2003a are angulated. The corona discharge leads to generation of ozone, and the generated ozone deteriorates the resin members (not illustrated) in the vicinity of the lamp. It is therefore a problem of a discharge lamp that the generation of ozone, even a small amount of which may ill-affect, causes a deterioration and a short life of the resin members that are used in the discharge lamps, backlight units, liquid crystal displays and the like.

Embodiment 3 is aimed to provide a discharge lamp that suppresses the corona discharge from occurring when the lamp is lighted.

Figure 16:
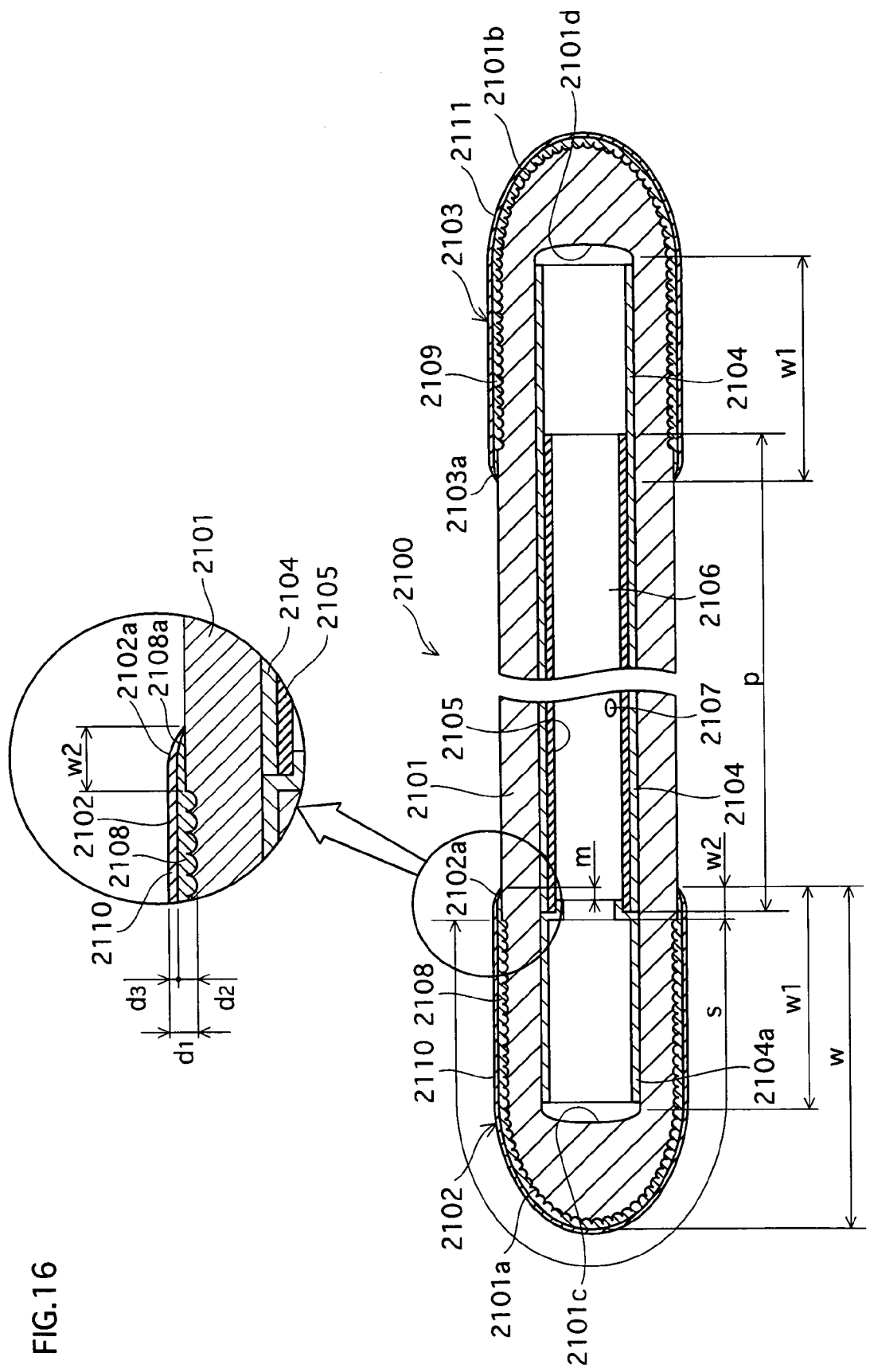
FIG. 16 shows an outline of the discharge lamp in Embodiment 3.

FIG. 16 shows an outline of a discharge lamp 2100 in Embodiment 3.

As shown in FIG. 16, the discharge lamp 2100 in Embodiment 3 is an external electrode type discharge lamp using a dielectric barrier discharge, and includes a glass bulb 2101 and external electrodes 2102 and 2103, where the glass bulb 2101 is a tube including a discharge space therewithin, and the external electrodes 2102 and 2103 are provided on the outer surface of the glass bulb 2101 at both ends thereof. A protection layer 2104 is formed on the inner surface of the glass bulb 2101, and a phosphor layer 2105 is provided on the protection layer 2104.

The glass bulb 2101 is a discharge vessel that is annular in the cross section cut by a plane perpendicular to the tube axis, and is made of, for example, a soda glass. The glass bulb is not limited to the soda glass, but may be made of, for example, a lead glass, a lead-free glass, or a borosilicate glass. When any of these materials is used, the start-up characteristics in dark surrounding is improved for the following reasons. That is to say, these glasses contain much alkaline metal oxide such as sodium oxide ($Na_2O$). When sodium oxide is contained in the material of the glass bulb, the sodium (Na) component melts into the inner space of the glass bulb with time. Since the sodium has low electronegativity, it is considered that the sodium having melted into the inner space of the glass bulb near the ends thereof contributes to the improvement in the start-up characteristics in dark surrounding.

Especially in the external electrode type phosphor lamps, it is preferable that the material of the glass bulb contains 3 mol % to 20 mol % of alkaline metal oxide.

For example, when the alkaline metal oxide is sodium oxide, it is preferable that the material of the glass bulb contains 5 mol % to 20 mol % of sodium oxide. Otherwise, the following problems are expected. When the glass material contains less than 5 mol % of sodium oxide, it is highly possible that the start-up in dark surrounding takes more than one second (in other words, when the glass material contains 5 mol % or more of sodium oxide, it is highly possible that the start-up in dark surrounding takes one second or less). Conversely, when the glass material contains more than 20 mol % of sodium oxide, a long hours of use makes the glass bulb white in color, resulting in reduction of brightness or reduction of strength of the glass bulb itself.

Furthermore, when the environment-friendliness is taken into account, it is preferable that the glass bulb is made of lead-free glass. It should be noted here that the lead-free glass may take in lead as impurity during the manufacturing process. For this reason, a glass that contains 0.1 wt % or less of lead may be defined as the lead-free glass.

In the present embodiment, the glass bulb 2101 is made of a soda glass that contains 16 wt % of sodium oxide, and is a straight glass bulb that is 4.0 mm in outer diameter, 3.0 mm in inner diameter, and 720 mm in length. The inner space of the glass bulb 2101 is filled with a rare gas, such as argon and neon, of approximately 8 kPa and with approximately 2 mg of mercury 2107. The glass bulb 2101 is not limited to the above-mentioned measurements. However, to make the discharge lamp 2100 spindly, it is preferable that the glass bulb 2101 is 1.8 mm to 6.0 mm in outer diameter (1.4 mm to 5.0 mm in inner diameter).

The external electrode 2102 (2103) is in the shape of a cap, and includes an electrode body layer 2108 (2109) and a coating layer 2110 (2111), the electrode body layer 2108 (2109) being formed on a blast-processed surface 2101a (2101b) (having 1 μm to 3 μm of surface roughness) that is part of the outer surface of the glass bulb 2101 formed at an end thereof, where the main constituent of the electrode body layer 2108 (2109) is silver or copper. The coating layer 2110 (2111) is formed either directly or indirectly on the outer surface of the electrode body layer 2108 (2109). The maximum thickness of the external electrodes 2102 and 2103 is 70 μm or less. The end portions 2102a and 2103a of the external electrodes 2102 and 2103 become smaller in thickness towards the ends thereof, drawing a gentle curvature. The end portion 2102a (2103a) of the external electrode 2102 (the external electrode 2103) is provided in an area that is away from the blast-processed surface 2101a (2101b) in the area "s" by a distance w2. It is preferable that the distance w2 is 0.5 mm to 5 mm. This is because otherwise the following problems are expected. When the external electrodes 2102 and 2103 are formed by the ultrasonic solder dipping method, if the distance w2 is less than 0.5 mm, the characteristic of the present invention that the end portions 2102a and 2103a become smaller in thickness towards the ends thereof, drawing a gentle curvature is not obtained. That is to say, if the distance w2 is less than 0.5 mm, the ends of the end portions 2102a and 2103a on the glass bulb center side are angulated as the end portions 2002a and 2003a of the conventional technique shown in FIG. 15, which makes the corona discharge easy to occur. Conversely, if the distance w2 is more than 5 mm, the external electrodes 2102 and 2103 become easy to remove from the outer surface of the glass bulb 2101.

The maximum thickness d2 of the electrode body layers 2108 and 2109 is approximately 7 μm. In the present invention, the maximum thickness of the electrode body layers 2108 and 2109 means the maximum thickness of the entire electrode body layers 2108 and 2109.

The main constituent of the electrode body layers 2108 and 2109 is silver or copper. It should be noted here that "the main constituent of the electrode body layers 2108 and 2109 being silver or copper" includes a meaning that the main constituent of the electrode body layers 2108 and 2109 is an alloy of silver and copper. Here, the main constituent means a constituent that occupies the most percentage of the composition and greatly affects the property of the composition. Accordingly, a compound other than silver or copper may be included as an additive. To enhance the bonding force of the electrode body layers 2108 and 2109 to the glass bulb 2101, a glass frit, for example, may be added to the electrode body layers 2108 and 2109. For example, if a glass frit containing 1.0 wt % to 5.0 wt % of bismuth (Bi) is added, the bonding force of the electrode body layers 2108 and 2109 to the glass bulb 2101 is enhanced by the anchor effect of the glass frit. Other than this, ethylcellulose, for example, may be used as the additive.

The electrode body layers 2108 and 2109 each have a length "w" of 25 mm that is measured from an end of the glass bulb 2101, a width "w1" of approximately 20 mm at the cylindrical portions of the glass bulb 2101, and are formed over the entire outer circumference of the glass bulb 2101. The electrode body layers 2108 and 2109 can be formed by the known dipping method. In a brief description, a sealed end of the glass bulb 2101 is dipped 24 mm into melted silver that is contained in a melting basin. This enables approximately 7 μm-thick silver paste to be applied over the outer surface of the glass bulb 2101 at the end thereof. The applied silver paste is then sintered.

The coating layer 2110 (2111) is formed on the outer surface of the electrode body layer 2108 (2109), and has approximately 7.0 μm of thickness d3. In the present invention, the thickness of the coating layer 2110 (2111) means the maximum thickness of the entire coating layer 2110 (2111).

The main constituent of the coating layer 2110 (2111) is solder. The solder constituting the coating layer 2110 (2111) is composed of: 95.2 wt % of tin; 3.8 wt % of silver; and 1.0 wt % of copper. Since the solder of the coating layer 2110 (2111) contains silver, the "silver transfer", a transfer of silver from the electrode body layer 2108 (2109), is difficult to occur. It should be noted here that to make "silver transfer" difficult to occur, it is preferable that the content of silver is in the range of 1.0 wt % to 8.0 wt %.

The coating layer 2110 (2111) can be formed by the known dipping method (see, for example, Japanese Laid-Open Patent Application No. 2004-146351). In a brief description, an end of the glass bulb 2101 on which the electrode body layer 2108 (2109) has been formed is dipped 25 mm into melted solder that is contained in a melting basin. This enables approximately 7 μm-thick solder to be applied over the outer surface of the electrode body layer 2108 (2109). The applied solder is then sintered.

The composition of solder constituting the coating layers 2110 and 2111 is not limited to the above-described one. The solder may contain, for example, at least one of bismuth, zinc, and lead. However, to provide an environment-friendly discharge lamp 2101, it is preferable that materials as environmental loads such as lead and antimony are not contained. Further, the coating layers 2110 and 2111 may be made of a material other than solder. For example, the coating layers 2110 and 2111 may be nickel layers made of electroless plating.

In general, in the air, silver is easy to be sulfurized, and copper is easy to be oxidized. After sulfurization or oxidization occurs, silver or copper has a larger electric resistance than before. Accordingly, if the electrode body layers 2108 and 2109 are exposed to the air, the conductivity of the electrode body layers 2108 and 2109 is decreased. However, according to Embodiment 3 of the present invention, the electrode body layers 2108 and 2109 are difficult to be exposed to the air since the electrode body layers 2108 and 2109 are covered with the coating layers 2110 and 2111. This construction makes the sulfurization or oxidization of silver or copper difficult to occur. As a result, the conductivity of the external electrodes 2102 and 2103 in Embodiment 3 is difficult to be decreased.

To make the sulfurization or oxidization of silver or copper difficult to occur, it is preferable that the entire outer surface of the electrode body layers 2108 and 2109 is covered with the coating layers 2110 and 2111. However, for some production-related or design-related reasons, part of the electrode body layers 2108 and 2109 may be exposed to the air in so far as the exposed part is such an area that does not affect much the conductivity of the external electrodes 2102 and 2103.

To enhance the bonding force of the coating layers 2110 and 2111 to the electrode body layers 2108 and 2109, it is preferable that the outer surface of the electrode body layers 2108 and 2109, which is to be covered with the coating layers 2110 and 2111, is polished.

The protection layer 2104 is made of a material that includes at least one electron emitting material such as yttrium oxide ($Y_2O_3$), magnesium oxide (MgO), or lanthanum oxide ($La_2O_3$) to be 0.5 μm (surface roughness is 0.2 μm or less) to 2 μm (surface roughness is 1 μm or less) in the maximum thickness as an aggregate of metal oxide particles. In the present embodiment, the protection layer 2104 is made of yttrium oxide ($Y_2O_3$) to be 2 μm in the maximum thickness and 1 μm or less in the surface roughness as an aggregate of metal oxide particles being 0.01 μm to 0.1 μm in size. These settings are based on the following facts found by the inventors of the present invention. If the protection layer 2104 is 2 μm thick and the surface roughness thereof is larger than 1 μm, the brightness is decreased by approximately 20%, compared with the case where there is no protection layer, and a required level of brightness cannot be obtained. If the protection layer 2104 is less than 0.5 μm in the maximum thickness and the surface roughness thereof is larger than 0.2 μm, the density of the protection layer is decreased, and when the brightness is increased by, for example, increasing the driving current to 5 mA or more, areas of the inner wall of the glass bulb 2101 that correspond to the external electrodes 2102 and 2103 are exposed to bombardments of argon ions or mercury ions, penetrated by them, and have holes (pinholes). Since an inner surface 2101c (2101d) of the glass bulb 2101 has an area on which the protection layer 2104 is not formed, it is possible to allow an alkaline metal Na, which is separated from the glass material when the end of the glass bulb 2101 is sealed, to be present near the area of the inner surface 2101c (2101d). As a result of this, the alkaline metal (Na) and the metal oxide compound (yttrium oxide), which are both electron emitting materials, are exposed to the discharge space. This improves the start-up characteristics in dark surrounding.

The blast-processed surfaces in the outer surface of the glass bulb 2101 and the surface roughness of the protection layer 2104 conform to the "maximum height Ry" defined in "JIS B 0601: '94".

The protection layer 2104 is provided to prevent the deterioration of mercury and the phosphor layer that is caused by reaction between Na separated from the glass, mercury 2107 enclosed in the glass bulb 2101, and the phosphor layer 2105 formed inside the glass bulb 2101. Reaction with Na causes the mercury 2107 to be consumed and have a short life. Also, reaction with Na causes the phosphor layer 2105 to be deteriorated, resulting in the decrease in the efficiency and brightness.

A protection layer 2104a corresponding to the external electrode 2102 is formed by, for example, removing a once-formed protection layer 2104a and a portion of the phosphor layer 2105 from an area inside the glass bulb 2101 corresponding to the external electrode 2102, and then forming, in the area inside the glass bulb 2101, a layer of the metal oxide compound (yttrium oxide) in which an electron emitting material, such as a cesium compound, a lithium compound, or a barium compound, is distributed. In the present embodiment, a layer of yttrium oxide in which a cesium compound is included in a distributed manner is formed as the protection layer 2104a. To prevent the cesium compound from being spattered in the glass bulb 2101, the protection layer 2104a is formed from a position on the glass bulb 2101 center side that is away by a distance "m" from an end of the external electrode 2102 (an end of the external electrode 2103) on the glass bulb 2101 center side. With this construction, the cesium compound, which has high electron-emission characteristic, is exposed to the discharge space. This further improves the start-up characteristics in dark surrounding. Also, with this construction, even if the discharge causes atoms to be liberated from the electron emitting material and be spattered in the glass bulb 2101, the liberated atoms are difficult to attach to the phosphor layer 2105 in the light emitting area since the electron emitting material is present in the area that is away by a distance "m" from an end of the external electrode 2102 (or the light emitting area) on the glass bulb 2101 center side. This construction therefore prevents the luminous flux from being decreased by the liberated atoms.

It is preferable that the distance "m" is 2 mm or more. In this case, the electron emitting material is present in the area that is away by an enough distance from the light emitting area, and the liberated atoms are difficult to attach to the phosphor layer 2105 in the light emitting area. This construction therefore prevents the luminous flux from being decreased by the liberated atoms.

The means for preventing the cesium compound from being spattered in the glass bulb 2101 is not limited to the above-described means of the present embodiment. As another means, for example, continuous layers may be formed by linking the cesium compounds by yttrium oxide in the non-crystalline state with the sol-gel process. That is to say, linking the cesium compounds by yttrium oxide prevents the cesium compounds from being spattered in the glass bulb 2101.

The phosphor layer 2105 is made of a phosphor that includes at least Mg, and is formed on the protection layer 2104 to be exposed to the inner space of the glass bulb 2101 in an area "p" that corresponds to an area on the outer surface of the glass bulb 2101 sandwiched by the end portion 2102a of the external electrode 2102 and the end portion 2103a of the external electrode 2103. In Embodiment 3, the phosphor layer 2105 is formed to be approximately 20 μm in thickness by applying a rare-earth phosphor that is a mixture of: red phosphor ($Y_2O_3$:$Eu^{3+}$); green phosphor ($LaPO_4$:$Ce^{3+}$, $Tb^{3+}$); and blue phosphor ($BaMg_2Al_{16}O_{27}$:$Eu^{2+}$).

1. Modification 1 to Embodiment 3

Figure 17:
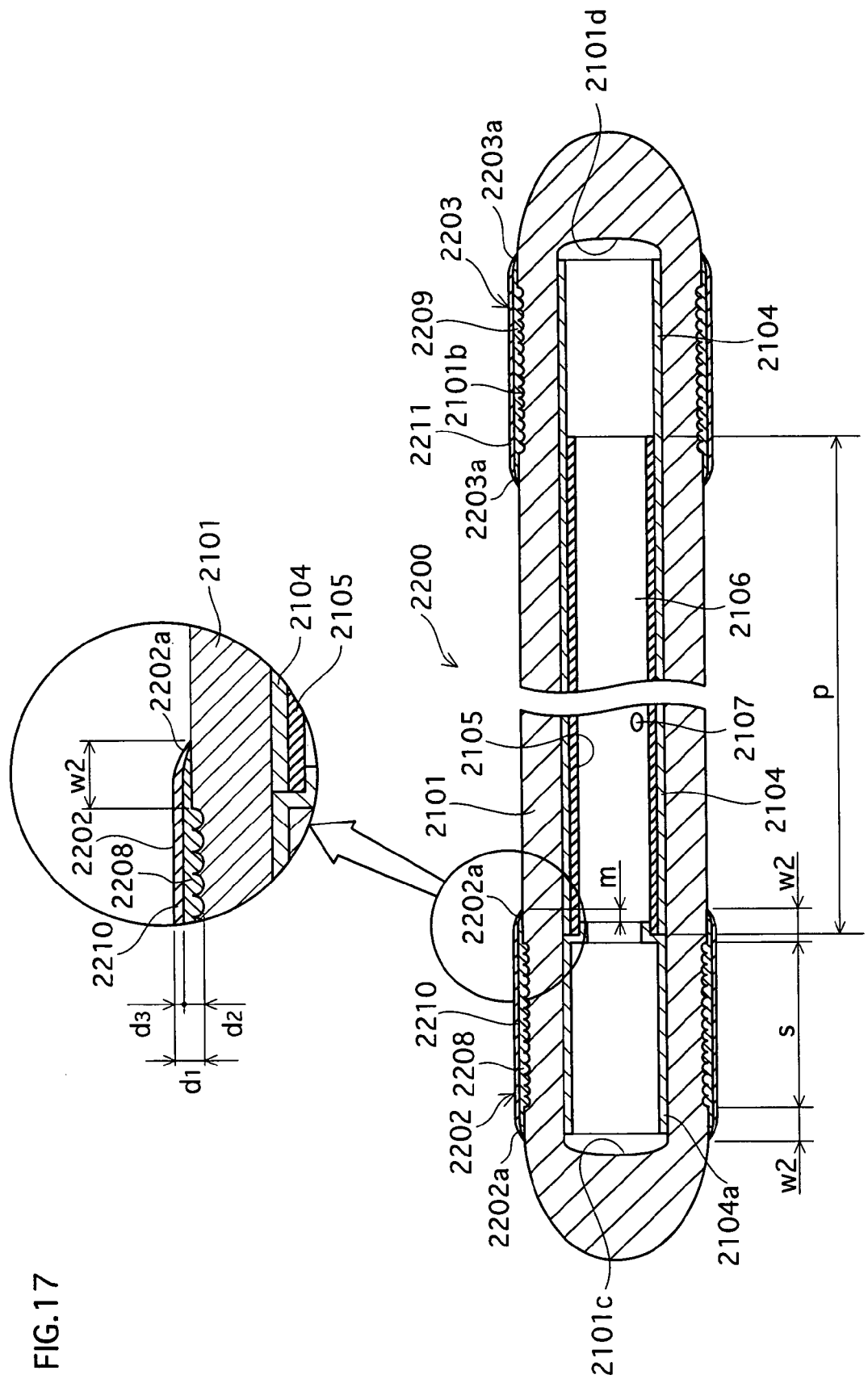
FIG. 17 shows an outline of the discharge lamp in Modification 1 to Embodiment 3.

FIG. 17 shows an outline of the discharge lamp in Modification 1 to Embodiment 3. In FIG. 17, the same reference numerals are applied to parts corresponding to the discharge lamp in Embodiment 3, and the description thereof is omitted.

Modification 1 to Embodiment 3 is different from Embodiment 3 in the following. Each of external electrodes 2202 and 2203 is cylindrical, has openings at its ends opposite to each other in the cylinder axis direction, and is composed of an electrode body layer 2208 (2209) and a coating layer 2210 (2211). The electrode body layer 2208 (2209) is formed on a blast-processed surface 2101a (2101b) (having 1 μm to 3 μm of surface roughness) that is part of the outer surface of the glass bulb 2101. The electrode body layer 2208 (2209) (whose maximum thickness d2 is approximately 10 μm) is made from a conductive paste whose main constituent is silver or copper. The coating layer 2210 (2211) is formed on the outer surface of the electrode body layer 2208 (2209). The main constituent of the coating layer 2210 (2211) (whose maximum thickness d3 is approximately 10 μm) is solder that is composed of: 95.2 wt % of tin; 3.8 wt % of silver; and 1.0 wt % of copper. The maximum thickness of the external electrodes 2202 and 2203 is 70 μm or less. The end portions 2202a and 2203a of the external electrodes 2202 and 2203 become smaller in thickness towards the ends thereof, drawing a gentle curvature.

In Modification 1 to Embodiment 3, the maximum thickness d1 of the external electrodes 2202 and 2203 is 20 μm, and the end portions 2202a and 2203a of the cylindrical external electrodes 2202 and 2203 become smaller in thickness towards the ends thereof forming a shape of a beak of a bird. The external electrodes 2202 and 2203 have approximately uniform thickness over the blast-processed surfaces each of which is formed in an area "s" of the outer surface of the glass bulb 2101.

In Modification 1 to Embodiment 3, each of the end portions 2202a and 2203a is an end portion of the external electrode 2202 or 2203, and is defined as a portion where the external electrode 2202 or 2203 becomes smaller in thickness towards the end thereof, drawing a gentle curvature, demarcated by a change point from which the external electrode 2202 or 2203 becomes smaller in thickness than the maximum thickness d1.

Figure 18:
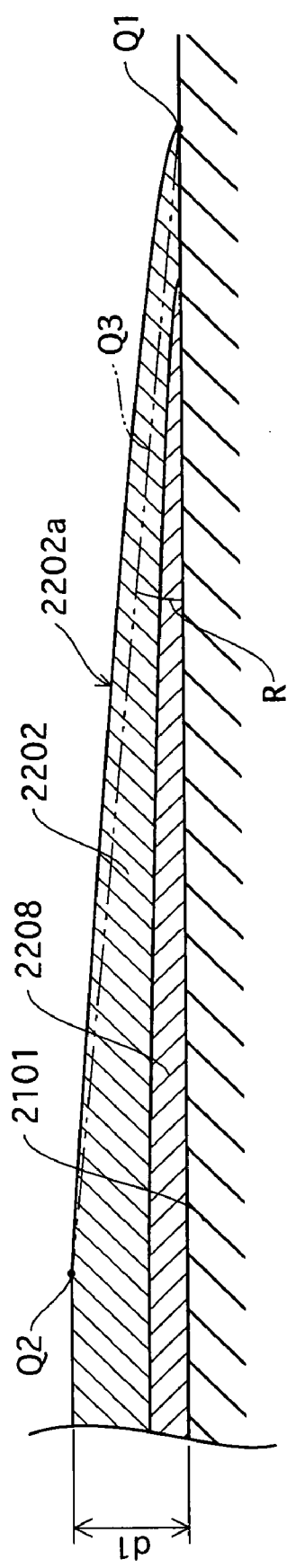
FIG. 18 is an enlarged view of an end portion of an external electrode in Modification 1 to Embodiment 3.

FIG. 18 is an enlarged view of an end portion of an external electrode in Modification 1 to Embodiment 3. As shown in FIG. 18, it is preferable that in a cross section cut by a plane including a tube axis of the glass bulb 2101, an angle R between a straight line Q3 and the outer surface of the glass bulb 2101 is in a range from 5 degrees to 45 degrees, the straight line Q3 connecting an end Q1 of the end portion 2202a and a point Q2 at which the end portion 2202a has the largest thickness. The reason for this construction is that it suppresses the generation of ozone, and makes the external electrodes 2202 and 2203 difficult to remove from the surface of the glass bulb 2101.

Here, with regard to a discharge lamp 2200 in Modification 1 to Embodiment 3, the maximum thickness of the external electrodes 2202 and 2203 means the maximum thickness of the portions where the thickness is substantially uniform. That is to say, it is the maximum thickness of the portions that cover the outer surface of the glass bulb to generate a discharge in the internal space of the glass bulb 2101. If, for example, projections are provided on the external electrodes 2202 and 2203 for power feeding, the maximum thickness of the external electrodes does not include the thickness of the projections.

With the above-described construction in Modification 1 to Embodiment 3 in which the end portions 2202a and 2203a become smaller in thickness towards the ends thereof, drawing a gentle curvature, the corona discharge is difficult to occur, thus ozone is difficult to be generated.

The shape of the end portions 2202a and 2203a drawn by the ridge line thereof is not limited to a beak of a bird, but may be, for example, substantially a straight line (such as the straight line Q3 shown in FIG. 18) such that the cylindrical end portions become smaller in thickness towards the ends thereof, drawing a gentle curvature.

Since the above-described solder of the coating layers 2210 and 2211 contains silver, the "silver transfer", a transfer of silver from the electrode body layers 2208 and 2209, is difficult to occur. It should be noted here that to make "silver transfer" difficult to occur, it is preferable that the content of silver is in the range of 1.0 wt % to 8.0 wt %. Also, to enhance the bonding force of the electrode body layers 2208 and 2209 to the coating layers 2210 and 2211, it is preferable that the outer surface of the electrode body layers 2208 and 2209 is polished to increase the flat areas and improve the wettability with the coating layers 2210 and 2211.

The composition of solder constituting the coating layers 2210 and 2211 is not limited to the above-described one. The solder may contain, for example, at least one of bismuth, zinc, and lead. However, to provide an environment-friendly discharge lamp 2200, it is preferable that materials as environmental loads such as lead and antimony are not contained. Further, the coating layers 2210 and 2211 may be made of a material other than solder. For example, the coating layers 2210 and 2211 may be a nickel layer made of electroless plating. The external electrodes 2202 and 2203 may further include one or more layers other than the electrode body layers 2208 and 2209 and the coating layers 2210 and 2211.

Both of the external electrodes provided at both ends of the glass bulb may not necessarily have the same shape, but one of them may have the shape of the external electrode explained in Embodiment 1 or Embodiment 2.

The end portions 2108a and 2109a of Embodiment 3 and the end portions 2208a and 2209a of Modification 1 to Embodiment 3 are provided outside the area "s" of the blast-processed surface in the outer surface of the glass bulb 2101. However, not limited to this, the end portions of the external electrodes may be provided on the blast-processed surface in the area "s". This also produces an advantageous effect of suppressing the corona discharge from occurring. In this case, however, the end portions 2108a and 2109a of Embodiment 3 and the end portions 2208a and 2209a of Modification 1 to Embodiment 3 are angulated. Therefore, the angulated portions of the end portions may be polished such that the end portions become smaller in thickness towards the ends thereof, drawing a gentle curvature.

2. Modification 2 to Embodiment 3

Figure 19:
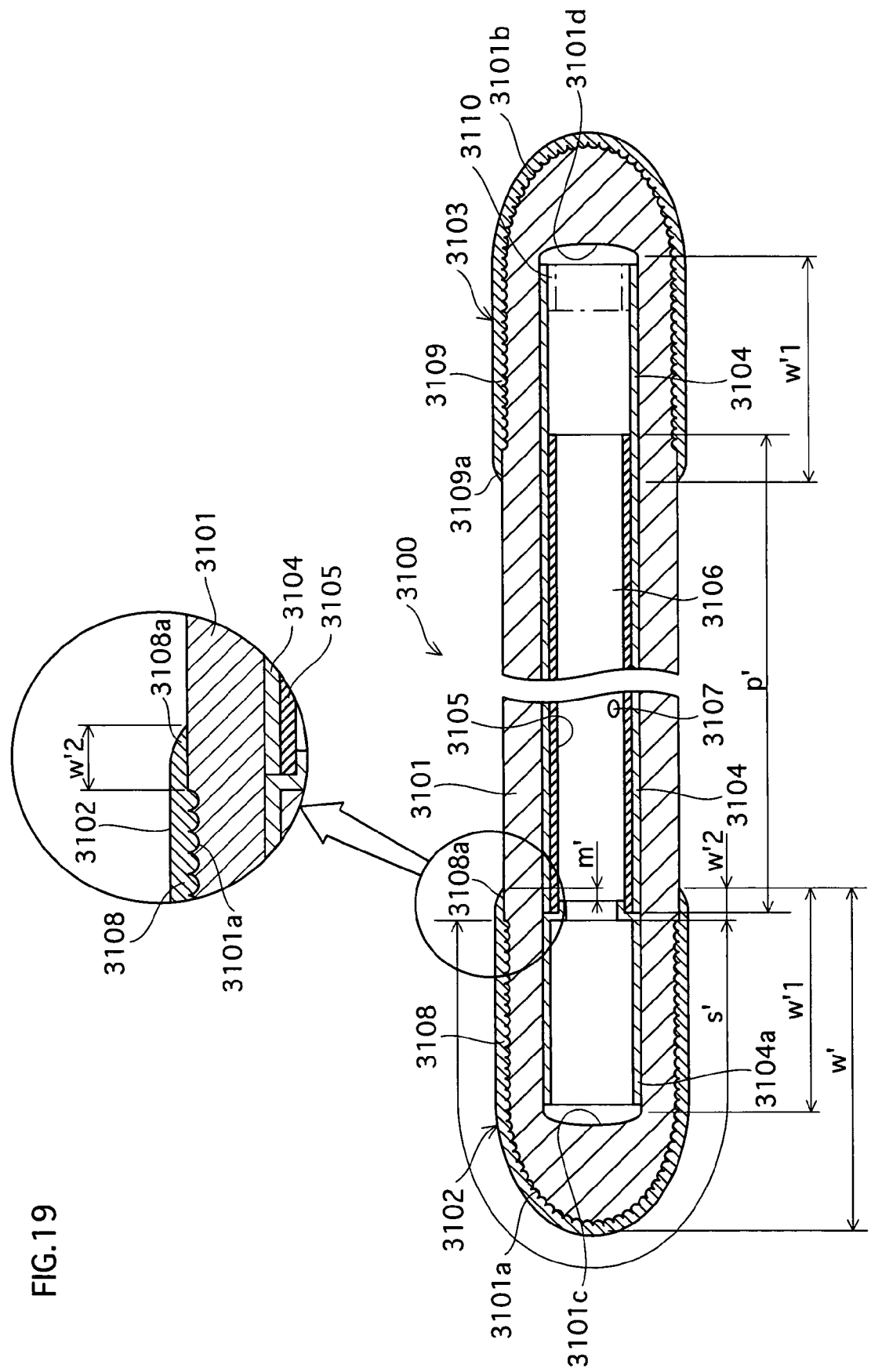
FIG. 19 shows an outline of the discharge lamp in Modification 2 to Embodiment 3.

FIG. 19 shows an outline of the discharge lamp in Modification 2 to Embodiment 3.

As shown in FIG. 19, the discharge lamp 3100 in Modification 2 to Embodiment 3 uses a dielectric barrier discharge, and includes a glass bulb 3101 and external electrodes 3102 and 3103, where the glass bulb 3101 is a tube including a discharge space therewithin, and the external electrodes 3102 and 3103 are provided on the outer surface of the glass bulb 3101 at both ends thereof. A protection layer 3104 is formed on the inner surface of the glass bulb 3101, and a phosphor layer 3105 is provided on the protection layer 3104.

The glass bulb 3101 is a discharge vessel that is annular in the cross section cut by a plane perpendicular to the tube axis, and is made of, for example, a soda glass. The glass bulb is not limited to the soda glass, but may be made of, for example, a lead glass, a lead-free glass, or a borosilicate glass. When any of these materials is used, the start-up characteristics in dark surrounding is improved for the following reasons. That is to say, these glasses contain much alkaline metal oxide such as sodium oxide ($Na_2O$). When sodium oxide is contained in the material of the glass bulb, the sodium (Na) component melts into the inner space of the glass bulb with time. Since the sodium has low electronegativity, it is considered that the sodium having melted into the inner space of the glass bulb near the ends thereof contributes to the improvement in the start-up characteristics in dark surrounding.

Especially in the external electrode type phosphor lamps, it is preferable that the material of the glass bulb contains 3 mol % to 20 mol % of alkaline metal oxide.

For example, when the alkaline metal oxide is sodium oxide, it is preferable that the material of the glass bulb contains 5 mol % to 20 mol % of sodium oxide. Otherwise, the following problems are expected. When the glass material contains less than 5 mol % of sodium oxide, it is highly possible that the start-up in dark surrounding takes more than one second (in other words, when the glass material contains 5 mol % or more of sodium oxide, it is highly possible that the start-up in dark surrounding takes one second or less). Conversely, when the glass material contains more than 20 mol % of sodium oxide, a long hours of use makes the glass bulb white in color, resulting in reduction of brightness or reduction of strength of the glass bulb itself.

Furthermore, when the environment-friendliness is taken into account, it is preferable that the glass bulb is made of lead-free glass. It should be noted here that the lead-free glass may take in lead as impurity during the manufacturing process. For this reason, a glass that contains 0.1 wt % or less of lead may be defined as the lead-free glass.

In Modification 2 to Embodiment 3, the glass bulb 3101 is made of a soda glass that contains 16 wt % of sodium oxide, and is a straight glass bulb that is 4.0 mm in outer diameter, 3.0 mm in inner diameter, and 720 mm in length. The inner space of the glass bulb 3101 is filled with a rare gas, such as argon and neon, of approximately 8 kPa and with approximately 2 mg of mercury 3107. The glass bulb 3101 is not limited to the above-mentioned measurements. However, to make the discharge lamp 3100 spindly, it is preferable that the glass bulb 3101 is 1.8 mm to 6.0 mm in outer diameter (1.4 mm to 5.0 mm in inner diameter).

The external electrode 3102 (3103) is a conductive layer 3108 (3109) formed on a blast-processed surface 3101a (3101b) (having 1 μm to 3 μm of surface roughness) that is part of the outer surface of the glass bulb 3101 formed at an end thereof. The maximum thickness of the conductive layer 3108 (3109) is 70 μm or less. The end portions 3108a and 3109a of the conductive layers 3108 and 3109 become smaller in thickness towards the ends thereof, drawing a gentle curvature. In Modification 2 to Embodiment 3, the end portion 3108a (3109a) of the conductive layer 3108 (3109) is provided in an area that is away from the blast-processed surface 3101a (3101b) in the area "s'" by a distance w'2. It is preferable that the distance w'2 is 0.5 mm or more. It is more preferable that the distance w'2 is in the range from 0.5 mm to 3 mm. The conductive layers 3108 and 3109 are made of solder whose main constituent is, for example, tin, an alloy of tin and indium, or an alloy of tin and bismuth. The conductive layer 3108 (3109)

The conductive layers 3108 and 3109 each have a length "w'" of 25 mm that is measured from an end of the glass bulb 3101, a width "w'1" of approximately 20 mm at the cylindrical portions of the glass bulb 3101, and are formed over the entire outer circumference of the glass bulb 3101. The conductive layers 3108 and 3109 can be formed by the known ultrasonic solder dipping method. In a brief description, a sealed end of the glass bulb 3101 is dipped 25 mm in to melted solder that is contained in an ultrasonic solder basin. This enables approximately 10 μm-thick solder layer to be formed over the outer surface of the glass bulb 3101 at the end thereof.

To provide appropriate bonding force of the glass bulb 3101, it is preferable that the solder used for the conductive layers 3108 and 3109 contains at least one of antimony, zinc, and aluminum as an additive. Also, to provide appropriate wettability with the surface of the glass bulb 3101, it is preferable that the solder contains an additive such as antimony or zinc. On the other hand, when the environment-friendliness is taken into account, it is preferable that the solder does not contain any environmental load materials such as lead.

The reason why it is preferable that the distance w'2 is 0.5 mm to 3 mm with respect to the end portions 3108a and 3109a of the conductive layers 3108 and 3109 is that otherwise the following problems are expected. When the conductive layers 3108 and 3109 are formed by the ultrasonic solder dipping method, if the distance w'2 is less than 0.5 mm, the characteristic of the present invention that the end portions 3108a and 3109a of the conductive layers 3108 and 3109 become smaller in thickness towards the ends thereof, drawing a gentle curvature is not obtained. That is to say, if the distance w'2 is less than 0.5 mm, the ends of the end portions 3108a and 3109a of the conductive layers 3108 and 3109 are angulated as the end portions 2002a and 2003a of the conventional technique shown in FIG. 15, which makes the corona discharge easy to occur. Conversely, if the distance w'2 is more than 3 mm, the end portions 3108a and 3109a of the conductive layers 3108 and 3109 become easy to remove from the outer surface of the glass bulb 3101.

The protection layer 3104 is made of a material that includes at least one electron emitting material such as yttrium oxide ($Y_2O_3$), magnesium oxide (MgO), or lanthanum oxide ($La_2O_3$) to be 0.5 μm (surface roughness is 0.2 μm or less) to 2 μm (surface roughness is 1 μm or less) in the maximum thickness as an aggregate of metal oxide particles. In Modification 2 to Embodiment 3, the protection layer 3104 is made of yttrium oxide ($Y_2O_3$) to be 2 μm in the maximum thickness and 1 μm or less in the surface roughness as an aggregate of metal oxide particles being 0.01 μm to 0.1 μm in size. These settings are based on the following facts found by the inventors of the present invention. If the protection layer 3104 is 2 μm thick and the surface roughness thereof is larger than 1 μm, the brightness is decreased by approximately 20%, compared with the case where there is no protection layer, and a required level of brightness cannot be obtained. If the protection layer 3104 is less than 0.5 μm in the maximum thickness and the surface roughness thereof is larger than 0.2 μm, the density of the protection layer is decreased, and when the brightness is increased by, for example, increasing the driving current to 5 mA or more, areas of the inner wall of the glass bulb 3101 that correspond to the external electrodes 3102 and 3103 are exposed to bombardments of argon ions or mercury ions, penetrated by them, and have holes (pinholes). Since an inner surface 3101c (3101d) of the glass bulb 3101 has an area on which the protection layer 3104 is not formed, it is possible to allow an alkaline metal Na, which is separated from the glass material when the end of the glass bulb 3101 is sealed, to be present near the area of the inner surface 3101c (3101d). As a result of this, the alkaline metal (Na) and the metal oxide compound (yttrium oxide), which are both electron emitting materials, are exposed to the discharge space. This improves the start-up characteristics in dark surrounding.

The blast-processed surfaces in the outer surface of the glass bulb 3101 and the surface roughness of the protection layer 3104 conform to the "maximum height Ry" defined in "JIS B 0601: '94".

The protection layer 3104 is provided to prevent the deterioration that is caused by reaction between Na separated from the glass, mercury 3107 enclosed in the glass bulb 3101, and the phosphor layer 3105 formed inside the glass bulb 3101. Reaction with Na causes the mercury 3107 to be consumed and have a short life. Also, reaction with Na causes the phosphor layer 3105 to be deteriorated, resulting in the decrease in the efficiency and brightness.

A protection layer 3104a corresponding to the conductive layer 3108 being the external electrode 3102 is formed by, for example, removing a once-formed protection layer 3104a and a portion of the phosphor layer 3105 from an area inside the glass bulb 3101 corresponding to the external electrode 3102, and then forming, in the area inside the glass bulb 3101, a layer of the metal oxide compound (yttrium oxide) in which an electron emitting material, such as a cesium compound, a lithium compound, or a barium compound, is distributed. In Modification 2 to Embodiment 3, a layer of yttrium oxide in which a cesium compound is included in a distributed manner is formed as the protection layer 3104a. To prevent the cesium compound from being spattered in the glass bulb 3101, the protection layer 3104a is formed from a position on the glass bulb 3101 center side that is away by a distance "m'" from an end of the external electrode 3102 (an end of the external electrode 3103) on the glass bulb 3101 center side. With this construction, the cesium compound, which has high electron-emission characteristic, is exposed to the discharge space. This further improves the start-up characteristics in dark surrounding. Also, with this construction, even if the discharge causes atoms to be liberated from the electron emitting material and be spattered in the glass bulb 3101, the liberated atoms are difficult to attach to the phosphor layer 3105 in the light emitting area since the electron emitting material is present in the area that is a way by a distance "m'" from an end of the external electrode 3102 (or the light emitting area) on the glass bulb 3101 center side. This construction therefore prevents the luminous flux from being decreased by the liberated atoms.

It is preferable that the distance "m" is 2 mm or more. In this case, the electron emitting material is present in the area that is away by an enough distance from the light emitting area, and the liberated atoms are difficult to attach to the phosphor layer 2105 in the light emitting area. This construction therefore prevents the luminous flux from being decreased by the liberated atoms.

The means for preventing the cesium compound from being spattered in the glass bulb 3101 is not limited to the above-described means of the present embodiment. As another means, for example, continuous layers may be formed by linking the cesium compounds by yttrium oxide in the non-crystalline state with the sol-gel process. That is to say, linking the cesium compounds by yttrium oxide prevents the cesium compounds from being spattered in the glass bulb 3101. Alternatively, the cesium compounds having high electron emission, which are enclosed by the dashed line in FIG. 19, may be attached to an area of the protection layer 3104 provided inside the glass bulb 3101, the area being away towards the tube end from an end of the conductive layer 3108 (3109) on the tube center side by one third or more the width "w'1" of the cylindrical portion of the conductive layer 3108 (3109). This is because with such a distance (one third or more the width "w'1"), the electric field strength is weakened.

The phosphor layer 3105 is made of a phosphor that includes at least Mg, and is formed on the protection layer 3104 to be exposed to the inner space of the glass bulb 3101 in an area "p'" that corresponds to an area on the outer surface of the glass bulb 3101 sandwiched by the end portions 3108a and 3109a of the conductive layers 3108 and 3109. In Modification 2 to Embodiment 3, the phosphor layer 3105 is formed to be approximately 20 μm in thickness by applying a rare-earth phosphor that is a mixture of: red phosphor ($Y_2O_3$:$Eu^{3+}$); green phosphor ($LaPO_4$:$Ce^{3+}$, $Tb^{3+}$); and blue phosphor ($BaMg_2Al_{16}O_{27}$:$Eu^{2+}$).

3. Modification 3 to Embodiment 3

Figure 20:
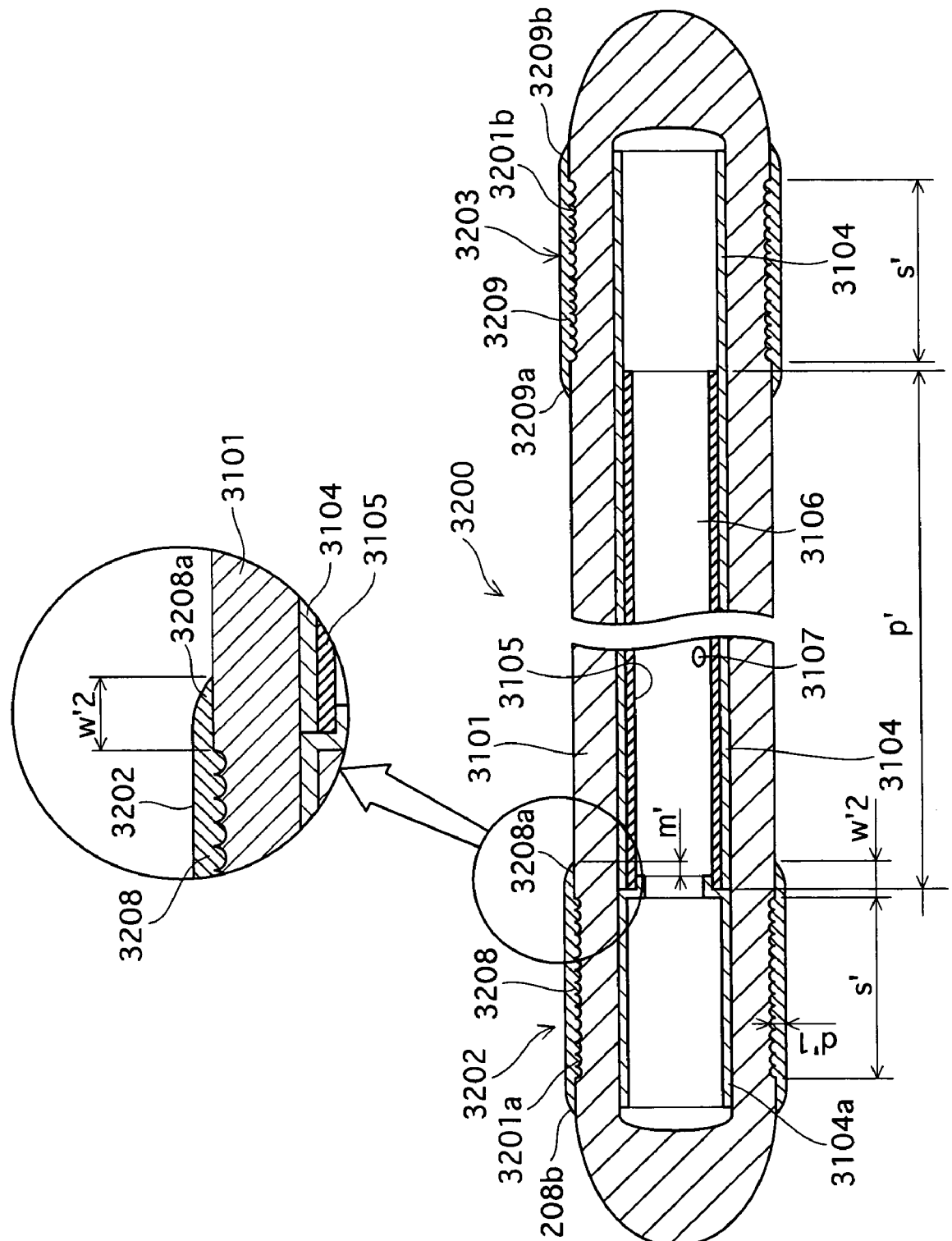
FIG. 20 shows an outline of the discharge lamp in Modification 3 to Embodiment 3.

FIG. 20 shows an outline of the discharge lamp in Modification 3 to Embodiment 3. In FIG. 20, the same reference numerals are applied to parts corresponding to the discharge lamp in Modification 2 to Embodiment 3, and the description thereof is omitted.

Modification 3 to Embodiment 3 is different from Modification 2 to Embodiment 3 in the following. The external electrodes 3208 and 3209 are formed as the external electrodes 3202 and 3203 by the dipping method to be cylindrical and in the shape of a sleeve. Such an external electrode is formed by, for example, masking an end of the glass bulb 3101 and applying solder to the outer surface of the glass bulb by dipping the end into solder. The external electrodes 3208 and 3209 are formed on the blast-processed surfaces 3201a and 3201b each of which is formed in an area "s'" of the outer surface of the glass bulb 3101. The maximum thickness d'1 of the external electrodes 3208 and 3209 is 70 μm or less. End portions 3208a and 3208b of the external electrode 3208 and end portions 3209a and 3209b of the external electrode 3209 become smaller in thickness towards the ends thereof, drawing a gentle curvature.

In Modification 3 to Embodiment 3, the external electrodes 3208 and 3209 (3202 and 3203) having the maximum thickness d'1 of 70 μm or less are formed, and the end portions 3208a and 3208b of the external electrode 3208 and the end portions 3209a and 3209b of the external electrode 3209 become smaller in thickness towards the ends thereof, drawing a gentle curvature. This makes the corona discharge difficult to occur, thus suppressing the generation of ozone.

Both of the external electrodes provided at both ends of the glass bulb may not necessarily have the same shape, but one of them may have the shape of the external electrode explained in modification 1 or 2 to Embodiment 3.

The shape drawn by the ridge line of the end portions 3108a, 3109a of the conductive layers 3108 and 3109 in Modification 2 or the end portions 3208a, 3208b, 3209a and 3209b of the external electrodes 3208 and 3209 in Modification 3 is not limited to a gentle curvature, but may be, for example, substantially a straight line such that the end portions become smaller in thickness towards the ends thereof. In this case, it is preferable that in a cross section cut by a plane including a tube axis of the glass bulb 3101, an angle R between a straight line Q3 (see FIG. 18) and the outer surface of the glass bulb 3101 is in a range from 5 degrees to 45 degrees, the straight line Q3 connecting an end Q1 (see FIG. 18) of the end portions 3108a, 3109a, 3208a, 3208b, 3209a and 3209b and a point Q2 (see FIG. 18) at which the end portion has the largest thickness, when the generation of ozone and the removal of the external electrodes 3102 and 3103 in Modification 2 and the external electrodes 3202 and 3203 in Modification 3, from the surface of the glass bulb 3101, are taken into account.

Furthermore, the end portions 3108a and 3109a of the conductive layers 3108 and 3109 in Modification 2 or the end portions 3208a, 3209a, 3209a and 3209b of the external electrodes 3208 and 3209 in Modification 3 are provided outside the area "s'" of the blast-processed surface in the outer surface of the glass bulb 3101. However, not limited to this, the end portions of the external electrodes may be provided on the blast-processed surface in the area "s'". This also produces an advantageous effect of suppressing the corona discharge from occurring. In this case, however, the end portions 3108a and 3109a of the conductive layers 3108 and 3109 in Modification 2 or the end portions 3208a, 3209a, 3209a and 3209b of the external electrodes 3208 and 3209 in Modification 3 are angulated. Therefore, the angulated portions of the end portions may be polished such that the end portions become smaller in thickness towards the ends thereof, drawing a gentle curvature.

Embodiment 4

In recent years, the demand for direct-below-type backlight units (hereinafter referred to as "LCBL units") for large screens has increased as the liquid crystal displays with large screens have been increasingly marketed.

A typical light source of the LCBL units is cold-cathode tubes. The cold-cathode tubes, however, have some problems. For example, they require as many high-frequency electronic ballasts as the cold-cathode tubes for use in an LCBL unit. Due to such problems, other light sources to replace the cold-cathode tubes are sought.

The external electrode type discharge lamp has a merit that even a plurality of the discharge lamps can be lighted by one high-frequency electronic ballast, and thus is suitable for the light source of an LCBL unit that uses, for example, 16 lamps.

Figure 21B:
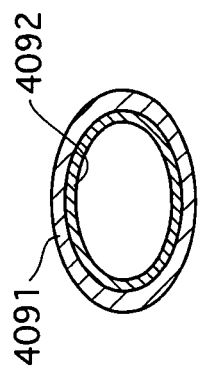
FIG. 21 shows an outline of a conventional, typical dielectric barrier discharge lamp 90.
Figure 21A:
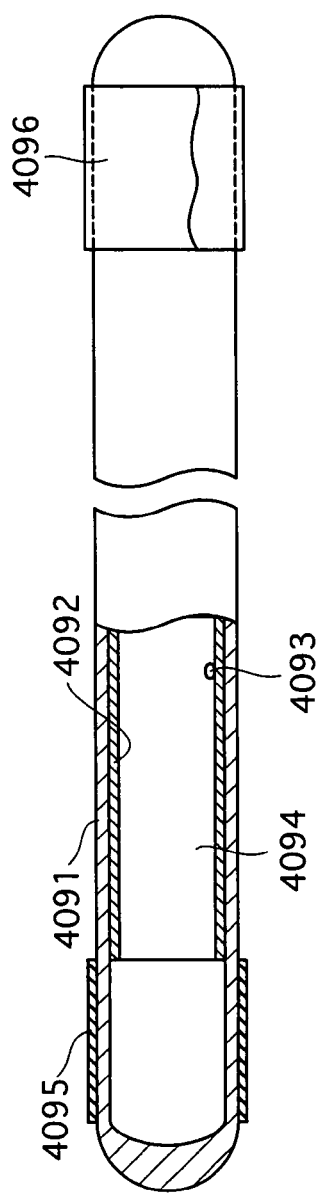

As shown in FIG. 21, a conventional external electrode type discharge lamp 4090, aiming to use thin LCBL units and to expand the light emission range, includes a flattened (elliptical) glass bulb 4091 being a discharge vessel, a phosphor 4092 applied to an inner surface of the tube, mercury 4093 enclosed in the tube, a buffer rare gas 4094 such as neon and argon enclosed in the tube, and a pair of flattened external electrodes 4095 and 4096 provided on the outer surface of the glass bulb (see Japanese Laid-Open Patent Application No. 2003-36723).

However, the conventional external electrode type discharge lamp 4090 (hereinafter merely referred to as "lamp") has a problem that the glass bulb, on which the external electrodes 4095 and 4096 are provided, is elliptical in the cross section, and the elliptic glass bulb requires a larger cathode fall voltage to obtain a predetermined lamp current than the circular glass bulb from which the elliptic glass bulb is formed, thus increasing the lamp wattage.

Also, the elliptic external electrodes 4095 and 4096 are made less accurately than circular ones, and gaps would be generated between the inner surface of the external electrodes 4095 and 4096 and the outer surface of the glass bulb, causing the corona discharge to occur in the gaps during lighting. The corona discharge leads to generation of ozone, and the generated ozone deteriorates the resin members (not illustrated) in the vicinity of the lamp. It is therefore a problem of a discharge lamp that the generation of ozone, even a small amount of which may ill-affect, causes a deterioration and a short life of the resin members that are used in the discharge lamps, backlight units, liquid crystal displays and the like.

Embodiment 4 is aimed to provide a discharge lamp that suppresses the lamp wattage from increasing and ozone from being generated.

As shown in FIGS. 22A to 22D, a discharge lamp 4100 of Embodiment 4 includes a cylindrical glass bulb 4101 being a discharge vessel, and a pair of external electrodes 4109 and 4110 that are formed on the outer surface of the glass bulb 4101 at both ends thereof, where the external electrode 4109 is composed of an electrode body layer 4102 and a coating layer 4104, and the external electrode 4110 is composed of an electrode body layer 4103 and a coating layer 4105. A light extraction portion 4120, central portion of the glass bulb 4101, is flattened in the cross section.

The glass bulb 4101 is made of, for example, borosilicate glass. On the inner surface of the glass bulb 4101, a phosphor layer 4106 is provided. The phosphor layer 4106 is approximately 20 μm thick, and is formed by applying onto the surface a rare-earth phosphor that is a mixture of: red phosphor ($Y_2O_3$:$Eu^{3+}$); green phosphor ($LaPO_4$:$Ce^{3+}$, $Tb^{3+}$); and blue phosphor ($BaMg_2Al_{16}O_{27}$:$Eu^{2+}$). The inner space of the glass bulb 4101 is filled with a rare gas 4107, such as argon and neon, of approximately 8 kPa and with approximately 2 mg of mercury 2108. As shown in FIGS. 22B to 22D, in the glass bulb 4101, a positive column light emitting portion 4120 (the light extraction portion 4120) is elliptical in the cross section, and the electrode body layers 4102 and 4103 are circular in the cross section.

The glass bulb 4101 is not limited to the borosilicate glass, but may be made of, for example, a lead glass, a lead-free glass, or a soda glass. When any of these materials is used, the start-up characteristics in dark surrounding is improved for the following reasons. That is to say, these glasses contain much alkaline metal oxide such as sodium oxide ($Na_2O$). When sodium oxide is contained in the material of the glass bulb, the sodium (Na) component melts into the inner space of the glass bulb with time. Since the sodium has low electronegativity, it is considered that the sodium having melted into the inner space of the glass bulb near the ends thereof contributes to the improvement in the start-up characteristics in dark surrounding.

Especially in the external electrode type phosphor lamps, it is preferable that the material of the glass bulb contains 3 mol % to 20 mol % of alkaline metal oxide.

For example, when the alkaline metal oxide is sodium oxide, it is preferable that the material of the glass bulb contains 5 mol % to 20 mol % of sodium oxide. Otherwise, the following problems are expected. When the glass material contains less than 5 mol % of sodium oxide, it is highly possible that the start-up in dark surrounding takes more than one second (in other words, when the glass material contains 5 mol % or more of sodium oxide, it is highly possible that the start-up in dark surrounding takes one second or less). Conversely, when the glass material contains more than 20 mol % of sodium oxide, a long hours of use makes the glass bulb white in color, resulting in reduction of brightness or reduction of strength of the glass bulb itself.

Furthermore, when the environment-friendliness is taken into account, it is preferable that the glass bulb is made of lead-free glass. It should be noted here that the lead-free glass may take in lead as impurity during the manufacturing process. For this reason, a glass that contains 0.1 wt % or less of lead may be defined as the lead-free glass.

The glass bulb 4101 is not limited to the above-mentioned material, but may be made of, for example, a soda lime glass (hereinafter referred to as "soda glass"). When the workability of the glass is taken into consideration, it is preferable that the glass bulb 4101 is made of a glass material that contains 3% to 20% of sodium oxide. Otherwise, the following problems are expected. When the glass material contains 5% or more of sodium oxide, the start-up in dark surrounding takes approximately one second or less. Conversely, when the glass material contains 20% or more of sodium oxide, a long hours of use makes the glass bulb colored, resulting in reduction of brightness or reduction of strength of the glass bulb 2 itself. Furthermore, when the environment-friendliness is taken into account, it is preferable that the glass bulb 2 is made of glass that contains alkaline metal of the above-described content of rate, and contains 0.1% or less of lead (what is called "lead-free glass"). It is further preferable that the glass contains 0.01% or less of lead.

Measurements of the lamp 4100 are as follows. An overall length T of the lamp 4100 is 715 mm. The length Da of the positive column light emitting portion 4120 (the light extraction portion 4120) in the tube axis X' direction is approximately 680 mm. Lengths Db and Dc, in the tube axis X' direction, of the two end portions of the glass bulb 4101 on which the electrode body layers 4102 and 4103 are provided respectively are each approximately 17 mm. An outer surface area of the positive column light emitting portion 4120 is approximately 105 cm². A minimum outer diameter ao of the approximate ellipse is 4.0 mm. A minimum inner diameter ai of the approximate ellipse is 3.0 mm. A maximum outer diameter bo of the approximate ellipse is 5.8 mm. A maximum inner diameter bi of the approximate ellipse is 4.8 mm. Also, an outer diameter ro of the approximate circle is 5.0 mm, and an inner diameter ri of the approximate circle is 4.0 mm.

The electrode body layers 4102 and 4103 are conductive layers formed on the outer surface of the glass bulb 4101 at both ends thereof. The electrode body layers 4102 and 4103 are provided such that there is a distance δ between an end 4121a (4122a) of the flattened portion of the glass bulb 4101 and an end 4102a (4103a) of the electrode body layer 4102 (4103), where the distance δ is 1 mm or more.

According to results of studies by the inventors of the present invention, during lighting of the lamp in which a high voltage of 1.0 kV to 3.0 kV is applied between the electrode body layers 4102 and 4103, the corona discharge may occur between the end 4121a (4122a) of the flattened portion of the glass bulb 4101 and the end 4102a (4103a) of the electrode body layer 4102 (4103), depending on the distance δ. That is to say, if the distance δ is as small as 1 mm or less, the corona discharge occurs between the end 4121a (4122a) of the flattened portion of the glass bulb 4101 and the end 4102a (4103a) of the electrode body layer 4102 (4103), and this causes ozone to be generated. the generated ozone deteriorates the resin members (not illustrated) rapidly in the vicinity of the lamp. It is therefore a problem of a discharge lamp that the generation of ozone, even a small amount of which may ill-affect, causes a deterioration and a short life of the resin members that are used in the discharge lamps, backlight units, liquid crystal displays and the like.

Further, to prevent the corona discharge from occurring, the coating layers 4104 and 4105 are provided such that the coating layer 4104 (4105) starts from a position that recedes, towards the end 4101b of the glass bulb 4101, from an end 4102a (4103a) of the electrode body layer 4102 (4103) by a distance N (1 mm or more).

In Embodiment 4, the coating layers 4104 and 4105 are 14.0 mm in the overall length, 5.5 mm in outer diameter, 5.1 mm in inner diameter, and 15 μm in thickness. Since the coating layers 4104 and 4105 are not plastic such as a metal foil or metal tape, they are made thick so as to be resistant against flaws.

Here, since the outer diameter of the glass bulb 4101 is 5.0 mm and the inner diameter of the coating layers 4104 and 4105 is 4.0 mm, the average gap between the glass bulb 4101 and the coating layers 4104 and 4105 is 0.05 mm.

The electrode body layers 4102 and 4103 are formed by applying conductive paste, such as silver paste, onto the outer surface of the glass bulb 4101 at both sealed ends thereof, by the dipping method. The overall length of each of the electrode body layers 4102 and 4103 is, for example, 15.5 mm, from each end of the glass bulb 4101, and the thickness thereof is 15 μm.

The conductive paste for the electrode body layers 4102 and 4103 is not limited to silver paste, but may be nickel paste, gold paste, palladium paste, or carbon paste. Also, when the bonding force of the electrode body layers 4102 and 4103 with the surface of the glass bulb 4101, which is required to be strong, is taken into account, it is preferable that the paste contains approximately 1 wt % to 10 wt % of low-melting glass as a binder, and that the specific resistance of the low-melting glass is approximately $10^{-1}$ Ωcm to $10^{-6}$ Ωcm.

Further, to suppress the corona discharge from occurring during lamp lighting, it is preferable that although not illustrated, the end portions of the electrode body layers 4102 and 4103 in the vicinities of the ends 4102a and 4103a are chamfered such that the chamfered end portions become smaller in thickness towards the ends.

FIGS. 23A to 23D show how the glass bulb 4101 of the lamp 4100 is formed.

Figure 23A:
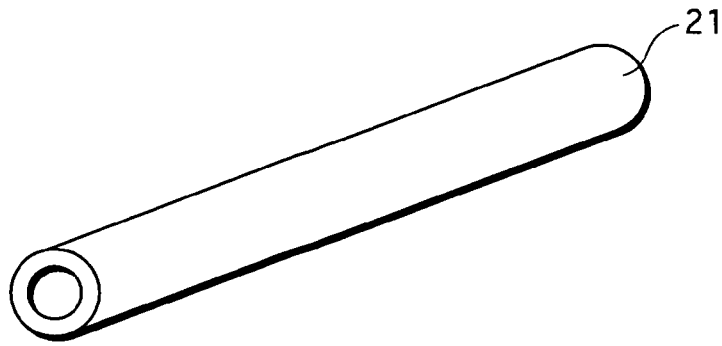
FIGS. 23A to 23D show how the glass bulb in Embodiment 4 is formed.
Figure 23B:
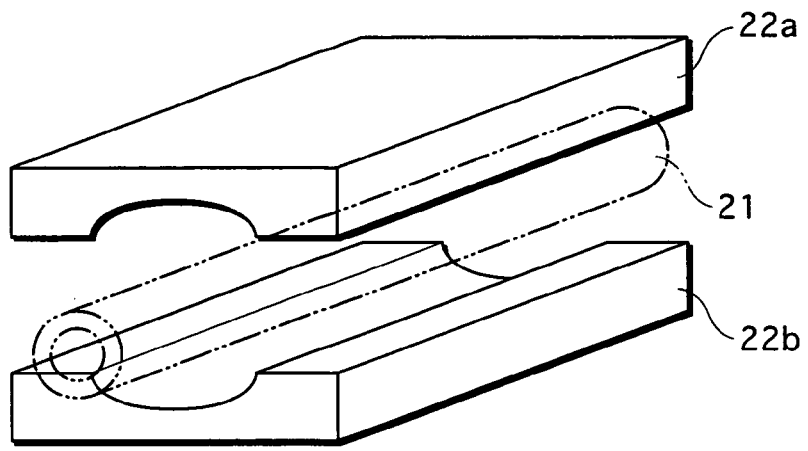
Figure 23C:
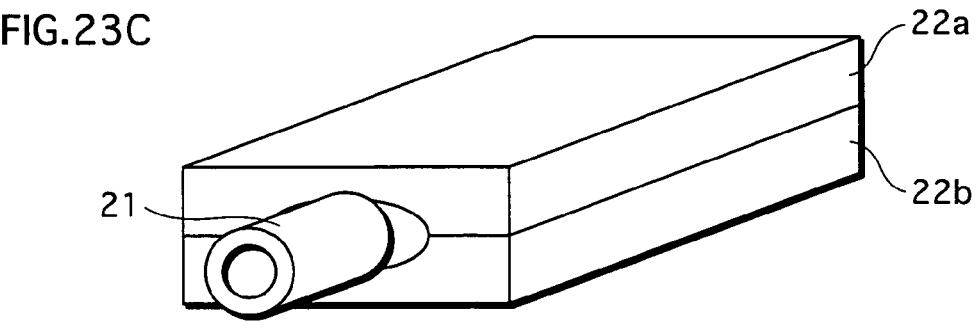
Figure 23D:
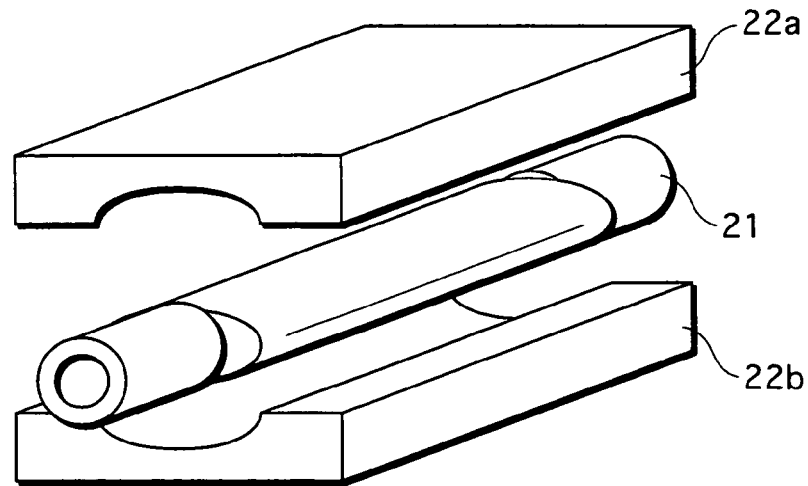

In Step (a), as shown in FIG. 23A, a straight glass bulb 21 made of borosilicate glass (the softening point is 765° C.) is prepared. In Step (b), as shown in FIG. 23B, the glass bulb 21 is set so that a portion thereof that is to be flattened is sandwiched by jig plates 22a and 22b made of stainless steel. In Step (c), as shown in FIG. 23C, the glass bulb 21 is heated by a heating furnace (not illustrated) to a tube temperature (for example, a temperature in a range from 620° C. to 700° C.) lower than the softening point, so that the sandwiched portion is flattened by the weight of the jig plate 22a. In Step (d), as shown in FIG. 23D, by removing the jig plates 22a and 22b, obtained is the glass bulb 21 whose specific portion having been deformed as desired from an approximate circle to an approximate ellipse in the cross section. It should be noted here that the method of forming the glass bulb is not limited to the above-described one.

The glass bulb 4101 of Embodiment 4 is formed by subjecting the straight tube lamp A (the outer and inner diameters are respectively 5.0 mm and 4.0 mm) to the above-described steps (b) to (d). Through these steps, the shape, in the cross section, of an approximate circle with the outer diameter of 5.0 mm and the inner diameter of 4.0 mm is changed to an approximate ellipse with the maximum outer diameter of 5.8 mm, the minimum outer diameter of 4.0 mm, the maximum inner diameter of 4.8 mm, and the minimum inner diameter of 3.0 mm. It should be noted here that in the case of flattening the straight tube lamp A with the outer diameter of 5.0 mm by the above-described formation method, it is desirable that the settings are made so that in the deformed glass bulb, the maximum outer diameter bo is 6.6 mm and the minimum outer diameter ao is 3.0 mm at the largest (the ellipticity in this case is ao/bo≈0.45). This is because if the tube is excessively flattened, the tube greatly changes in thickness, decreasing the yield.

The following describes the advantageous effects produced by the discharge lamp 4100.

In Embodiment 4, the cylindrical glass bulb 4101 is provided with a pair of electrode body layers 4102 and 4103 at both ends thereof. This suppresses the lamp wattage from increasing. Also, the construction prevents a gap from being formed between the outer surface of the glass bulb 4101 and the inner surface of the electrode body layers 4102 and 4103. This suppresses the generation of ozone. Embodiment 4 therefore provides a discharge phosphor lamp provided with electrode body layers that live as long as the other portions of the lamp.

Furthermore, the electrode body layers 4102 and 4103 are provided such that there is a distance δ between an end 4121a (4122a) of the flattened portion of the glass bulb 4101 and an end 4102a (4103a) of the electrode body layer 4102 (4103). This construction prevents a discharge from occurring between the end 4121a (4122a) of the flattened portion of the glass bulb 4101 and the end 4102a (4103a) of the electrode body layer 4102 (4103), thus preventing ozone from being generated.

Also, by setting the distance δ to be 1 mm or more, it is possible to prevent the corona discharge from occurring during lamp lighting between the end 4121a (4122a) of the flattened portion of the glass bulb 4101 and the end 4102a (4103a) of the electrode body layer 4102 (4103), regardless of varying attachment positions of the electrode body layer 4102 and 4103. Further, by setting the distance δ to be as small as, for example, 1 mm, it is possible to reduce the overall length of the lamp.

With the construction that the electrode body layers 4102 and 4103 are conductive layers formed on the outer surface of the glass bulb 4101 at both ends thereof, the bonding force of the electrode body layers 4102 and 4103 with the outer surface of the glass bulb 4101 is improved, further suppressing the generation of ozone.

With the construction that the coating layers in the shape of a cap or a sleeve are provided to cover the outer surface of the electrode body layers 4102 and 4103 by 3 mm or more each in length, damages on the outer surface of the electrode body layers 4102 and 4103 are reduced, and a stable connection is maintained even when the coating layer 4104 (4105) is connected to an electrode socket (not illustrated).

With the construction that the coating layers 4104 and 4105 are provided such that the coating layer 4104 (4105) starts from a position that recedes, towards the end 4101b of the glass bulb 4101, from an end 4102a (4103a) of the electrode body layer 4102 (4103) by a distance N, no gap is made between the coating layers 4104 and 4105 and the glass bulb 4101 at the ends 4104a and 4105a of the coating layers 4104 and 4105, preventing the corona discharge from occurring during lamp lighting. Conversely, if it is constructed in such a manner that an ends 4104a (4105a) of the coating layer 4104 (4105) extends towards the center of the glass bulb surpassing the end 4102a (4103a) of the electrode body layer 4102 (4103), such a gap would be made between the coating layers 4104 and 4105 and the glass bulb 4101 at the ends 4104a and 4105a, allowing the corona discharge to occur. Also, since the distance N is set to be 1 mm or more, the corona discharge is prevented from occurring during lamp lighting between the coating layers 4104 and 4105 and the glass bulb 4101 at the ends 4104a and 4105a, regardless of varying attachment positions of the coating layers 4104 and 4105.

Also, the end portions of the coating layers 4104 and 4105 in the vicinities of the ends 4104a and 4105a near the ends 4121a and 4122a of the flattened portion of the glass bulb 4101 are chamfered. This makes the coating layers 4104 and 4105 easy to attach to the ends of the glass bulb 4101, and makes the outer surface of the electrode body layers 4102 and 4103 difficult to be damaged when the coating layers 4104 and 4105 are attached to the ends of the glass bulb 4101.

With the construction that the conductive paste for the electrode body layers 4102 and 4103 is one of silver paste, nickel paste, gold paste, palladium paste, and carbon paste, the bonding force of the electrode body layers 4102 and 4103 with the surface of the glass bulb 4101 is improved, and the electrode body layers 4102 and 4103 and the glass bulb 4101, which mediates between the electrode body layers 4102 and 4103 with the discharge space, become equivalent, and the first capacitance and the second capacitance have substantially the same electrostatic capacitance.

With the construction that the conductive paste contains approximately 1 wt % to 10 wt % of low-melting glass, the outer surface of the electrode body layers 4102 and 4103 is prevented from having damages when the coating layers 4104 and 4105 are attached to the ends of the glass bulb 4101.

1. Modification 1 to Embodiment 4

Figure 24:
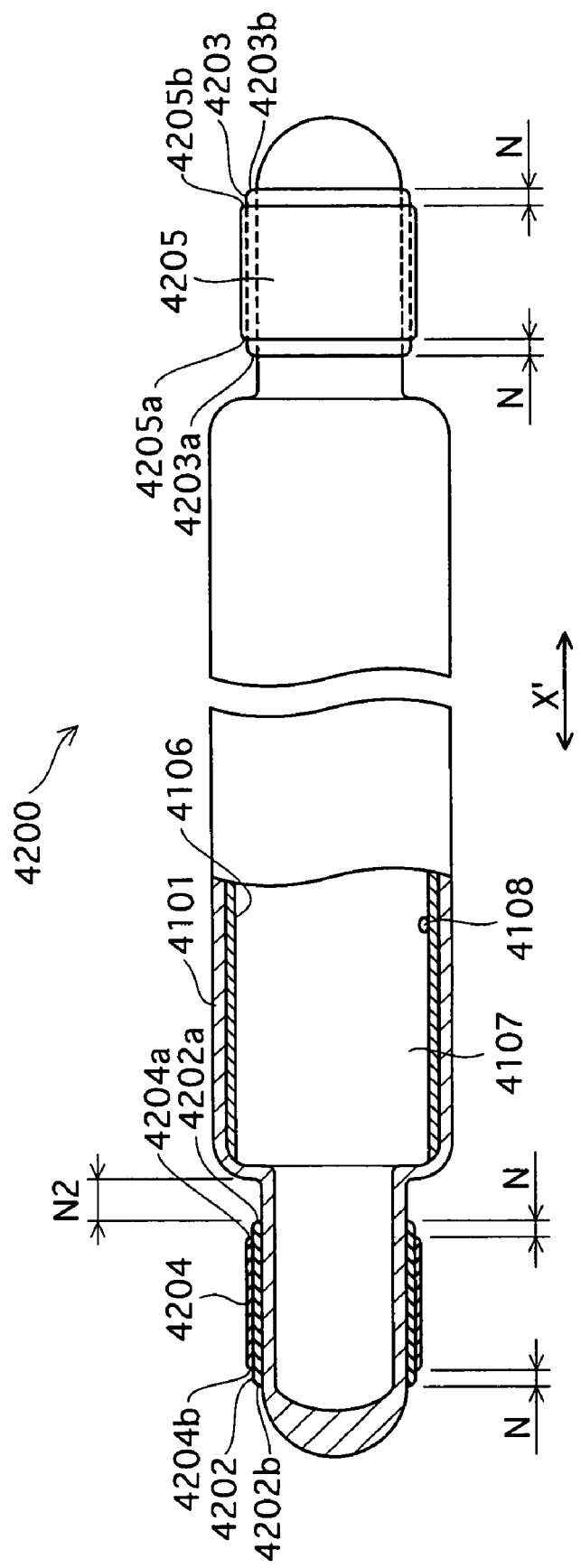
FIG. 24 shows an outline of the discharge lamp in Modification 1 to Embodiment 4.

FIG. 24 shows an outline of the discharge lamp in Modification 1 to Embodiment 4. Modification 1 to Embodiment 4 is different from Embodiment 4 in the following. Electrode body layers 4202 and 4203 are formed by the dipping method to be cylindrical. Such an electrode body layer is formed by, for example, masking an end of the glass bulb 4101 and applying silver paste to the outer surface of the glass bulb at the end. Coating layers 4204 and 4205, in the shape of a sleeve (cylinder), are inserted respectively from both ends of the glass bulb 4101, by the shrink fit method, to be fitted with the electrode body layers 4102 and 4103 to be in close contact therewith. Both ends 4204a and 4204b of the coating layer 4204 in the shape of a sleeve (or both ends 4205a and 4205b of the coating layer 4205 in the shape of a sleeve) recede inward respectively from ends 4202a and 4202b of the electrode body layer 4202 (or ends 4203a and 4203b of the electrode body layer 4203), by a distance N.

It should be noted here that the same reference numerals are applied to parts corresponding to the discharge lamp 4100 in Embodiment 4, and the description thereof is omitted.

With the construction of Modification 1 to Embodiment 4, no gap is made between the coating layers 4204 and 4205 and the glass bulb 4101 at the ends 4204a and 4205a of the coating layers 4204 and 4205, preventing the corona discharge from occurring during lamp lighting. Conversely, if it is constructed in such a manner that an ends 4204a (4205a) of the coating layer 4204 (4205) extends towards the center of the glass bulb surpassing the end 4202a (4203a) of the electrode body layer 4202 (4203), such a gap would be made between the coating layers 4204 and 4205 and the glass bulb 4101 at the ends 4204a and 4205a, allowing the corona discharge to occur. Thus, Modification 1 to Embodiment 4 provides a discharge lamp provided with electrode body layers that live as long as the other portions of the lamp. Also, with the construction that both ends 4204a and 4204b of the coating layer 4204 in the shape of a sleeve (or both ends 4205a and 4205b of the coating layer 4205 in the shape of a sleeve) recede inward respectively from ends 4202a and 4202b of the electrode body layer 4202 (or ends 4203a and 4203b of the electrode body layer 4203), by a distance N, the corona discharge is suppressed from occurring between the coating layers 4204 and 4205 and the glass bulb 4101 at the ends 4204a and 4205a during lamp lighting, regardless of varying attachment positions of the coating layers 4204 and 4205 in the tube axis X' direction. Furthermore, with the construction that the coating layers 4204 and 4205 having been formed in the shape of a cylinder are fitted to be in close contact with the electrode body layers 4102 and 4103 by the shrink fit method, the bonding force of the coating layers 4204 and 4205 with the electrode body layers 4102 and 4103 is improved and the electric connection is stabilized.

<Production Method of Discharge Lamp>

A production method of the discharge lamp according to the present invention will be described, using the discharge lamp 1 in Embodiment 1 as an example. The production method of the discharge lamp according to the present invention is characterized by the method of forming the external electrodes. With respect to the methods of forming the phosphor layer, protection layer, glass bulb or the like, known technologies are applied and the description thereof is omitted. Accordingly, the method of forming the external electrodes will be described in detail in the following.

A glass bulb, which has been sealed after, according to known methods, the protection layer and the phosphor layer have been formed on the inner surface thereof, and mercury and a buffer rare gas have been enclosed therein, is prepared.

Figure 25:
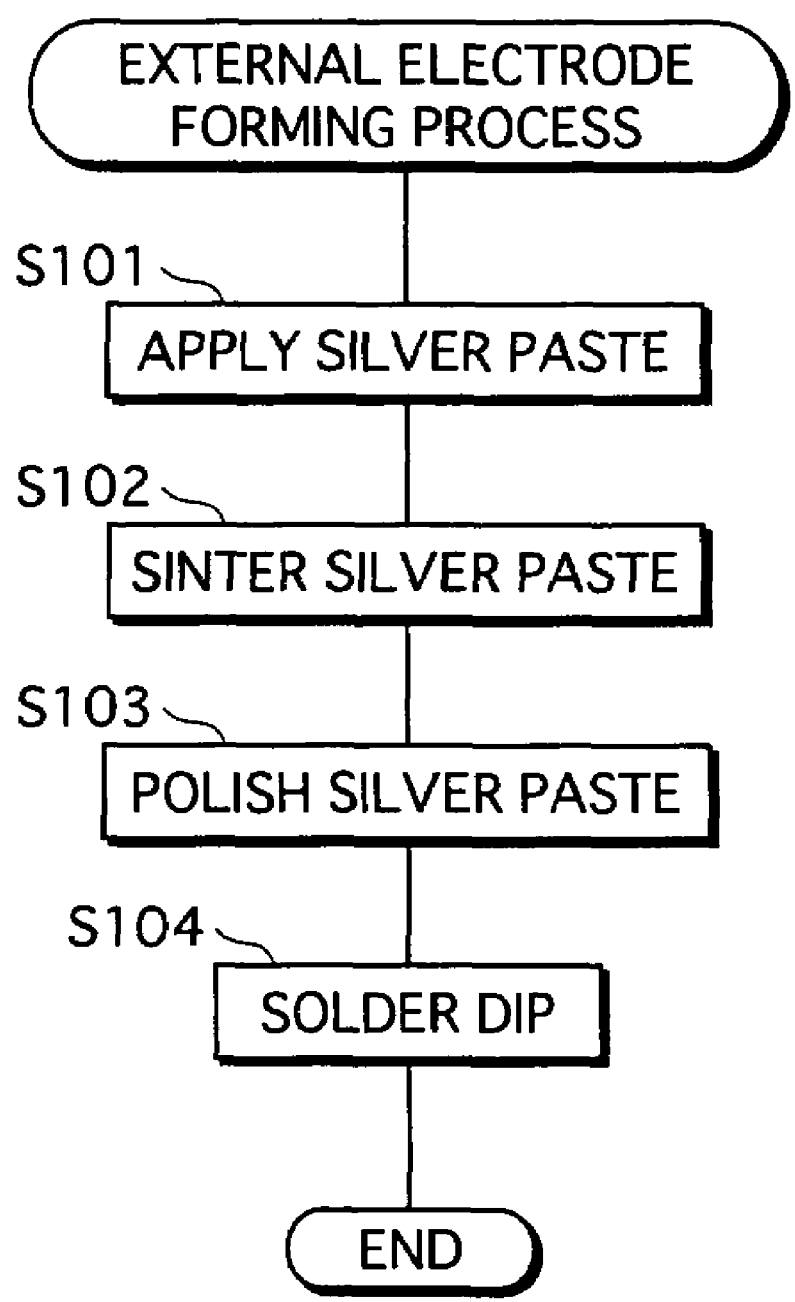
FIG. 25 is a flowchart showing the procedure of forming the external electrodes.

FIG. 25 is a flowchart showing the procedure of forming the external electrodes. First, silver paste is applied by the screen printing method to the areas of the outer surface of the glass bulb at both ends thereof (step S101). It should be noted here that silver paste may be applied by another method such as the gravure printing method or the dipping method.

The main constituent of the silver paste is silver. Here, the main constituent means a constituent that occupies the most percentage of the composition and greatly affects the property of the composition. Accordingly, a compound other than silver may be included as an additive. A glass frit may be added to the silver paste. For example, if a glass frit containing 1.0 wt % to 5.0 wt % of bismuth (Bi) is added, the bonding force of the silver paste to the glass bulb 2 is enhanced by the anchor effect of the glass frit. Other than this, ethylcellulose, for example, may be used as the additive. On the other hand, to provide an environment-friendly discharge lamp 1, it is preferable that materials as environmental loads such as lead, antimony, arsenic, and gallium are not added.

In the next step, the glass bulb applied with the silver paste is put into an electric furnace. Then, the temperature in the electric furnace is increased to approximately 600° C., and the glass bulb is sintered for approximately five minutes while the temperature of approximately 600° C. is maintained (step S102). With this sintering, the glass frit in the silver paste melts and the silver paste is bonded with the glass bulb. The silver paste bonded with the glass bulb at this stage is called pre-electrode body layers.

The surface of the pre-electrode body layers is irregular since the sintering in the electric furnace evaporates the dilute solution for the paste and the resin component in the silver paste. It is preliminarily known that if the pre-electrode body layers are dipped into the melted solder in the coating step which will be described later, the solder would not excellently attach to the surface of the pre-electrode body layers.

This is the reason why in the next step (step S103), the pre-electrode body layers are polished. More specifically, the polishing of the pre-electrode body layers is performed by, for example, a method in which the surface is polished by a metal abrasive that contains, as a compound, a mineral such as alumina, or a method in which the surface is polished by metal abrasive tape. The polishing increases flat areas on the surface of the pre-electrode body layers, which improves the wettability of the solder.

Also, the pre-electrode body layers are polished such that the end portions of the pre-electrode body layers become smaller in thickness towards the ends thereof. This completes the electrode body layers 7. The steps S101 to S103 in this procedure corresponds to the electrode body layer forming step.

The next step (step S104) is a coating step in which the coating layer is formed by dipping the electrode body layers into the melted solder contained in a melting basin.

A melting basin containing melted solder is prepared. The solder is composed of: 95.2 wt % of tin; 3.8 wt % of silver; and 1.0 wt % of copper. The melting point of the solder is 230° C.

Figure 26A:
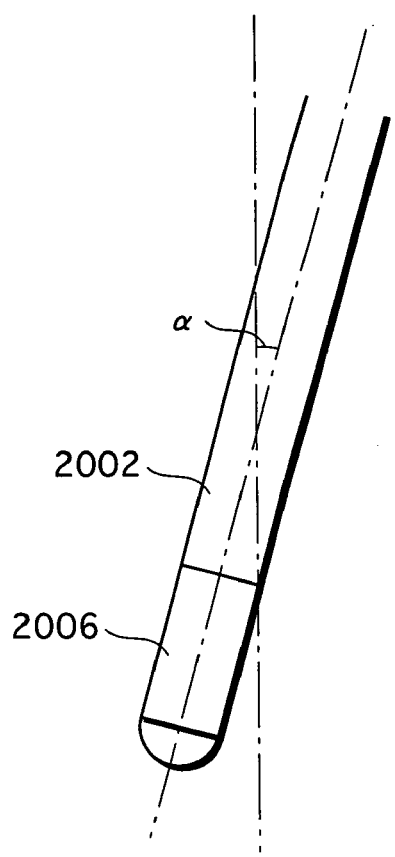
FIGS. 26A and 26B are provided to explain the angle of the glass bulb when it is dipped into the melted solder contained in a melting basin.
Figure 26B:
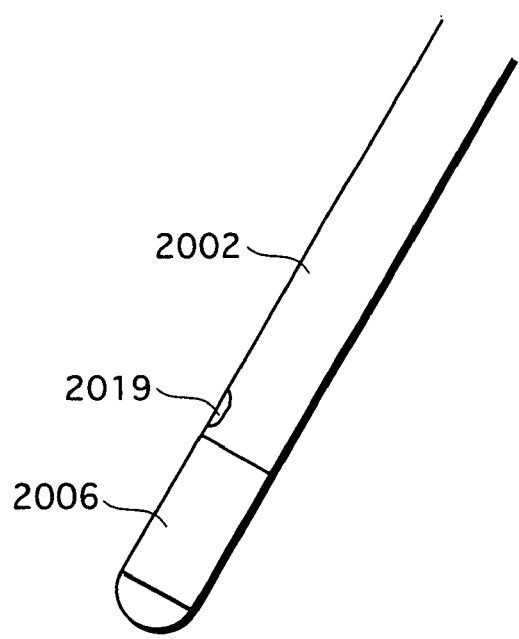

FIGS. 26A and 26B are provided to explain the angle of the glass bulb when it is dipped into the melted solder contained in a melting basin.

As shown in FIG. 26A, when the glass bulb is dipped into the melted solder, it is preferable that an angle α, which is formed by the tube axis of the glass bulb and the vertical line, is kept to be five degrees or less. This is because if the glass bulb is dipped into the melted solder with the angle α being more than five degrees and then pulled up, the solder is also attached to an area of the glass bulb that does not need to be coated with the solder, and what is called remnant solder 19 is generated, as shown in FIG. 26B.

FIG. 27 is a table showing relationships among the temperature of the melted solder, dipping time, and dipping results.

In the table, the "solder wettability" is evaluated into three ranks represented by signs "○", "Δ", and "X", where the sign "○" denotes that it is excellent, the sign "Δ" denotes that it is excellent to a certain degree, and the sign "X" denotes that it is bad. As understood from the table, the solder wettability is excellent when the temperature of the melted solder and the dipping time are appropriate.

Also, in the table, "solder heap X" indicates that the coating is in a bad state since the solder is heaped as a block because the temperature of the melted solder is close to the melting point (230° C.).

In the table, "silver transfer" indicates a phenomenon in which silver in the silver paste constituting the electrode body layer melts into the melted solder. In the table, "silver transfer Δ" indicates that silver is not present locally in the electrode body layer, and "silver transfer x" indicates that silver is not present in half or more portion of the electrode body layer. When the silver transfer occurs, a hole is made in the electrode body layer, and the electrostatic capacitance of the discharge lamp changes. Therefore, the solder dipping needs to be performed so as not to allow the silver transfer to occur.

It should be noted here that in the present embodiment, the silver transfer is difficult to occur since the solder contains silver. To make the silver transfer difficult to occur, it is preferable that the content of silver is in the range of 1.0 wt % to 8.0 wt %.

From the table shown in FIG. 27, it is understood that the solder wettability is excellent and the silver transfer does not occur when the glass bulb is dipped: for two to five seconds into the melted solder at 235° C.; for one to three seconds into the melted solder at 240° C.; for one to three seconds into the melted solder at 250° C.; for one to two seconds into the melted solder at 260° C.; or for one second into the melted solder at 265° C.

With the above-described dipping of the glass bulb into the melted solder in the melting basin, the coating layer 8 made of the solder is formed on the electrode body layer 7.

The above-described step S104 in this procedure corresponds to the coating layer forming step.

The coating layer 8 is formed on the electrode body layer 7 whose end portions become smaller in thickness towards the ends thereof. Also, due to the surface tension of the coating layer made of solder, the end portions of the coating layer 8 also become smaller in thickness towards the ends thereof.

With the production steps described above, the external electrodes 3 and 4, whose end portions become smaller in thickness towards the ends thereof, are formed on the outer surface of the glass bulb 2.

Up to now, the present invention has been explained through some specific embodiments thereof. However, the present invention is not limited to such embodiments, but may be modified in various ways as the following shows, for example.

1. Modification 1

In the above-described electrode body layer forming step, First the pre-electrode body layers are formed, then the pre-electrode body layers are polished to obtain the electrode body layers whose end portions become smaller in thickness towards the ends thereof. However, the method of forming the electrode body layers is not limited to this method.

For example, the following method may be applied. First, silver paste is applied to the surface of the glass bulb. Then, immediately after this, the applied silver paste is pressed by a mold that is flat in the center area and is curved in the end portions. This method also provides the electrode body layers whose end portions become smaller in thickness towards the ends thereof.

2. Modification 2

In the above description, the coating layer made of solder is formed by the solder dipping method. However, not limited to this, a coating layer made of another material may be formed by another method. For example, a coating layer made of nickel or copper may be formed by plating the electrode body layer with nickel or copper by the known nonelectrolytic or electrolytic plating method. In this case, the coating layer is formed on the electrode body layer whose end portions become smaller in thickness towards the ends thereof, and the external electrodes are each composed of an electrode body layer and a coating layer. Accordingly, in this case also, the external electrodes whose end portions become smaller in thickness towards the ends thereof are obtained. This makes the corona discharge difficult to occur in the external electrodes, and makes it possible to obtain a discharge lamp in which ozone is difficult to occur.

<Construction of Backlight Unit>

Figure 28:
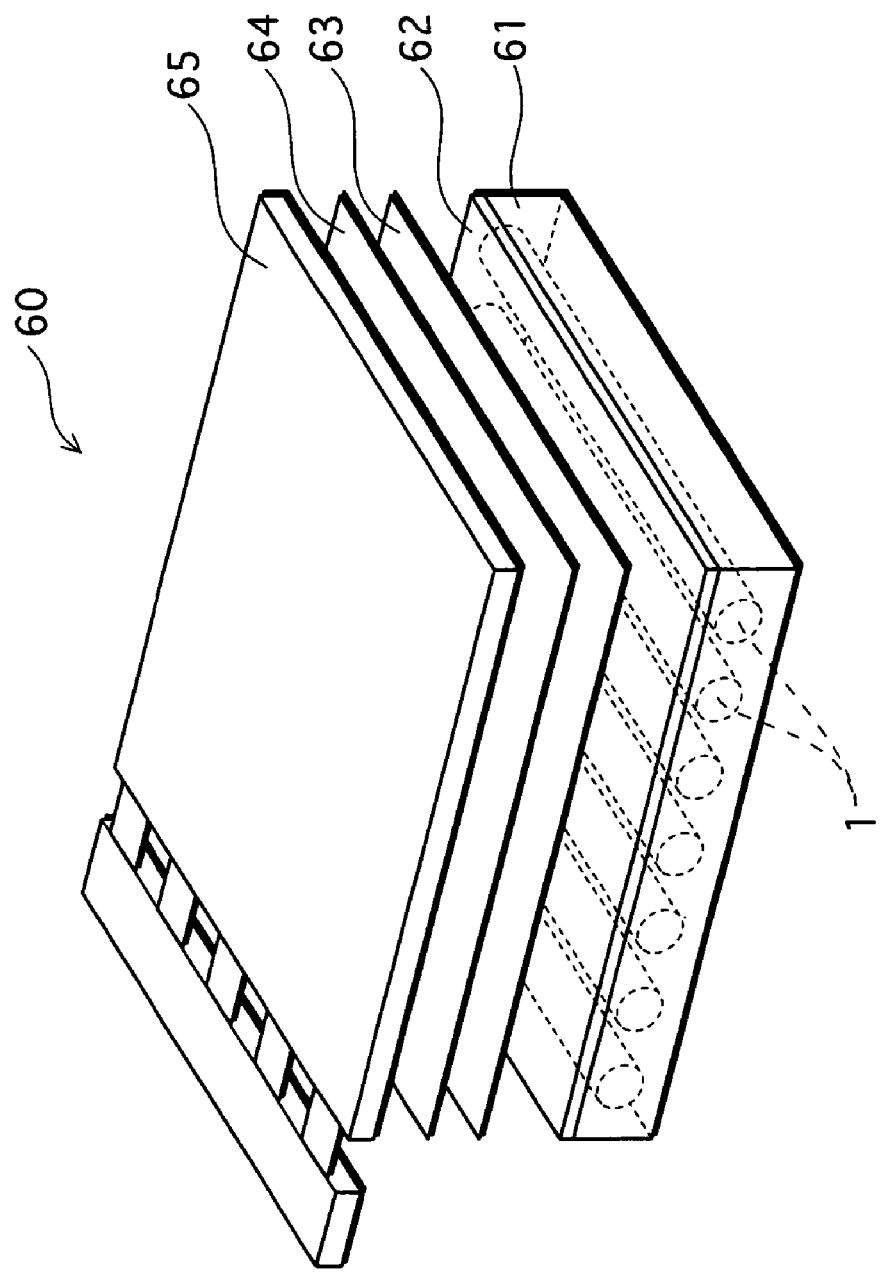
FIG. 28 is an exploded perspective view showing an outline structure of a backlight unit and the like in an embodiment of the present invention.
Figure 29:
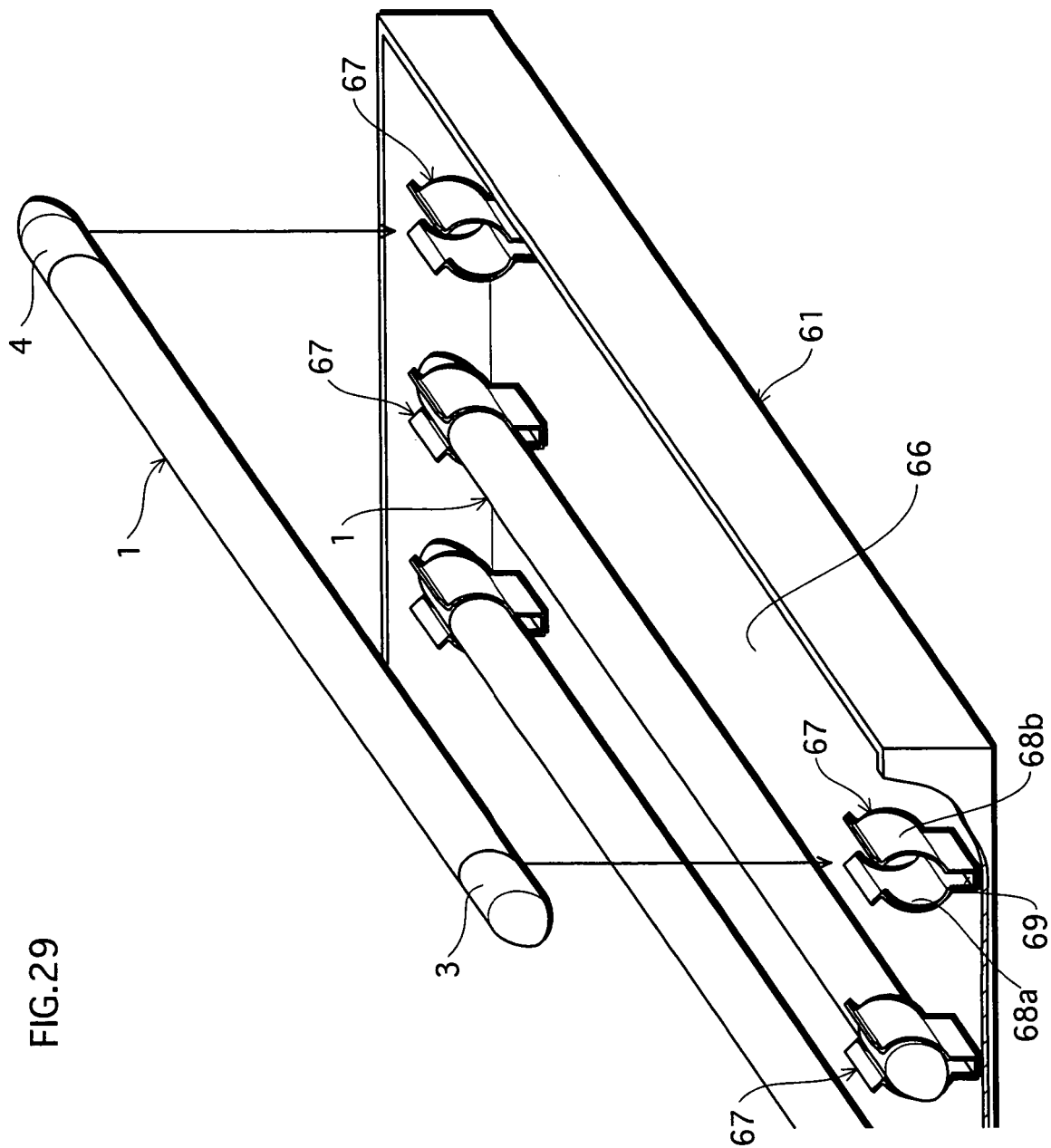
FIG. 29 shows how discharge lamps are attached.

FIG. 28 is an exploded perspective view showing an outline structure of a backlight unit and the like in an embodiment of the present invention. FIG. 29 shows how discharge lamps are attached.

A backlight unit 60 in an embodiment of the present invention is a direct-below-type backlight unit for the liquid crystal television, and is basically structured as conventional backlight units.

As shown in FIG. 28, the backlight unit 60 includes an outer container 61, a diffusion plate 62, a diffusion sheet 63, and a lens sheet 64 which are arranged in the back of a liquid crystal panel 65.

The outer container 61 is a box made of white polyethylene terephthalate (PET). As shown in FIG. 29, the bottom of the rectangular outer container is a reflection plate 66. A plurality of discharge lamps 1 are arranged in parallel to each other at regular intervals in the outer container 61. The light emitted from the discharge lamps 1 goes toward the diffusion plate 62 through the opening of the outer container 61.

A plurality of sockets 67 are provided on the reflection plate 66 at predetermined positions so that each discharge lamp 1 is attached to a pair of sockets 67. Each socket 67 is manufactured by bending a plate made of, for example, a copper alloy such as phosphor bronze. Each socket 67 is composed of a pair of supporting portions 68a and 68b and a linking portion 69 linking the bottoms of the supporting portions 68a and 68b.

The supporting portions 68a and 68b each have a concave that fits onto the outer shape of the discharge lamp 1. When the discharge lamp 1 is fitted into the concaves of the supporting portions, the discharge lamp 1 is held by the sockets 67 by the plate spring action of the supporting portions 68a and 68b, and the sockets 67 are electrically connected with the external electrodes 3 and 4.

An electronic ballast (not illustrated) of the backlight unit 60 supplies power via the sockets 67 to the discharge lamp 1 attached to the backlight unit 60, where the electronic ballast will be described later.

The diffusion plate 62 is a plate made of polycarbonate (PC) resin, and is arranged to close the opening of the outer container 61. The diffusion sheet 63 is made of polycarbonate resin. The lens sheet 64 is made of acrylic resin. These plate or sheet members are stacked on the diffusion plate 62 one by one.

In the discharge lamp 1 in Embodiment 1, the coating layer 8 covering the electrode body layer 7 prevents the electrode body layer 7 from being chipped off or removed when the electrode body layer 7 bumps on the edge of the supporting portion 68a or 68bm.

Figure 30:
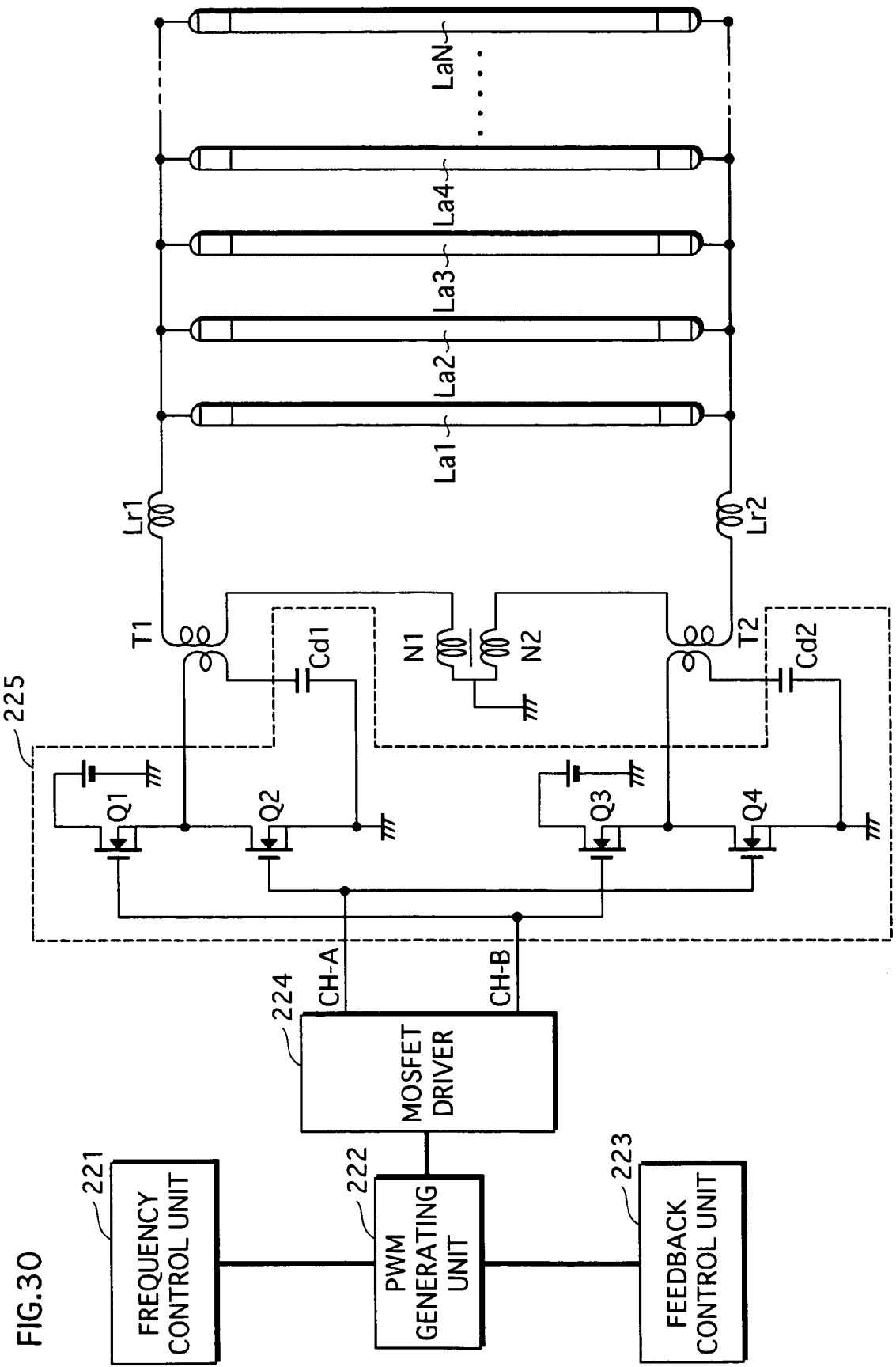
FIG. 30 shows the construction of the lighting circuit in an embodiment of the present invention.

The electronic ballast will be described with reference to FIG. 30. FIG. 30 shows the construction of the electronic ballast in an embodiment of the present invention. The electronic ballast includes a frequency control unit 221, a pulse width modulation (PWM) generating unit 222, a feedback control unit 223, an MOSFET driver 224, an inverter circuit 225, step-up transformers T1 and T2, correction inductors N1 and N2, resonance inductors Lr1 and Lr2, and discharge lamps La1-LaN.

The frequency control unit 221 controls the frequency of the pulses generated by the PWM generating unit 222.

The PWM generating unit 222 generates pulses that have been adjusted with respect to the ratio of ON and OFF.

The feedback control unit 223 detects the total sum of the lamp current by monitoring the current flowing through the correction inductors N1 and N2, and controls the PWM generating unit 222 so that the total sum of the lamp current is constant.

The MOSFET driver 224 changes the signals that are to be output to the gates of the transistors Q1-Q4 of the inverter circuit 225, based on the input signals from the PWM generating unit 222.

The correction inductors N1 and N2 are devices that correct voltages so that the same voltage is applied to the discharge lamps La1-LaN in each lamp.

Outputs of the frequency control unit 221 and the feedback control unit 223 are input to the PWM generating unit 222. Outputs from the PWM generating unit 222 are input to the MOSFET driver 224. The MOSFET driver 224 outputs to the inverter circuit 225 over two channels: CH-A and CH-B.

The inverter circuit 225 includes the transistors Q1-Q4 and capacitors Cd1 and Cd2. The outputs of the inverter circuit 225 are input to primary side coils of the step-up transformers T1 and T2. One end of the secondary side coil of the step-up transformer T1 is connected to one end of the secondary side coil of the step-up transformer T2 in series via the correction inductors N1 and N2. The other ends of the step-up transformers T1 and T2 are connected to the resonance inductors Lr1 and Lr2, respectively.

The discharge lamps La1-LaN are connected in parallel, and are connected in series with the resonance inductors Lr1 and Lr2, respectively. In the equivalent circuit, the electrodes are represented as a pair of electrodes that are connected to a capacitance in series.

The step-up transformers T1 and T2 are driven by the inverter circuit 225. On the secondary side of the step-up transformers T1 and T2, an LCR series resonance circuit, which includes the total sum of the capacitance components of the discharge lamps La1-LaN and the resonance inductors Lr1 and Lr2, is provided. The switching frequency of the inverter circuit 225 is controlled by the frequency control unit 221 such that at the lamp start-up, it is lower than the frequency during lighting and becomes higher as the lamp temperature increases.

At the lamp start-up when the lamp temperature is low, the voltage in the lamp discharge path is high and impedance is high. Each of the discharge lamps La1-LaN has impedance for limiting the lamp current. The tube voltage when the lamp has high impedance is stabilized by increasing the impedance in the start-up period in line with the lamp temperature. This enables start-up failures, which occur due to shortage of the start-up voltage, to be reduced.

Also, during the stable lighting, it is possible to increase the output efficiency of the lighting circuit, by increasing the frequency so that the LCR series resonance circuit operates fully.

With respect to the increase in the lamp impedance at a light control, it is also possible to design to keep the output efficiency of the lighting circuit during the normal lighting, by reducing the operation frequency and suppressing the variation in the lamp current.

Up to now, the backlight unit of the present invention has been explained specifically through an embodiment thereof. It should be noted here that the backlight unit of the present invention is not limited to the direct-below type, but may be, for example, the edge type (also called the satellite type or the light guide plate type).

<Construction of Liquid Crystal Display Apparatus>

In recent years, the demand for backlight units for large screens has increased as the liquid crystal displays with large screens have been increasingly marketed. Discharge lamps with the electrodes provided outside a glass bulb have been developed for use in such backlight units. The external electrode type discharge lamp (hereinafter merely referred to as "discharge lamp") has a merit that even a plurality of the discharge lamps can be lighted by one high-frequency lighting circuit, and thus is suitable for backlight units for large screens in which a large number of discharge lamps are used.

Meanwhile, Japanese Laid-Open Patent Application No. 2004-146351 discloses a discharge lamp 2001 shown in FIG. 15. The discharge lamp 2001 includes a pair of cap-shaped external electrodes 2002 and 2003 and a glass bulb 2004, where the external electrodes 2002 and 2003 are fitted on the glass bulb 2004 at both ends thereof. Blast-processed surfaces 2005 are formed on the outer surface of the glass bulb 2004, as areas on which the external electrodes 2002 and 2003 are to be formed. Then the external electrodes 2002 and 2003 having a uniform thickness are formed on the blast-processed surfaces 2005 by the ultrasonic solder dipping method.

However, the inventors of the present invention found through studies that although the external electrodes 2002 and 2003 having a uniform thickness are formed on the blast-processed surfaces 2005 by the ultrasonic solder dipping method, the corona discharge occurs between the glass bulb 2004 and the end 2002a and between the glass bulb 2004 and the end 2003a since the end 2002a and the end 2003a are angulated. The corona discharge leads to generation of ozone, and the generated ozone deteriorates the resin members (not illustrated) in the vicinity of the lamp. It is therefore a problem of a discharge lamp that the generation of ozone, even a small amount of which may ill-affect, causes a deterioration and a short life of the resin members that are used in the discharge lamps, backlight units, liquid crystal displays and the like.

The liquid crystal display apparatus of the present invention is therefore aimed to provide a liquid crystal television that suppresses the corona discharge from occurring when the lamp is lighted.

Figure 31:
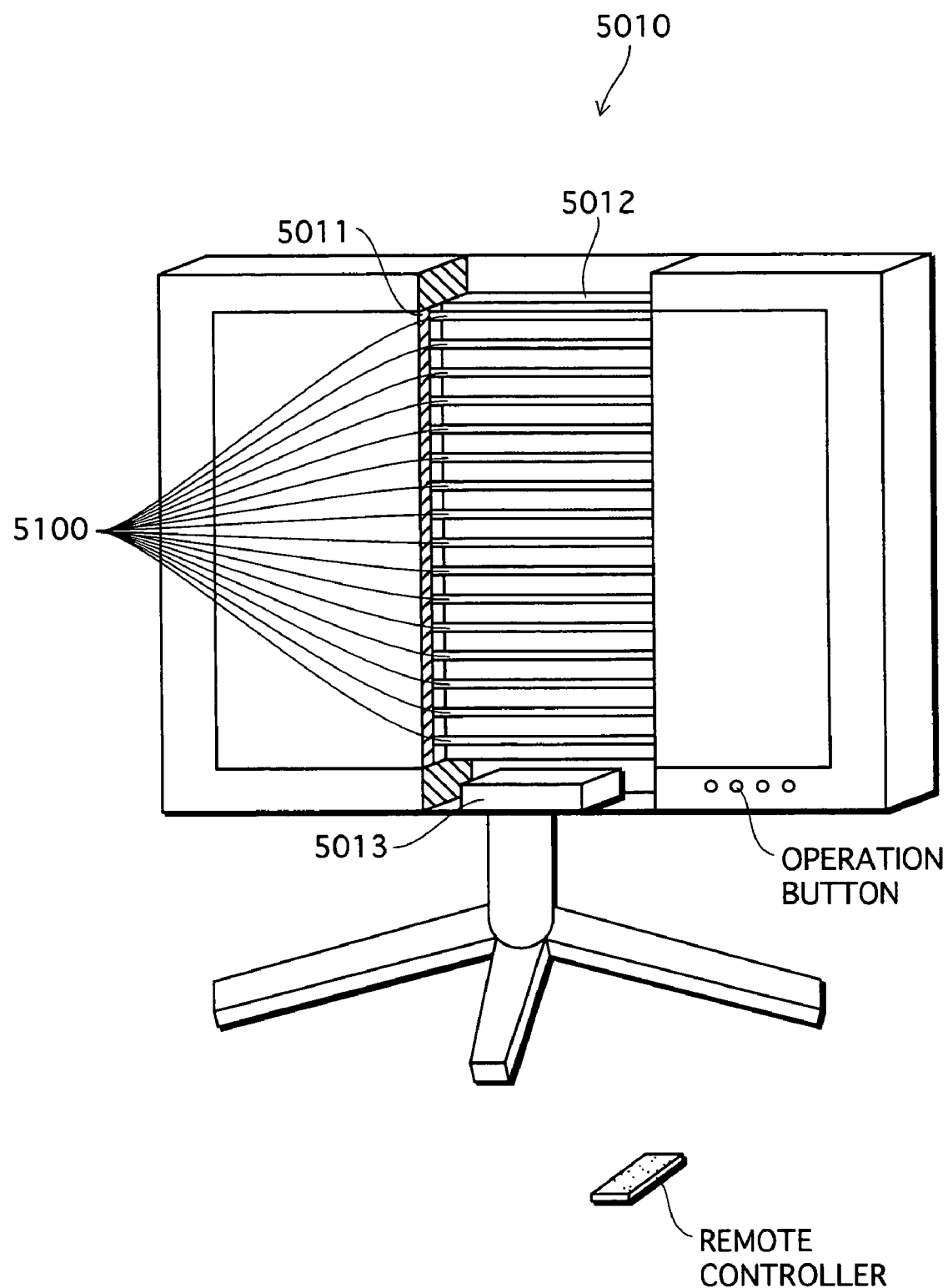
FIG. 31 shows an outline of a liquid crystal display apparatus in an embodiment of the present invention.
Figure 32:
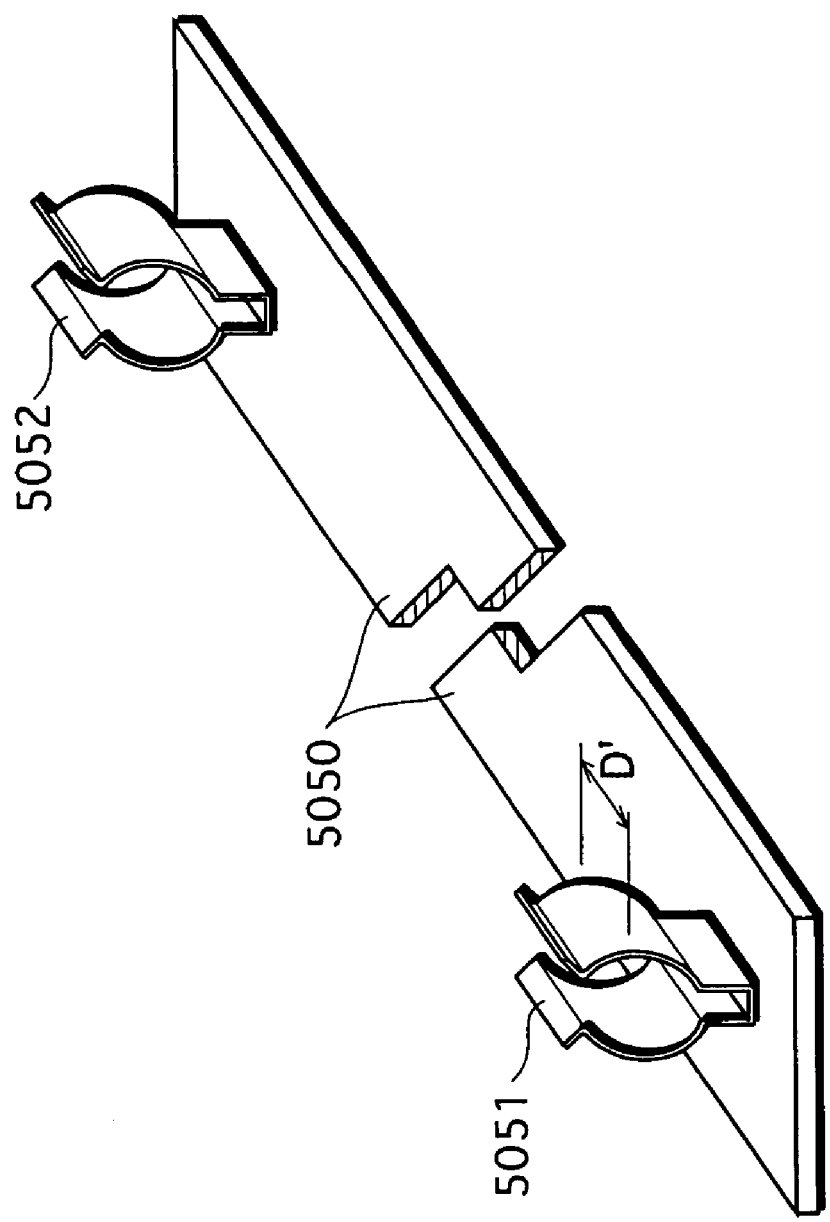
FIG. 32 shows an outline of a socket base plate.

FIG. 31 shows an outline of a liquid crystal display apparatus in an embodiment of the present invention. FIG. 32 shows an outline of a socket base plate.

A liquid crystal television 5010 shown in FIG. 31 as the liquid crystal display apparatus is, for example, a 32-inch liquid crystal television, and includes a liquid crystal screen unit 5011 and a backlight unit 5012.

The liquid crystal screen unit 5011 includes a color filter substrate, a liquid crystal, a TFT substrate, a drive module and so on (not illustrated), and forms color images based on image signals received from outside.

The backlight unit 5012 is an LCBL unit that includes one high-frequency lighting circuit 5013, and the 16 number of discharge lamps (what is called "dielectric barrier discharge lamps") 5100. In a socket base plate 5050 shown in FIG. 32, one of the 16 number of discharge lamps is held at both ends thereof by elastic electrodes sockets 5051 and 5052 made of stainless, phosphorbronze or the like so that the lamp is lighted in this state.

The width D' of the elastic electrodes sockets 5051 and 5052 at the lamp holding portion is designed to be able to hold 3 mm or more of the external electrodes 5102 and 5103.

The high-frequency lighting circuit 5013 is a lighting circuit that lights all of the 16 number of discharge lamps. The discharge lamp 5100 is operated at 40 kHz-100 kHz of lighting frequency and with 3.0 mA-8.0 mA of lamp current.

INDUSTRIAL APPLICABILITY

The discharge lamp of the present invention can broadly be applied as a light source to, for example, a direct-below type backlight unit used in a liquid crystal television, and applied as a light source for document reading to office automation equipment such as a copier, facsimile, or an image scanner, and thus is highly usable in the industry. The discharge lamp of the present invention has improved start-up characteristics in dark surrounding, and thus is highly usable in the industry.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A discharge lamp comprising:
  a glass bulb; and
  a pair of electrodes provided at both ends of the glass bulb, wherein at least one of the electrodes is an external electrode formed on an outer surface of the glass bulb as a thin layer whose maximum thickness is 70 μm or less, and an end portion of the external electrode becomes smaller in thickness towards an end of the external electrode in a glass bulb tube axis direction.

2. The discharge lamp of claim 1, wherein
  the external electrode includes an electrode body layer and a coating layer, the electrode body layer being formed on an outer surface of the glass bulb, a main constituent of the electrode body layer being silver or copper, and the coating layer being formed either directly or indirectly on an outer surface of the electrode body layer.

3. The discharge lamp of claim 2, wherein
  a main constituent of the coating layer is solder.

4. The discharge lamp of claim 2, wherein
  the coating layer is formed on the outer surface of the electrode body layer, and
  a main constituent of the electrode body layer is silver, and the coating layer also contains silver.

5. The discharge lamp of claim 2, wherein
  the coating layer is formed on the outer surface of the electrode body layer, and
  an outer surface of the coating layer has been polished.

6. The discharge lamp of claim 1, wherein
a phosphor layer is provided on an inner surface of the glass bulb, the phosphor layer containing phosphor particles that include electron emitting atoms, and
the phosphor layer extends towards an and of the glass bulb, in at least one end portion thereof, to a position A that is 1 mm to 7 mm away towards the end of the glass bulb from a position B that corresponds to an end of the external electrode on a glass bulb center side.

7. The discharge lamp of claim 6, wherein
the electron emitting atoms are of at least one element selected from the group consisting of barium, strontium, and yttrium.

8. The discharge lamp of claim 6, wherein
a protection layer is provided on the inner surface of the glass bulb at least in an area between a position C, which corresponds to an end of the external electrode on a glass bulb end side, and a position D which corresponds to an end of the phosphor layer on a glass bulb end side.

9. The discharge lamp of claim 1, wherein
at least part of the outer surface of the glass bulb has been subjected to a surface roughening, and at least part of the external electrode is provided in an area that has been subjected to the surface roughening.

10. The discharge lamp of claim 9, wherein
the external electrode is provided in entirety thereof in the area that has been subjected to the surface roughening.

11. The discharge lamp of claim 9, wherein
the end portion of the external electrode is provided outside the area that has been subjected to the surface roughening.

12. The discharge lamp of claim 1, wherein
in a cross section cut by a plane including a tube axis of the glass bulb, an angle R between a straight line Q3 and the outer surface of the glass bulb is in a range from 5 degrees to 45 degrees, the straight line Q3 connecting an end Q1 of the end portion and a point Q2 at which the end portion has a largest thickness.

13. The discharge lamp of claim 1, wherein
the end portion of the external electrode becomes smaller in thickness towards the end of the external electrode, drawing a gentle curvature in a cross section cut along a tube axis of the glass bulb.

14. The discharge lamp of claim 1, wherein
a protection layer is provided on an inner surface of the glass bulb, and a phosphor layer is provided on the protection layer,
the glass bulb is made of a glass that contains 3% to 20% of sodium oxide, maximum thickness of the protection layer is 0.5 μm to 2 μm and the protection layer includes at least one element selected from the group consisting of $Y_2O_3$, MgO, and $La_2O_3$, and
the protection layer is not provided on part of the inner surface of the glass bulb.

15. The discharge lamp of claim 1, wherein
the glass bulb is cylindrical and a positive column light emitting portion thereof is in a flattened shape in a transverse cross section.

16. A backlight unit comprising the discharge lamp recited in claim 1 as a light source.

17. A liquid crystal display apparatus comprising a backlight unit,
the backlight unit including:
a plurality of discharge lamps which are each the discharge lamp recited in claim 1; and
a high-frequency lighting circuit that lights all of the plurality of discharge lamps.

18. A discharge lamp comprising:
a glass bulb; and
a pair of electrodes provided at both ends of the glass bulb, wherein at least one of the electrodes is an external electrode having a cylindrical portion adjacent ends of the glass bulb formed on an outer surface of the glass bulb as a thin layer whose maximum thickness is 70 μm or less, and an end portion of the external electrode becomes smaller in thickness towards an end of the external electrode in a glass bulb tube axis direction.

19. the discharge lamp of claim 1, wherein the electrodes are formed of solder.

20. The discharge lamp of claim 18, wherein the electrodes are formed of solder.

* * * * *